(12) United States Patent
Sammak et al.

(10) Patent No.: US 9,607,202 B2
(45) Date of Patent: Mar. 28, 2017

(54) METHODS OF GENERATING TROPHECTODERM AND NEURECTODERM FROM HUMAN EMBRYONIC STEM CELLS

(75) Inventors: Paul J. Sammak, Pittsburgh, PA (US); Rami Mangoubi, Newton, MA (US); Teresa M. Erb, Pittsburgh, PA (US); Sara Mucko, Philadelphia, PA (US); Mukund Desai, Needham, MA (US)

(73) Assignees: UNIVERSITY OF PITTSBURGH—OF THE COMMONWEALTH SYSTEM OF HIGHER EDUCATION, Pittsburgh, PA (US); THE CHARLES STARK DRAPER LABORATORY, INC., Cambridge, MA (US)

( * ) Notice: Subject to any disclaimer, the term of this patent is extended or adjusted under 35 U.S.C. 154(b) by 480 days.

(21) Appl. No.: 12/972,346

(22) Filed: Dec. 17, 2010

(65) Prior Publication Data
US 2011/0188728 A1    Aug. 4, 2011

Related U.S. Application Data

(60) Provisional application No. 61/284,484, filed on Dec. 17, 2009.

(51) Int. Cl.
*G06K 9/00* (2006.01)
(52) U.S. Cl.
CPC .......... *G06K 9/00* (2013.01); *G06K 9/00147* (2013.01)
(58) Field of Classification Search
CPC ............................ G06K 9/00; G06K 9/00147
USPC ................................................. 382/128, 133
See application file for complete search history.

(56) References Cited

U.S. PATENT DOCUMENTS

| | | | |
|---|---|---|---|
| 4,150,360 | A | 4/1979 | Kopp et al. |
| 4,905,296 | A | 2/1990 | Nishihara |
| 4,965,725 | A | 10/1990 | Rutenberg |
| 5,257,182 | A | 10/1993 | Luck et al. |
| 5,526,258 | A | 6/1996 | Bacus |
| 5,757,953 | A | 5/1998 | Jang |
| 5,825,909 | A | 10/1998 | Jang |
| 5,841,509 | A | 11/1998 | Harooni et al. |
| 5,919,464 | A | 7/1999 | Mann et al. |
| 5,989,835 | A | 11/1999 | Dunlay et al. |

(Continued)

FOREIGN PATENT DOCUMENTS

| | | |
|---|---|---|
| JP | 2011-523549 | 8/2011 |
| WO | WO-94/11841 | 5/1994 |

(Continued)

OTHER PUBLICATIONS

Bovik et al., "Multichannel Texture Analysis Using Localized Spatial Filters," IEEE Transactions on Pattern Analysis and Machine Intelligence, 12(1):55-73 (Jan. 1990).

(Continued)

*Primary Examiner* — Tom Y Lu
(74) *Attorney, Agent, or Firm* — Paul S. Hunter; Foley & Lardner LLP

(57) ABSTRACT

Methods for inducing differentiation of stem cells into trophectoderm, neurectoderm, or progeny cells thereof are described, and mathematical and statistical image analysis methods and systems, for example, to identify differentiated cells and screen for agents which modulate differentiation are provided for separate or combined use.

14 Claims, 38 Drawing Sheets
(31 of 38 Drawing Sheet(s) Filed in Color)

(56) References Cited

U.S. PATENT DOCUMENTS

| | | | |
|---|---|---|---|
| 6,089,716 | A | 7/2000 | Lashkari et al. |
| 6,103,479 | A | 8/2000 | Taylor |
| 6,128,587 | A | 10/2000 | Sjolander |
| 6,167,146 | A | 12/2000 | Rogers et al. |
| 6,350,031 | B1 | 2/2002 | Lashkari et al. |
| 6,385,332 | B1 | 5/2002 | Zahalka et al. |
| 6,615,141 | B1 | 9/2003 | Sabry et al. |
| 6,620,591 | B1 | 9/2003 | Dunlay et al. |
| 6,658,143 | B2 | 12/2003 | Hansen et al. |
| 6,727,071 | B1 | 4/2004 | Dunlay et al. |
| 6,753,965 | B2 | 6/2004 | Kumar et al. |
| 6,763,128 | B1 | 7/2004 | Rogers et al. |
| 6,799,066 | B2 | 9/2004 | Steines et al. |
| 7,050,620 | B2 * | 5/2006 | Heckman ............ 382/133 |
| 7,085,765 | B2 | 8/2006 | Zock et al. |
| 7,086,350 | B2 | 8/2006 | Tecott et al. |
| 7,088,845 | B2 | 8/2006 | Gu et al. |
| 7,095,878 | B1 | 8/2006 | Taylor et al. |
| 7,151,246 | B2 | 12/2006 | Fein et al. |
| 7,200,495 | B2 | 4/2007 | Desai |
| 7,299,088 | B1 | 11/2007 | Thakor et al. |
| 7,302,096 | B2 | 11/2007 | Kim |
| 7,383,237 | B2 | 6/2008 | Zhang et al. |
| 7,796,815 | B2 * | 9/2010 | Muschler et al. ......... 382/173 |
| 7,813,881 | B2 * | 10/2010 | Stein et al. ............. 702/19 |
| 7,907,769 | B2 * | 3/2011 | Sammak et al. ......... 382/133 |
| 8,189,900 | B2 * | 5/2012 | Sammak et al. ......... 382/133 |
| 2002/0186875 | A1 * | 12/2002 | Burmer et al. ......... 382/133 |
| 2003/0149535 | A1 | 8/2003 | Sudo et al. |
| 2003/0185450 | A1 | 10/2003 | Garakani et al. |
| 2004/0063162 | A1 | 4/2004 | Dunlay et al. |
| 2006/0160169 | A1 | 7/2006 | Marcotte et al. |
| 2008/0002152 | A1 | 1/2008 | Collins et al. |
| 2008/0082468 | A1 | 4/2008 | Long et al. |
| 2009/0180693 | A1 | 7/2009 | Desai et al. |
| 2011/0188728 | A1 | 8/2011 | Sammak et al. |
| 2011/0256526 | A1 | 10/2011 | Daley et al. |
| 2012/0021519 | A1 | 1/2012 | Ichida et al. |

FOREIGN PATENT DOCUMENTS

| | | |
|---|---|---|
| WO | WO-2009/137866 A1 | 11/2009 |
| WO | WO-2011/047342 A1 | 4/2011 |

OTHER PUBLICATIONS

Burges, C., "A Tutorial on Support Vector Machines for Pattern Recognition," Data Mining and Knowledge Discovery, 2:121-167 (Jun. 1998).

Chang et al., "Texture Analysis and Classification with Tree-Structured Wavelet Transform," IEEE Transactions on Image Processing, 2(4):429-441 (Oct. 1993).

Csiszar, I., "Why least squares and maximum entropy? An axiomatic approach to inference for linear inverse problems," The Annals of Statistics, 19(4):2032-2066 (Dec. 1991).

Desai et al., "Model Based Variational Smoothing and Segmentation for Diffusion Tensor Imaging in the Brain," Neuroinformatics, 4(3):217-233 (Summer 2006).

Desai, et al., "Noise Adaptive Matrix Edge Field Analysis of Small Sized Heterogeneous Onion Layered Textures for Characterizing Human Embryonic Stem Cell Nuclei," IEEE International Symposium on Biomedical Imaging, pp. 1386-1389 (2009).

Do et al., "Wavelet-Based Texture Retrieval Using Generalized Gaussian Density and Kullback-Leibler Distance," IEEE Transaction on Image Processing, 11(2):146-158 (Feb. 2002).

Haralick et al., "Textural Features for Image Classification," IEEE Transactions on Systems, Man and Cybernetics, SMC-3(6):610-621 (Nov. 1973).

Jeffreys, "Support Vector Machine and Parametric Wavelet-Based Texture Classification of Stem Cell Images," Masters Thesis, Operations Research Center, MIT, Cambridge, Mass (2004).

Ma et al., "A Comparison of Wavelet Transform Features for Texture Image Annotation," International Conference on Image Processing Oct. 23-25, 1995, pp. 256-259.

Mangoubi et al., "Performance Evaluation of Multiresolution Texture Analysis of Stem Cell Chromatin," Fifth IEEE International Symposium of Biomedical Imaging, Washington, D.C. (2008).

Mangoubi R, Jeffrey C, Copeland A, Desai M, Sammak P (2007) Non-Invasive Image Based Support Vector Machine Classification of HESC'S. In: International Symposium on Biomedical Imaging, Arlington, VA.

Mao et al., "Texture Classification and Segmentation Using Multiresolution Simultaneous Autoregressive Models," Pattern Recognition, 25(2):173-188 (Feb. 1992).

Marshall et al., "Interphase chromosomes undergo constrained diffusional motion in living cells," Current Biology, 7(12):930-939 (1997).

Narasimha, R. et al., "Automatic joint classification and segmentation of whole cell 3D images," Pattern Recognition, vol. 42, No. 6, Jun. 1, 2009, pp. 1067-1079.

Sammak et al., High Content Analysis of Human Embryonic Stem Cell Growth and Differentiation. High Content Screening: Science, Techniques, and Applications. S. A. Hanney. Hoboken, NJ, John Wiley (2008).

Smith et al., "Transform Features for Texture Classification and Discrimination in Large Image Databases," Proceedings of IEEE International Conference on Image Processing, Austin, TX (Nov. 1994).

Varma, M. et al., "A stastistical approach to texture classification from single images," International Journal of Computer Vision, vol. 62, No. 1-2, Apr. 1, 2005, pp. 61-81.

Carpenter, A.E., et al. CellProfiler: image analysis software for identifying and quantifying cell phenotypes. Genome Biology 7, R100 (2006).

Jones, T.R., et al. CellProfiler Analyst: data exploration and analysis software for complex image-based screens. BMC Bioinformatics 9, 482 (2008).

Office Action for U.S. Appl. No. 13/233,520 dated Jul. 15, 2014.

Office Action mailed Dec. 26, 2014 in Japanese Patent Application No. JP 2012-534340.

Takahashi, K., et al., Induction of Pluripotent Stem Cells from Adult Human Fibroblasts by Defined Factors, Cell, vol. 131, No. 5, pp. 861-872, Nov. 30, 2007.

US Office Action in U.S. Appl. No. 13/741,184 dated Jun. 15, 2015.

US Office Action in U.S. Appl. No. 13/741,184 dated Mar. 18, 2015.

Notice of Final Rejection mailed Sep. 2, 2015 in Japanese Patent Application No. 2012-534340.

* cited by examiner

Oct4 is increased by knockdown of HDAC3, but not HDAC1 or HDAC2

Epigenetic effects of HDAC inhibition by Trichostatin

Pluripotency increase by HDAC inhibition (a) Post-Segmentation (b) Post-Normalization (c) Internal Window Centers (d) H3: Parzen vs. GGD

```
SEQUENCE LISTING

<160> NUMBER OF SEQ ID NOS: 7

<210> SEQ ID NO 1
<211> LENGTH: 5
<212> TYPE: PRT
<213> ORGANISM: Unknown
<220> FEATURE:
<223> OTHER INFORMATION: Description of Unknown: Laminin peptide

<400> SEQUENCE: 1

Tyr Ile Gly Ser Arg
1               5

<210> SEQ ID NO 2
<211> LENGTH: 9
<212> TYPE: PRT
<213> ORGANISM: Unknown
<220> FEATURE:
<223> OTHER INFORMATION: Description of Unknown: Laminin peptide

<400> SEQUENCE: 2

Cys Asp Pro Gly Tyr Ile Gly Ser Arg
1               5

<210> SEQ ID NO 3
<211> LENGTH: 5
<212> TYPE: PRT
<213> ORGANISM: Unknown
<220> FEATURE:
<223> OTHER INFORMATION: Description of Unknown: Laminin peptide

<400> SEQUENCE: 3

Ile Lys Val Ala Val
1               5

<210> SEQ ID NO 4
<211> LENGTH: 10
<212> TYPE: PRT
<213> ORGANISM: Unknown
<220> FEATURE:
<223> OTHER INFORMATION: Description of Unknown: Laminin peptide

<400> SEQUENCE: 4

Arg Asn Ile Ala Glu Ile Ile Lys Asp Ile
1               5                   10
```

```
<210> SEQ ID NO 5
<211> LENGTH: 7
<212> TYPE: PRT
<213> ORGANISM: Unknown
<220> FEATURE:
<223> OTHER INFORMATION: Description of Unknown: Laminin peptide

<400> SEQUENCE: 5

Arg Tyr Val Val Leu Pro Arg
1               5

<210> SEQ ID NO 6
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Asp Cys Asp Pro Gly Tyr Ile Gly Ser Arg
1               5                   10

<210> SEQ ID NO 7
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Asp Arg Asn Ile Ala Glu Ile Ile Lys Asp Ile Cys
1               5                   10
```

METHODS OF GENERATING TROPHECTODERM AND NEURECTODERM FROM HUMAN EMBRYONIC STEM CELLS

PRIORITY

This application claims the benefit of U.S. Provisional Application No. 61/284,484, filed on Dec. 17, 2009, the disclosure of which is incorporated herein by reference in its entirety.

FUNDING

Work described herein was funded, in whole or in part, by Grant No. EB006161, awarded by the National Institutes of Health and National Institute of Biomedical Imaging and Bioengineering (NIBIB). The United States Government has certain rights in the invention.

SEQUENCE LISTING

The instant application contains a Sequence Listing which has been submitted in ASCII format via EFS-Web and is hereby incorporated by reference in its entirety. Said ASCII copy, created on Apr. 11, 2011, is named CSDK027101 and is 1,766 bytes in size.

BACKGROUND

Stem cells have unique abilities to renew their own population through cell division, or differentiate into other cell types. These abilities give stem cells enormous potential for regenerating tissues and repairing damaged or diseased cell populations. One essential step to unlocking this potential is inducing the stem cells to differentiate into desired cell types in vitro. Thus, controlling differentiation of stem cells in vitro is an area of ongoing study. Another key step is identifying the differentiated cells of a specific type, a task often performed by removing cells from the culture and immunostaining for cell-specific protein markers. For monitoring growth and differentiation of stem cells in real time, it would be useful to have a non-invasive method for identifying differentiating cells as they progress through the stages of differentiation. A non-invasive platform would also allow monitoring while adding or removing factors that modulate stem cell differentiation.

Two lineages of particular interest are the trophectoderm lineage and the neurectoderm lineage. Trophectoderm (TE) refers to a layer of cells that form on the outer layer of a blastocyst, and later differentiates to form extra-embryonic tissue such as the placenta. The timing of TE differentiation is critical because successful implantation of an embryo requires synchrony between the developing placenta and uterine receptivity. Neurectoderm (NE) refers to the ectoderm which differentiates to form cells and structures of the nervous system. All of the specialized cells in the nervous system are derived from NE, so it would be useful to establish methods for directing differentiation into NE and other specialized cell types. However, factors controlling the development of TE are not well-understood. Accordingly, there remains a need for in vitro protocols for inducing differentiation of stem cells into TE, NE, or cells derived from these lineages, and for identifying the differentiation of these cell types in a non-invasive manner.

SUMMARY

One aspect of the present invention is a method for identifying cells differentiating into trophectoderm, neurectoderm, or progeny cells thereof, comprising (a) obtaining an image of one or more cells, (b) representing the image as a multiplicity of pixels, (c) using a processor to extract one or more image features from said multiplicity of pixels, (d) comparing the one or more image features with image features derived from one or more reference cells, wherein the processor applies one or more statistical comparison methods to compare the image features, whereby cells differentiating into trophectoderm, neurectoderm, or progeny cells thereof are identified.

In one embodiment, the one or more cells in the image is/are a colony of cells. In some embodiments, the image of the one or more cells includes an image of a nucleus. In another embodiment, the image feature is selected from border shape, border thickness, width of layers defined by inner and outer boundaries in the cell, texture, cell size, uniformity, and internuclear distance. Here, the texture may correspond to a morphological structure of the cell. Texture may be heterogeneous.

In some embodiments, high levels of contrast between pixels at the cell border of a cell relative to the cell border of a reference stem cell indicates that the cell is differentiating into trophectoderm, neurectoderm, or a progeny cell thereof. In other embodiments, thin edges at borders of a cell, as compared with the edges of a cell border in a reference stem cell, indicates that the cell is differentiating into trophectoderm, neurectoderm, or a progeny cell thereof. In still other embodiments, presence of discrete objects within cell borders of a cell, as compared with absence of discrete objects within the cell border of a reference stem cell, indicates that the cell is differentiating into trophectoderm, neurectoderm, or a progeny cell thereof. Further, the content in various spatial frequency bands in an image of a cell relative to an image of a reference image of a stem cell indicates that the cell is differentiating into trophectoderm, neurectoderm, or a progeny cell thereof.

In further embodiments, the steps of identifying cells additionally comprise (e) performing simultaneous smoothing and segmentation of said image; (f) determining one or more boundaries of said cell; (g) identifying a region or subregion near to said one or more boundaries; (h) deriving one or more attributes of region or subregion; and/or (i) analyzing variation in said one or more attributes; wherein said one or more image features comprise components of said one or more attributes.

In some embodiments, the one or more image features are extracted using a wavelet and/or a multiresolution decomposition algorithm. The one or more image features may also be extracted using a matrix edge and/or onion peel algorithm. In other embodiments, the wavelet or multiresolution algorithm is an n-level decomposition that yields three detail subbands per level, from which additional features may be extracted. One of each of the three detail subbands per level may be oriented horizontally, vertically, and diagonally. In further embodiments, the matrix edge and/or onion peel algorithms are applied to the output of the features extracted from the multiresolution decomposition In still other embodiments, the one or more statistical methods is/are a comparison of probability density functions, or estimates thereof. For example, the one or more statistical methods may comprise parametric or non-parametric binary or M-ary hypothesis tests.

In additional embodiments, one or more areas of the one or more images are classified using a parametric or non-parametric clustering algorithm. A clustering algorithm may be selected from the k-Nearest Neighbor (INN) algorithm and the Support Vector Machine (SVM). Here, dissimilarity between the one or more image features may be calculated using a pdf estimator and quantified using information divergence. In some embodiments, dissimilarity is calculated using a Kullback-Leibler divergence (KLD) and/or a Renyi divergence. In other embodiments, the method used to estimate the pdf and KLD is selected from: a generalized Gaussian density model (GGD), a Gaussian function, a non-Gaussian density function, or a non-parametric histogram.

In some embodiments, differentiating cells are contained in a heterogeneous mixture of cells, and the method may further comprise subdividing the image of one or more cells into one or more windows. The one or more windows may be classified, subdivided, and re-classified. In other embodiments, the differentiating cells are distinguished from cells of other lineages, feeder cells, and stem cells.

In further embodiments, trophectoderm and progeny cells thereof comprise trophectoderm, trophectodermal stem cells, placental stem cell progenitors, extravillous trophoblasts, multinucleated syncytioblasts, or any intermediates thereof. Similarly, neurectoderm and progeny cells thereof may comprise neurectoderm, neural stem cells, neural progenitor cells, committed neurons, terminally-differentiated neurons, glia, or any intermediates thereof. In some embodiments, the appearance of squamous epithelium, as compared to the cuboidal appearance of reference stem cells, indicates that the cell is differentiating along the trophectoderm lineage. In other embodiments, the appearance of multinucleated cells indicates that the cells are differentiating along the trophectoderm lineage.

Another aspect of the present invention provides a method for identifying a test agent that modulates differentiation of stem cells into trophectoderm, neurectoderm, or progeny cells thereof, comprising (a) growing a culture of the stem cells in presence of the test agent; (b) obtaining an image of one or more cells in the culture; (c) representing the image as a multiplicity of pixels; (d) using a processor to extract one or more image features from said multiplicity of pixels; (e) comparing the one or more image features with image features derived from one or more cells grown in the absence of the test agent, wherein the processor applies one or more statistical comparison methods to compare the image features; whereby the test agent that modulates differentiation of stem cells is identified. The test agent may inhibit or promote differentiation of stem cells into trophectoderm, neurectoderm, or progeny cells thereof.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 11A shows cells that were transfected with siRNA (Invitrogen, USA) directed against HDAC2, 2 or 3. FIG. 11B shows knockdown of HDAC3. FIG. 11C shows, effects of adding Tricostatin A (TSA), an inhibitor of Class 1 HDACs (1, 2, 3, and 8). FIG. 11D shows that TSA decreased H3K9me3, an indicator of constitutive heterochromatin. FIG. 11E shows that TSA decreased H3K27me3, and indicator of facultative heterochromatin and gene silencing. FIG. 11F shows that TSA decreased DNA methylation on 5'cytosine, an indicator of heterochromatin gene silencing. FIG. 11G shows that TSA increased Oct4, a pluripotency transcription factor in a dose dependent manner. FIG. 11H shows that TSA increased peripheral F-actin, a marker of tight cell cell junctions, distinct for the ICM not epiblast state. This protein changes colony texture by producing smooth, homogeneous colonies. FIG. 11I shows that TSA increased Nanog but with a different concentration profile than Oct4, suggesting a different mechanism of induction. FIG. 11J shows that TSA increased GTCM2, a cell surface marker of pluripotency. This marker is selective for high cells with high levels of pluripotency.

FIG. 21A shows a phase contrast image of HSF-6 pluripotent colony. FIGS. 21B-21C shows Oct-3/4 staining (green) of undifferentiated HSF-6. FIG. 21D shows SSEA-3 staining of an entire undifferentiated HSF-6 colony.

FIG. 21E shows an H7 hESC colony on mouse embryonic fibroblast feeders stained with Oct-3/4 (green) and the neurectodermal marker, nestin (red). FIG. 21F shows that on feeder fibroblasts, Oct-3/4 positive colonies (green) are negative for the trophectodermal marker CDX-2 (red).

FIG. 22A shows H7 EB in suspension at day 8. FIGS. 22B-22E show day 15 on feeders. FIGS. 22F-22J show day 30 on feeders.

FIG. 36A shows the input image, and FIGS. 36B-G show six exemplary output images.

FIGS. 37A-37E are phase contrast microscopy images showing unduction of neurectoderm in hESC by noggin and inhibition by TSA. hESC were cultured for 48 hrs in pluripotent media (A) or differentiation media containing noggin (B-E). Increasing concentrations of the HDAC inhibitor trichostatin A slowed differentiation at 48 hrs from 0.5 to 2.0 nM since the larger cell size of neurectoderm is blocked (D). 5 nM reduced cell-cell adhesion and increased cell motility (E).

FIGS. 38A-38D show expression of nestin in the absence (FIG. 38A) or presence (FIG. 38C) of 1.0 nM TSA, and methylation of H3K9 in the absence (FIG. 38B) or presence (FIG. 38D) of TSA. FIGS. 38E-38H show expression of nestin in the absence (FIG. 38E) or presence (FIG. 38G) of 1.0 nM TSA, and expression of HDAC1 in the absence (FIG. 38F) or presence (FIG. 38H) of TSA. Cells were also stained with DAPI and expression of Oct 4 was measured.

DETAILED DESCRIPTION

Figure 1:
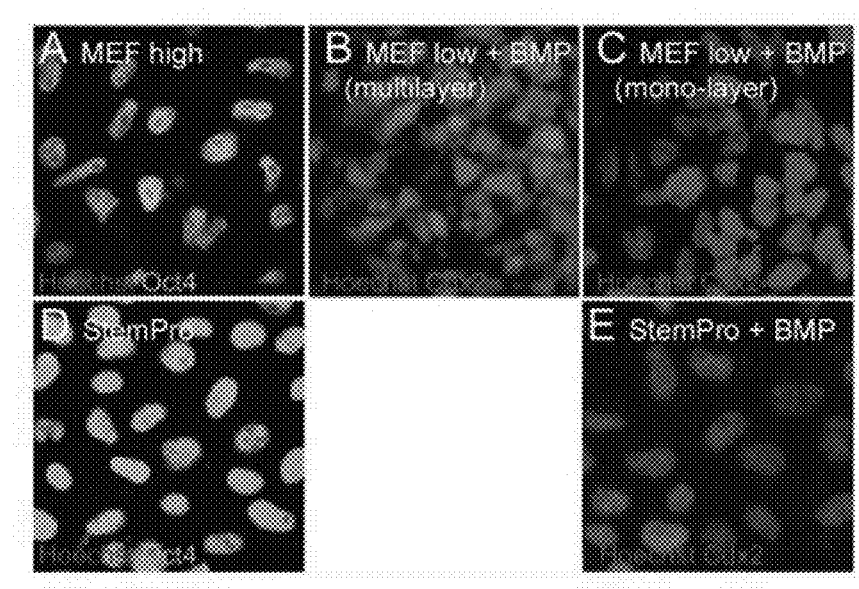
FIG. 1 shows that pluripotent hESCs grown on normal density MEF feeders (A) or in StemPro® (D), a defined pluripotency media, predominantly stain for the pluripotency marker OCT 4. Pluripotent hESCs grown on low density MEFs minus FGF2 and supplemented with BMP4 for 7 days expressed CDX2 in adherent multi-layer (B) but not monolayer (C) hESC colonies. In contrast, low intensity, high-frequency CDX2 expression was observed in monolayer hESCs cultured in the MEF-free, defined media, StemPro® containing BMP4 (E) after only 4 days of culture. TE-induction efficiency as determined by the frequency of CDX2 staining was significantly lower in monolayer colonies compared to multilayer colonies in DSR/MEF culture, and significantly higher in StemPro, at 3.6% 44.4%, and 93.7% respectively (F, $p<0.01$). hESC differentiation in StemPro supplemented with BMP4 is not TE-selective, since a dose-dependent, statistically significant increase in brachyury expression is observed with addition of BMP4 to StemPro (G). Furthermore, there is a 6-fold increase in percent brachyury (T) positive cells after the addition of BMP4 to StemPro (H; $p<0.005$) for 48 hours.
Figure 1:
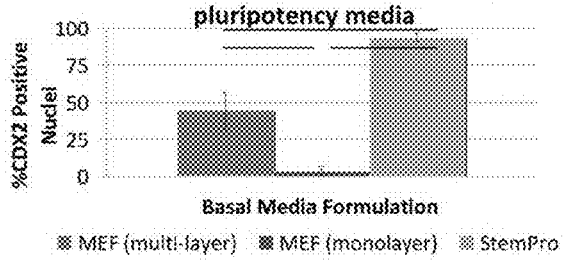
Figure 1:
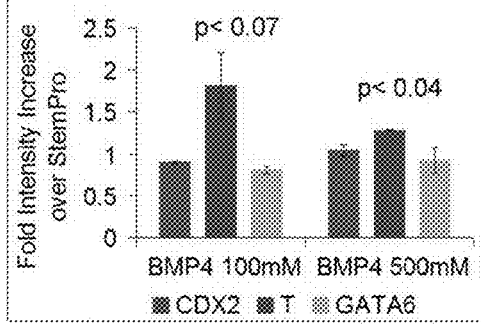
Figure 1:
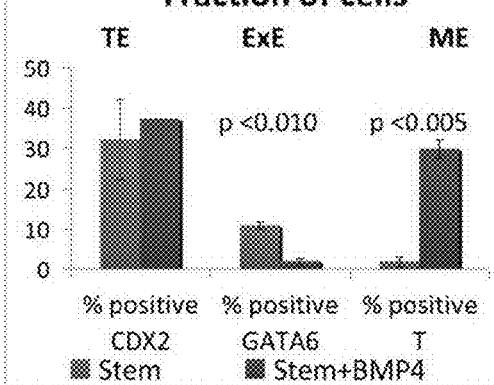

The methods of the present application may be applied to identification of trophectoderm or neurectoderm cells (or precursors or progeny thereof), based on morphological features and other molecular characteristics that distinguish these differentiated cells from stem cells. Similarly, the identification of differentiating cells may be used to screen agents that promote or inhibit differentiation, for example, by modulating the epigenetic state of proteins involved in the differentiation process. The methods use image analysis and/or statistical classification methods, such as those disclosed in U.S. Pat. No. 7,711,174; U.S. patent application Ser. No. 12/321,360; and U.S. patent application Ser. No. 12/904,158, the contents of which are incorporated by reference herein in their entirety.

Inducing Differentiation of Trophectoderm

In a developing embryo, trophectoderm (TE) is formed when totipotent cells of the embryonic blastula differentiate into the inner cell mass (ICM) and TE. 1CM gives rise to pluripotent stem cells, such as embryonic stem cells (ESCs), and three germ layers (ectoderm, endoderm, and mesoderm) which form all fetal structures. TE gives rise to multipotent trophectodermal stem (TS) cells, which, in turn, develop along several lineages (Soares, 1993; Rossant, 1995; Tanaka et al., 1998; Janatpour et al., 1999; Cross, 2000; Rinkenberger and Werb, 2000; Hemberger and Cross, 2001; Knofler et al., 2001; Cross, 2005), beginning with placental stem cell progenitors, which ultimately undergo terminal differentiation into multinucleated syncytiotrophoblasts or extravillous trophoblasts. In spite of the divergent lineages of ICM and TE, it is possible to induce ESCs to differentiate into TE. In vitro, various agents may be used to promote the differentiation and growth of TE to the desired stage. Similarly, the effects of various agents on differentiation and growth of TE in vitro may be used to determine how a given agent will affect development of cells and structures derived from TE, such as the placenta. Thus, one aspect of the present invention is a method for inducing differentiation of pluripotent stem cells into trophectoderm and/or progeny cells derived from trophectoderm, including but not limited to placental stem cell progenitors, multinucleated syncytiotrophoblasts, extravillous trophoblasts, and cells in intermediate stages.

In some embodiments, differentiating cells have committed to a trophectoderm lineage, e.g., will not form mesoderm (ME), endoderm, or extraembryonic endoderm (ExE), but the differentiating cells may not yet express trophectoderm markers. Alternately, differentiating cells may express trophectoderm markers, but may not have not differentiated into placental stem cell progenitors or placental stem cells. In other embodiments, differentiating cells have committed to become syncytiotrophoblasts or extravillous trophoblasts. At this stage, cells may have the appearance of squamous epithelium, and may be multinucleated.

A method described herein comprises growing a culture of stem cells, such as human embryonic stem cells (hESCs), in the absence of feeder cells and inducing differentiation along a trophectoderm lineage by adding BMP4 to the culture. Traditionally, pluripotent hESCs are maintained by growing them on mouse embryonic fibroblasts (MEF) and routinely passaging them to prevent unwanted spontaneous differentiation. A reduction in MEF-secreted pluripotency factors by hESC culture on low density MEFs encourages spontaneous neurectoderm-differentiation (Ozolek et al., 2007; Vallier et al., 2009b; Vanier et al., 2009a; Ozolek et al., 2010) whereas BMP4 supplementation to MEFs at low density (Wu et al., 2008; Vallier et al., 2009c) produces TE from pluripotent hESCs. Studies of hESC differentiation signaling pathways (Xu et al., 2002; Wu et al., 2008; Xu et al., 2008; Vallier et al., 2009b; Vallier et al., 2009a; Lin et al., 2010) have suggested a paracrine role of transforming growth factor-beta (TGF(3) superfamily members in TE formation. Specifically, bone morphogenic protein (BMP4) induces homogenous trophoblast differentiation and further differentiation to syncytiotrophoblast from pluripotent hESCs (Xu et al., 2008; Vallier et al., 2009b), and activin inhibition synergizes with BMP4 to induce trophoblast (Wu et al., 2008). Mouse studies confirm a paracrine role of TGFr3 superfamily members for TE-induction, since the first lineage commitment decision is partly regulated by BMP2, BMP4 and BMP6 (Qi et al., 2004; Adjaye et al., 2005; Murohashi et al., 2010; Valera et al., 2010). BMP4 production in mouse TE is maintained by Caudal-like transcription factor Cdx2 (Strumpf et al., 2005), which is required for TE-differentiation (Wu et al., 2008). Despite ubiquitous co-expression with the ICM pluripotency genes, Oct4 and Nanog, Cdx2 mRNA and protein levels are heterogeneous at the pre-committed eight-cell stage. High-expressing Cdx2 blastomeres are allocated to TE, whereas low-expressers contribute to the ICM (Jedrusik et al., 2008). Thus Cdx2 becomes progressively upregulated in future TE (Niwa et al., 2005) while repressing Oct4 and Nanog (Niwa et al., 2005; Ralston and Rossant, 2008) setting the stage for morphological transformation and lineage commitment.

In some embodiments, induction of trophectoderm differentiation makes use of a defined in vitro media culture, which produces human TE with high efficiency and selectivity. Protocols using either non-adherent embryoid bodies (EBs) or adherent hESCs on MEFs produce TE and secrete placental hormones but are heterogeneous (Gerami-Naini et al., 2004; Giakoumopoulos et al., 2010), and thus not TE-selective. For example, short-term BMP4 treatment can also initiate mesoderm induction from hESCs (Zhang et al., 2008). Furthermore, despite studies showing that hESCs require BMP4 stimulation and activin A inhibition for TE differentiation, MEF culture conditions are ill defined and complicate mechanistic studies (Xu et al., 2002; Wu et al., 2008; Xu et al., 2008; Giakoumopoulos et al., 2010; Lin et al., 2010). While hESCs have been induced to undergo early extraembryonic differentiation in a chemically defined medium supplemented with BMP4, these cells were still heterogeneous with some cells expressing markers of TE lineages and others expressing markers of primitive endoderm (Xu et al., 2008; Lin et al., 2010). Accordingly, the media culture may be a minimal medium that does not contain unnecessary pluripotency growth factors, but permits hESC differentiation in the presence of exogenous paracrine factors, such as BMP4. The media may be supplemented with an activin antagonist, for example, SB. The appropriate media maximizes the efficiency of the differentiation process, as reflected by a high percentage of TE positive cells and confers selectivity by minimizing populations of mixed lineage.

In some embodiments, the media culture comprises insulin, BSA, and/or heparin. An exemplary media culture comprises DMEM, NEAA, BSA, penicillin/streptomycin, L-glutamine, insulin, transferrin, selenium, and heparin sulfate, for example, in the following concentrations: DMEM; 0.1 mM NEAA; 2% BSA; 1× penicillin/streptomycin; 2 nM L-glutamine; 10 µg/mL insulin; transferrin; selenium; and 100 ng/mL heparin sulfate. In some embodiments, the dose of BMP4 added to the culture to induce differentiation may be at least 100 ng/mL, or may be 500 ng/mL, or any concentration in between. The culture may be compatible with hESCs that have been grown and/or maintained in StemPro® (Invitrogen, USA).

In other embodiments, the differentiated trophectoderm cells may be identified by expression of differentiation markers, such as CDX2 or Hand-1, by morphological transformation to epithelium, by terminal differentiation to syncytia, and/or by cell spreading. For example, morphological transformation from a cuboidal shape to a flattened, squamous epithelium may indicate differentiation to TE cells. TE cells are morphologically distinct from pluripotent hESCs. Blastomeres, which are TE cells of the blastocyst, express molecules characteristic of squamous epithelium, while the ICM, where pluripotent hESCs are derived, remains a 3-dimensional interconnected cuboidal epithelium. These morphological features were utilized to distinguish TE from pluripotent hESCs. However, while morphology may distinguish TE from pluripotent hESCs, many other cell types besides TE have an epithelial morphology. Thus, multinucleated cell formation, or syncytia, may be a more specific morphological feature, and may comprise small nuclei with hyper-condensed heterochromatin.

The present disclosure provides, among other things, methods of producing trophectoderm cells, comprising culturing embryonic stem cells as small colonies (e.g., each having fewer than 1000 cells) in a protein-coated tissue culture vessel with feeder-free medium. In some instances, the trophectoderm cells are Cdx-2 positive, Hand-1 positive, and/or βHCG negative. The tissue culture vessel may be coated with any appropriate coating; two examples are Matrigel® or Geltrex®. In some embodiments, the methods comprise adding SB431542 and/or BMP4. These may be added, for instance, after the cells have been cultured for 24 hours in a suitable medium, e.g., in Stempro®. In some embodiments, FGF4 and Activin A may be added to the trophectoderm cells. These may be added, for instance, at day 4, 5, 6, or 7. In some embodiments, the methods produce trophectoderm cells in less than 3 weeks, less than 2 weeks, or even less than 1 week. In some embodiments, the trophectoderm cells are Cdx-2 positive, Hand-1 positive, and/or βHCG negative. In some embodiments, the cells are Hand-1 negative at day 4. The cells may become Hand-1 positive at some time thereafter.

The cells may be passaged with any suitable protease or passaging reagent, such as collagenase, trypsin, or the protease sold under the trademark Accutase®. In some embodiments, the feeder-free medium is the medium sold under the trademark of Stempro®, or comprises the following ingredients: glucose, calcium, sodium phosphate, sodium bicarbonate, sodium pyruvate, deoxyribonucleosides, and adenosine. The cells may be cultured in feeder-free medium for a suitable length of time, such as about 24 hours. The embryonic stem cells may be derived from any of a number of organisms, including mammals, e.g., humans or mice. In some embodiments, the culture does not contain feeders. In some embodiments, the culture does not contain serum. In certain aspects, the small colonies comprise about 100-1000 cells, 200-900 cells, 200-500 cells, or 500-1000 cells. In certain embodiments, at least about 50%, 75%, 80%, 90%, 95%, or 99% of the colonies comprise 100-1000 cells, 200-900 cells, 200-500 cells, or 500-1000 cells. In some aspects, one may passage the cells when at least about 50%, 75%, 80%, 90%, 95%, or 99% of the colonies reach about 500, 900, or 1000 cells. In various embodiments, one may use quantitative imaging analysis (e.g., using a computer) to determine or monitor the differentiation state of the cells. This quantitative imaging analysis may measure the texture of the colony, for example, or use any of the various analytical techniques disclosed herein. The tissue culture vessel may be coated with any appropriate coating including gelatin, polylysine, polyornithine, laminin, or sold under the trademark Matrigel® or Geltrex®, or a combination thereof such as polyornithine and laminin.

Inducing Differentiation of Neurectoderm and Progeny Cells

Controlling the differentiation and proliferation of cells of the neurectoderm lineage in vitro holds great promise for the regeneration and repair of tissues in the nervous system. Following damage to the nervous system, surviving or intact cells rarely restore full function to damaged structures. Similarly, in neurodegenerative diseases, the population of dying or damaged neurons is not replaced. An attractive possibility for treating damage or disease in the nervous system is the transplantation of new cells where needed. New cells may be pluripotent stem cells, or may be differentiated cells of the neurectoderm lineage. A major challenge for stem cell-based neural tissue engineering is the manipulation of cell fate, so that cells differentiate into the right type of cells at the right time and location. In vivo, neurectoderm is originally derived from stem cells, and gives rise to the neural crest and the neural tube. Together, these structures form the peripheral and central nervous system, including all of the specialized neurons and glia. In vitro, stem cells (for example, hESCs) can be induced to differentiate into neurectoderm and/or other progeny cells under the appropriate culture conditions. Thus, one aspect of the present invention provides a method for inducing differentiation of pluripotent stem cells into neurectoderm and/or progeny cells derived from neurectoderm. The progeny cells may be neural stem cells, neural progenitor cells, committed neurons, terminally-differentiated neurons, glia, or any intermediate cell types.

In some embodiments, differentiating cells have committed to a neurectoderm lineage, but do not yet express neurectoderm markers. Alternately, differentiating cells may express neurectoderm markers, but have not differentiated into neural stem cell progenitors, neural stem cells, neurons, or glia. In other embodiments, differentiating cells have committed to become neurons or glia, but are not terminally-differentiated neurons. Differentiating cells may also have finished differentiation, so they express markers of mature neurons or glia. Cells of neuronal or glial lineages may extend processes, such as axons or dendrites.

Several laboratories that have applied the BMP4 antagonist noggin to induce differentiation of hESC to neurectoderm or neural stem cells (Ying, Stavridis et al. 2003; Gerrard, Rodgers et al. 2005; Yao, Chen et al. 2006; Cohen, Itsykson et al. 2007). Thus, in some embodiments, the method comprises growing a culture of pluripotent stem cells in a culture medium comprising the protein noggin. The culture medium may also be supplemented with N2 and/or B27® (Invitrogen, USA). In some embodiments, the culture media comprises DMEM/F12 (Dulbecco's Modified Eagle's Medium in a mixture with Ham's F-12 Nutrient Mixture). In other embodiments, the culture media comprises StemPro® (Invitrogen, USA).

Another aspect of the present invention provides a method for inducing differentiation of stem cells into neurectoderm and/or progeny cells derived from neurectoderm, comprising growing a culture a pluripotent stem cells on a conductive polymer doped with at least one polypeptide derived from an extracellular matrix protein. In some embodiments, the conductive polymer is polypyrrole (PPy). PPy has many attractive properties, including biocompatibility, electrical conductivity, ease of synthesis, and ability to control release of growth factors or drugs (Ateh et al., 2006a; Guimard et al., 2007). PPy backbones incorporate negatively charged species as dopants to balance their positive charges and form a complex of PPy-dopant. A dopant may be a non-bioactive anions or a bioactive molecule.

In some embodiments, functional domains or sequences of extracellular matrix (ECM) protein laminin may be employed as dopants for PPy. Sequences identified from the ECM molecule laminin include YIGSR (SEQ ID NO: 1) or CDPGYIGSR (SEQ ID NO:2), IKVAV (SEQ ID NO:3), RNIAEIIKDI (SEQ ID NO:4) and RYVVLPR (SEQ ID NO:5) (Rao and Winter, 2009). CDPGYIGSR (p31) is well known as an active site of laminin, mediating cell attachment and migration and promoting neurite extension from dorsal root ganglia (Cui et al., 2001). PPy films doped with p31 have been studied as substrates in cultures of neuroblastoma cells and rat glial cells. In other embodiments, PPy surfaces may be doped with the laminin fragment RNIAEIIKDI (p20). In still other embodiments, PPy surfaces may be doped with a mixture of p20 and p31. PPy surfaces may additionally be doped with nonbioactive molecule polystyrenesulfonate (PSS). The cells grown on the PPy surfaces may be hESCs or neural stem cells (NSCs), for example adult NSCs. Cells that differentiate on the PPy surfaces may belong to different neuronal lineages, including but not limited to neurectoderm and neural stem cells, committed neurons, and terminally-differentiated dopaminergic neurons.

Yet another aspect of the present invention provides a method for inducing differentiation of stem cells into neurectoderm and/or progeny cells derived from neurectoderm, comprising growing a culture of stem cells on feeder cells plated at a low density. In some embodiments, the cell culture system of the method promotes slow and progressive differentiation of stem cells towards primarily neuroglial phenotypes without extensive genetic or exogenous manipulation of the stem cells. For example, hESCs may maintained as pluripotent stem cells (cells that have the capability to differentiate into all three embryonic germ layer cell types and capacity for self-renewal) by growing them on a feeder substrate, usually mouse embryonic fibroblasts (MEF) and routinely passaging the cells to prevent unwanted spontaneous differentiation. The main factors affecting the behavior of hESC in vitro (excluding direct manipulations of the cell by siRNA, transfection, or other genetic manipulation) include all of the basic elements of cell culture; composition of the media, incubator conditions, method of passaging, substrate, and beginning cell type. When grown on a MEF feeder substrate, hESCs usually require a "high" density of feeder cells per well to maintain pluripotency. For example, approximately 200,000 feeders per well of a 6-well culture plate (21,000 cells/cm$^2$) has been used with success for maintaining ideal pluripotent colony morphology, although the hESC line with H1 hESC requires higher feeder densities and H9 hESC required lower densities for maintaining ideal colony morphology. In some embodiments, approximately 175,000 (18,400 cells/cm$^2$) MEF feeder cells may be used. In other embodiments, hESC colonies may be grown as suspension cultures to make differentiated Embryoid Bodies (EB), which are then plated onto MEF feeder cells.

In further embodiments, differentiated cells of the neurectoderm lineage may be identified by expression of differentiation markers, such as 13-tubulin (expressed on both immature and mature neurons), Doublecortin (expressed by migrating neuroblasts); GFAP (expressed by mature astroglia); NCAM (expressed by both immature and mature neurons); Nestin (expressed on neuroepithelia and neural stem cells); NeuN (expressed by mature neurons); Pax6 (expressed by neuroepithelial tissue and ventral neurectoderm), or a decrease in pluripotency markers such as Oct3/4 and Nanog. Differentiated cells of the neurectoderm lineage may also be identified by morphological transformation, such as cell spreading or extension of axonal or dendritic processes.

A further aspect of the invention provides a method for directing stem cells down a neural lineage or a glial lineage. In some embodiments, single stem cells passaged enzymatically, for example by Accutase® may preferentially differentiate into cells of a glial lineage, producing cells including but not limited to oligodendrocyte precursor cells. Conversely, cell aggregates processed mechanically, for example with collagenase, may preferentially differentiate into cells of a neural lineage. In other embodiments, the epigenetic state of cells in neuronal and glial lineages may be used to differentiate cells from each respective lineage. For example, histone acetylation levels are higher in cells of a glial lineage than in cells of a neural lineage.

The present disclosure also provides a method of producing neurectoderm cells, comprising culturing embryonic stem cells as small colonies (e.g., each having fewer than 1000 cells) in a protein-coated tissue culture vessel with (a) feeder-free medium and (b) noggin. In some embodiments, the cells are contacted with feeder-free medium before noggin is added. In various embodiments, the neurectoderm cells are nestin-positive and/or heterochromatin positive. Nestin may be detected, for example, using immunofluorescence or a Western blot. The heterochromatin state may be assayed using any suitable assay including the quantitative imaging methods described herein. In some embodiments, the neurectoderm cells are allowed to differentiate into oligodendrocyte cells. In some embodiments, the methods produce neurectoderm cells in less than 3 weeks, less than 2 weeks, or even less than 1 week. In some embodiments, neurectoderm cells are nestin positive, HDAC2 positive, and/or Pax6 negative.

The cells may be passaged with any suitable protease or passaging reagent, such as collagenase, trypsin, or the protease sold under the trademark Accutase®. In some embodiments, the feeder-free medium is the medium sold under the trademark of Stempro®, or comprises the following ingredients: glucose, calcium, sodium phosphate, sodium bicarbonate, sodium pyruvate, deoxyribonucleosides, and adenosine. The cells may be cultured in feeder-free medium for a suitable length of time, such as about 24 hours. The embryonic stem cells may be derived from any of a number of organisms, including mammals, e.g., humans or mice. In some embodiments, the culture does not contain feeders. In some embodiments, the culture does not contain serum. In certain aspects, the small colonies comprise about 100-1000 cells, 200-900 cells, 200-500 cells, or 500-1000 cells. In certain embodiments, at least about 50%, 75%, 80%, 90%, 95%, or 99% of the colonies comprise 100-1000 cells, 200-900 cells, 200-500 cells, or 500-1000 cells. In some aspects, one may passage the cells when at least about 50%, 75%, 80%, 90%, 95%, or 99% of the colonies reach about 500, 900, or 1000 cells. In various embodiments, one may use quantitative imaging analysis (e.g., using a computer) to determine or monitor the differentiation state of the cells. This quantitative imaging analysis may measure the texture of the colony, for example, or use any of the various analytical techniques disclosed herein. The tissue culture vessel may be coated with any appropriate coating including gelatin, polylysine, polyornithine, laminin, or sold under the trademark Matrigel® or Geltrex®, or a combination thereof such as polyornithine and laminin.

Method for Screening Drugs/Agents

One aspect of the present invention provides methods for identifying test agents that modulate differentiation of stem cells into trophectoderm or neurectoderm, or progeny cells thereof. Health problems may be treated by drugs that alter the development of stem cells down trophectoderm or neurectoderm lineages, but identifying efficacious drugs is an arduous process. Cell-based screens performed in vitro may help to speed the process, particularly because of the rapid speed of these screens and multiplexed information on drug effects on intact cell machinery. Test agents may be small molecules, drugs, or biomolecules. Small molecules, as used herein, refer to molecules having a molecular weight of less than 2000 amu, such as 100-1500 amu or 250-1000 amu, and lacking a peptidyl backbone.

In some embodiments, test agents may inhibit induction of neurectoderm or trophectoderm from stem cells. As described herein, noggin in culture media may be used to induce differentiation of stem cells into neurectoderm, and BMP4 in culture media may be used to induce differentiation of stem cells into trophectoderm. These reactions are inhibited by the HDAC inhibitor TSA. Other small molecules or biomolecules may be tested for inhibition of induction.

In other embodiments, growth and development of stem cells into trophectoderm and neurectoderm may be used as an assay to measure the effects of drugs that simulate or inhibit stem cell growth and movement. Features such as cell growth, movement, morphological changes, image features of different progenitor cells, and cell death may be measured.

In still other embodiments, toxicity of chemical agents, such as environmental agents, may be tested in the culture conditions described herein. This application also discloses a method of determining whether a test agent inhibits embryonic stem cell development, comprising: (a) culturing embryonic stem cells under conditions that promote their differentiation into trophectoderm cells, and in the presence of a test agent, and (b) assessing the differentiation status of the cells, and (c) determining whether the test agent inhibits embryonic stem cell differentiation to trophectoderm cells. One may monitor or assess the effect of the test agent on embryonic stem cell differentiation using quantitative imaging analysis, e.g., using a computer or other processor. In some embodiments, multiple test agents may be assayed in a high-throughput format.

This disclosure also provides a method of determining whether a test agent inhibits embryonic stem cell development, comprising: (a) culturing embryonic stem cells under conditions that promote their differentiation, and in the presence of a test agent, and (b) assessing the differentiation status of the cells, and (c) using quantitative imaging analysis (e.g., using a computer or other processor) to determine whether the test agent inhibits embryonic stem cell differentiation. In some embodiments, multiple test agents may be assayed in a high-throughput format. In certain aspects, the embryonic stem cells are induced to differentiate into trophectoderm or neurectoderm cells.

Classification of Differentiated Cells

In addition, this disclosure provides a method of classifying a plurality of cells as neurectoderm, trophectoderm, or cells from either lineage, comprising: (a) obtaining a digital image of the plurality of cells, (b) assessing one or more of: cell size, nuclear size, cell packing and inter cellular distance, cell adhesion, colony thickness, overall granularity, and uniformity from the digital image, and (c) classifying the plurality of cells as neurectoderm cells or trophectoderm cells based on the assessment. The plurality of cells may be, for example, a whole colony or a portion of a colony. In some embodiments, the feeder-free medium is the medium sold under the trademark of Stempro® (Invitrogen, USA) or comprises the following ingredients: glucose, calcium, sodium phosphate, sodium bicarbonate, sodium pyruvate, deoxyribonucleosides, and adenosine.

This disclosure, in certain aspects, provides methods for determining the differentiation state of a cell, based on a combination of biological detection methods and image analysis methods. Biological detection methods comprise techniques used to detect biological changes in a cell, and may further comprise taking measurements or acquiring images of a cell or cellular structure in a non-invasive, non-perturbing and non-destructive manner. Methods of the present invention are not limited to biological changes in a particular type of cell or cellular structure. In one aspect, specific biological changes may be related to the chromatin in the nucleus of a cell, and characteristics of the chromatin may be used to determine the differentiation state of the cell.

In some embodiments, the image analysis methods comprise one or more of: statistical multiresolution texture analysis for classification of nuclei regions; variational unified energy functionals formulation for performing one or more of the following operations on images of nuclei: smoothing, segmenting, learning of features and parameters, or grouping of subtextures or shapes; robust non-Gaussian subspace detection and learning methods, and/or nonparametric Independent Component Analysis (ICA), for adaptive basis learning so as to permit compact representation of nuclei regions; and/or linear or nonlinear hierarchical dynamic modeling for representing the spatiotemporal variations of the features extracted using any of the methods listed.

In some embodiments, both the biological detection methods and the image analysis methods are automatable, and provide information about a stem cell's health status and/or pluripotency. Collected over time, images of stem cell colonies or nuclei of stem cells reflect biological changes. Attributes or features extracted from these images may be used to develop models that describe the spatiotemporal dynamics (e.g., the level of pluripotency, onset of mitosis) in stem cell colonies and nuclei, particularly after modifications of environmental conditions. The models based on extracted attributes or features may provide descriptions of transition mechanisms. Notably, the models may be data-driven, because they use information derived from direct measurements. Models based on extracted attributes or features predict and describe the differentiation process in stem cell nuclei and the regeneration and differentiation processes in entire colonies.

Accordingly, in some embodiments, modeling of stem cell processes enables a system of planned, controlled stem cell colony maintenance. The system may be a decision support system for research and industrial biologists, or clinicians interested in cell therapy.

Biological Detection Methods

Many studies of chromatin focus on the structure of DNA and nuclear protein complexes, or dissect the functions of individual proteins, e.g., histones or proteins which modify histone activity. The present disclosure provides additional information about chromatin biology, and establishes relationships between the morphology of the cell nucleus and the differentiation state of the cell. The disclosure further describes methods that use chromatin motility and/or morphology to determine the differentiation state of a cell.

Pluripotent stem cells are characterized by unlimited self-replication and the ability to contribute to all embryonic tissues. The developmental plasticity, of embryonic stem cells (ESCs) has been established genotypically by studies that show tissue-specific expression is inactive but is not irreversibly silenced. Regulation of gene expression in ESCs is different from somatic cells, where the global control of tissue phenotype requires an enduring silencing of gene loci that are not appropriate for a specific type of differentiated cell or tissue. Silencing of inappropriate loci involves the differential formation of heterochromatin, chromosome positioning within the nucleus and other architectural features that are unique to each tissue type. Studies of Oct-4 and nanog regulation during differentiation suggest that epigenetic mechanisms, including progressive methylation of the Oct-4 promoter and chromatin remodeling, silence pluripotency genes that are no longer needed. During neuronal differentiation, the potentially available genome is narrowed from pluripotent to multipotent, finally to a committed, fully functional neuronal state. Thus, pluripotency may reflect not only an unrealized potential for alternate fates, but also a novel "soft-off state" for non-stem cell genes.

Human embryonic stem cells (hESCs) exhibit unusual nuclear structure and epigenetic characteristics that change during development. Initially, hESCs exhibit low levels of histone and DNA methylation and little heterochromatin. Physical characteristics of hESC nuclei include high mechanical compliance, intranuclear chromatin movement, and increased histone hyperdynamics, leading to a more fluid nucleus in the pluripotent state. During differentiation, nucleus-wide changes in chromatin mobility and envelope organization occur. Deformation of somatic nuclei is resisted by both the envelope and chromatin, with chromatin potentially acting as a force-bearing element, suggesting that chromatin mobility may serve as an indicator of transcriptome plasticity. Recent work suggests that chromosome domains and gene loci are silenced at multiple levels including the nucleus, chromatin, histones and DNA sequence. The unique organizational characteristics of hESC nuclei and histones may reflect global epigenetic factors that allow uncommitted cells to express different transcriptomes. As plasticity is progressively restricted during differentiation, epigenetic mechanisms at the level of the nucleus and chromatin may reduce the potential for cross-fate switches. Thus, nuclear plasticity in ESCs provides a novel structural foundation for pluripotency and maturation of the nucleus provides epigenetic mechanisms for fate commitment.

In certain aspects, a method for determining the differentiation state of a test cell may comprise obtaining an image of a nucleus in said test cell; measuring one or more textural features in said image; and comparing said one or more textural features with corresponding textural features derived from one or more reference cells which are representative of one or more corresponding predetermined differentiation states, whereby the differentiation state of the test cell is determined.

One exemplary textural feature of a cell nucleus is granularity. A recent study (Mangoubi, Desai, Lowry, and Sammak, 2008) provides evidence that granularity changes during differentiation. In pluripotent cells, nuclei are small and chromatin is generally smooth-textured. During differentiation, however, chromatin becomes more granular, and differentiated stem cells appear nearly as granular as adult human vascular endothelial cells. Pluripotent nuclei are physically very plastic and become less pliant during differentiation due in part to chromatin condensation. Condensed, compact chromatin supercoiling limits accessibility of DNA to soluble proteins. Chromatin condensation is biologically significant because transcription factors and activators need to have access to DNA in order to express genes. The granularity of chromatin therefore reflects the segregation of the nucleus into domains of high density and low density. Since heterochromatin, which is compact and dense, generally contains silenced genes, analysis of granularity or any other textural feature may provide a direct measure of the degree of gene silencing by chromatin remodeling. High levels of granular chromatin in the nucleus are indicative of an advanced state of differentiation.

Because granularity reflects chromatin condensation, measurements of chromatin condensation may be used to determine the differentiation state of a cell. In certain aspects, a method for determining a differentiation state of a test cell comprises obtaining an image of a nucleus in said test cell; measuring chromatin condensation in said nucleus; and comparing measurements of chromatin condensation with corresponding measurements derived from one or more reference cells which are representative of one or more corresponding predetermined differentiation states, whereby the differentiation state of the test cell is determined. Here, the presence of highly condensed chromatin correlates with an advanced state of differentiation, while the presence of highly uniform chromatin correlates with a primitive state of differentiation, or, alternately, with a primitive degree of transformation of a cancer cell.

In certain aspects of the present disclosure, test cells may be pluripotent stem cells, multipotent stem cells, or terminally-differentiated cells. In some embodiments, the test cell may be a cancer cell or a cancer stem cell, which may be dedifferentiated from the normal somatic state. Cancer aggressiveness may be determined by evaluating the number and density of tumor cells with dense smooth chromatin, which is typical of dedifferentiated tissue. Such cells have been identified as stem-cell-like, and are believed to serve as a core source of mature tumor cells, in a situation directly analogous to normal stem cells which provide a source of new cells for normal tissue repair and maintenance in the body.

Regulation of Gene Expression

Gene expression is regulated by a hierarchy of genetic, epigenetic and nuclear mechanisms (O'Brien, Bult et al. 2003; van Driel, Fransz et al. 2003). In somatic nuclei, active transcription and replication domains are limited to discrete euchromatic foci and are not distributed throughout the nucleus (Hassan, Errington et al 1994; Ahmad and Henikoff 2002). Gene silencing is regulated by nuclear architecture which controls histone modification, chromatin compaction and access to activators or repressors (Feuerbach, Galy et al. 2002; Teixeira, Dujon et al. 2002; Cai, Han et al. 2003). Silencing within heterochromatin by histone H3 lysine 9 (H3-K9) methylation (Grewal and Moazed 2003) and substitution of histone variants (Mizuguchi, Shen et al. 2004) is an important mechanism for gene inactivation. H3-K9 methylation recruits heterochromatin proteins 1 and 2 (HP1 and 2) to large-scale neighborhoods of inactive chromatin (Cheutin, McNairn et al. 2003; Pal-Bhadra, Leibovitch et al. 2004) that are condensed and maintained dynamically (Cheutin, McNairn et al. 2003). Recruitment of H3K9-specific methyltransferases, Suv39H1, to heterochromatin is partly dependent on HP1 which transiently interacts with Suv39H1 at heterochromatin (Krouwels, Wiesmeijer et al. 2005). FRAP studies of Suv39H1 show that a substantial population of Suv39H1 is immobile at pericentromeric heterochromatin, suggesting that Suv39l-11 may also play a structural role at pericentromeric regions (Krouwels, Wiesmeljer et al. 2005). Methylation of H3K27 is associated with facilitative heterochromatin. H3K27 trimethylation discriminates between genes that are expressed, poised for expression, or stably repressed, and therefore reflect cell state and lineage potential. Lysine 36 trimethylation marks primary coding and non-coding transcripts, facilitating gene annotation. Trimethylation of lysine 9 and lysine 20 is detected at centromeric satellite, telomeric and active long-terminal repeats, and can spread into proximal unique sequences. Lysine 4 and lysine 9 trimethylation marks imprinting control regions (Mikkelsen, Ku et al. 2007). The methyltransferases that are responsible in pluripotent or early differentiated hESC has not been determined, but Suv39h1,2 are responsible for H3-K9tme3 in mouse pericentromeric heterochromatin, G9A for Human H3K9me2 pericentromeric heterochromatin and G9a for methylation of H3K9 in euchromatin (Lam, Pazin et al. 2005; Lam, Boivin et al. 2006). Another hypothesis has been developed that H3K27 and H3K4 methylation act in a bivalent manner at conserved noncoding sequences to control expression of coding sequences within pluripotent cells (Bernstein, Mikkelsen et al. 2006).

Accordingly, in certain aspects, a method for determining a differentiation state of a test cell comprises measuring histone methylation in said test cell; measuring DNA methylation in said test cell; and comparing measurements of histone methylation and DNA methylation from said test cell with corresponding measurements derived from one or more reference cells which are representative of predetermined differentiation states; whereby the differentiation state of the test cell is determined. Histone methylation may be measured by methods known in the art. One exemplary method comprises using antibodies directed against methylated histone epitopes, followed by quantification of antibody binding using standard immunohistochemistry methods. Measurements of histone methylation may further comprise measuring methylation on lysine 9 on histone 3 (H3K9).

When the overall levels of H3K9 methylation and DNA methylation change, the localization of H3K9 methylation and DNA methylation also changes. Increased levels of H3K9 methylation in test cells, as compared to levels in pluripotent stem cells, are indicative of cell differentiation, while increased levels of H3K9 methylation at the peripheral edge of a test cell, as compared to levels in pluripotent stem cells, are also indicative of cell differentiation. Increased levels of DNA methylation in a test cell relative to a pluripotent stem cell are indicative of cell differentiation, while DNA methylation at distal chromosome arms during interphase, during prophase, or during anaphase in the test cell, as compared with a pluripotent stem cell, is also indicative of cell differentiation. In some embodiments, an increase in the incidence of colocalization of methylated DNA and methylated histones in a test cell, as compared to a pluripotent stem cell, is indicative of cell differentiation. In some embodiments, methylation of DNA at centromeric and pericentromeric domains on chromosomes during interphase, prophase and/or during anaphase in the test cell is indicative of cell differentiation.

Movement of Chromatin

In somatic mammalian cells, photobleaching studies show that global positions of interphase chromosomes are surprisingly stable and localization of chromosomes to defined territories is tissue-specific (Parada and Misteli 2002; Misteli 2004; Parada, McQueen et al. 2004; Misteli 2005; Oliver and Misteli 2005). Chromosome position is set up early in G1 when nuclei show maximal plasticity and are stable thereafter (Walter, Schermelleh et al. 2003; Thomson, Gilchrist et al. 2004). Nuclear positioning of chromosomes and chromatin global organization has significance for regulation of gene loci (Misteli 2004; Misteli 2005). Chromosomes containing active gene loci are positioned centrally within the nucleus, while chromosomes containing inactive gene loci are positioned peripherally and are enriched in heterochromatin domains (Parada, McQueen et al. 2004).

In somatic cells, movement of interphase chromosomes is described as constrained Brownian movement (Marshall, Straight et al. 1997). Movement varies from a few gm in mitosis and early GI to 1 μm in late G1 through G2 (Walter, Schermelleh et al. 2003). In some instances, overall chromosome position is heritable, through mitosis, from one generation to the next. (Gerlich, Beaudouin et al. 2003). Histone binding in nucleosomes has high affinity for DNA, and there is little free nuclear histone protein (Peitz and Ross 1987). Exchange of core histones in somatic cells has been measured by fluorescence recovery after photobleaching (FRAP) of GFP-tagged protein. H3 and H4 do not measurably exchange (Kimura and Cook 2001), while there is some exchange of H2B with a mobile fraction of a few percent (Kimura and Cook 2001; Wachsmuth, Weidemann et al. 2003). Binding of the H2B/H2A dimer to DNA has lower affinity than H31H4 tetramer and H2B/H2A is actively displaced during transcription by regulatory proteins (Hirschhorn, Brown et al. 1992; Belotserkovskaya, Oh et al. 2003; Hanlon, Norris et al. 2003). Histone H2A/H2B dimers can be removed by chromatin remodeling complexes in an ATP dependent manner. These studies suggest that when interpreting GFP-H2B movement, we should not exclude mechanisms of H2B exchange that involve unbound protein complexes, constrained movement on DNA, movement of chromatin filaments or of whole interphase chromosomes.

Thus, in certain aspects, the rate of chromatin movement is more rapid in a pluripotent cell than in a differentiated cell. Accordingly, a method for determining a differentiation state of a test cell comprises measuring a rate of chromatin movement in said test cell; comparing said rate of chromatin movement with reference rates of chromatin movement corresponding to one or more predetermined differentiation states; whereby the differentiation state of said test cell is determined.

To measure chromatin movement, chromatin may be labeled and the persistence of labeled domains over a given time period can be measured. Chromatin may be labeled using DNA dyes, such as the vital DNA dye, Syto-16. Alternatively, the test cell may be transfected with a protein associated with a fluorescent label.

Exemplary proteins associated with a fluorescent label that may be suitable for measuring chromatin movement include GFP-Histone 2B (GFP-H2B) or GFP-Histone 3 (GFP-H3).

When chromatin proteins are associated with fluorescent labels, photobleaching experiments provide another means to measure movement of the labeled proteins. In fluorescence recovery after photobleaching (FRAP), a small portion of the fluorescent area is photobleached, and movement of labeled protein into the photobleached spot mediates "recovery." The time interval before the photobleached portion becomes fluorescent again is measured. In a similar paradigm, called fluorescence loss in photobleaching (FLIP), the loss of fluorescence in the region that has not been photobleached is measured. Both FRAP and FLIP result in quantifiable measures of movement of labeled chromatin and/or rate of chromatin component exchange.

Because chromatin movement is more rapid in a pluripotent cell than in a differentiated cell, a more rapid recovery of a photobleached region in the test cell relative to a differentiated cell is indicative of a pluripotent cell. Similarly, a more rapid loss of fluorescence outside of the photobleached region in a test cell relative to a differentiated cell is indicative of a pluripotent cell.

In addition to changes in the rate of chromatin movement during differentiation, the direction of chromatin movement also changes. Thus, in certain aspects, faster movements or an increased number of multi-directional movements of chromatin in a test cell as compared with a differentiated cell are indicative of a pluripotent cell. In some embodiments, slower or more parallel movements of chromatin in a test cell as compared with a pluripotent cell are indicative of a differentiated cell.

In some embodiments, the magnitude of chromatin intensity may be used to determine the differentiation state of a test cell. In some embodiments, a method for determining the differentiation state of a test cell comprises measuring a magnitude of chromatin intensity in said test cell and comparing said magnitude of chromatin intensity with reference magnitudes of chromatin intensity corresponding to one or more predetermined differentiation states; whereby the differentiation state of said test cell is determined. An increase in the magnitude of chromatin intensity may reflect increased levels of condensed heterochromatin in differentiated cells.

The images used to measure chromatin movement or chromatin intensity may be acquired over time, and two or more images may be acquired at intervals of 0 minutes, 30 minutes, or 60 minutes.

Mechanical Deformability

Nuclear organization and structure correlates with mechanical stiffness. The nucleus of a pluripotent cell is more flexible than the nucleus of a differentiated cell, and shows a higher degree of mechanical deformability. In certain aspects, this difference in mechanical deformability may be used to determine the differentiation state of a test cell. Such a method comprises deforming a nucleus in said test cell; measuring a magnitude of deformation of said nucleus in response to a mechanical force (or any other suitable deforming force); and comparing the magnitude of deformation of said nucleus (e.g., relative to the magnitude of the applied force) to corresponding measurements derived from one or more reference nuclei representative of predetermined differentiation states; whereby the differentiation state of said test cell is determined. In some embodiments, relative deformability may be determined by aspirating cells in a pipette and calculating the distance that aspirated cells move into the pipette.

Extraction of Chromatin

Using techniques known in the art, histones and heterochromatin binding proteins can be extracted with detergents or salts. In these experiments, the strength of protein-DNA interaction for some chromatin elements, such as histones and histone binding proteins, may be weaker in undifferentiated cells than in differentiated ones. Thus, some chromatin components can be extracted from hESCs at lower salt astringency than the astringency required for extraction of the same components from differentiated cells.

Based on this difference, certain aspects of the present disclosure provide a method for determining a differentiation state of a test cell. In some embodiments, the method comprises extracting chromatin components from said test cell in detergent and salt solution; ascertaining an astringency of salt solution sufficient to extract said chromatin components; and comparing the astringency of said salt solution required to extract said chromatin components from said test cell with corresponding astringency values associated with one or more predetermined differentiation states; whereby the differentiation state of said test cell is determined. In some embodiments, a requirement for lower salt astringency to extract chromatin components from the test cell relative to a requirement for a differentiated cell is indicative of a pluripotent cell. In some embodiments, the chromatin components may be selected from a list comprising HP1α, HP1β, or GFP-H2B.

Modification of Histone Activity

Chromatin dynamics, motility, and morphology change when a pluripotent cell undergoes differentiation. Coincident with these changes, expression of proteins that modify the activity of histones also changes. For example, the histone deacetylases HDAC1 and HDAC2 are absent from pluripotent hESCs, and expression of these proteins begins early in differentiation.

In addition to well-studied post translational histone modifications, histone variants and histone chaperones are important in the epigenetic control of gene expression (Korber and Horz 2004; Armstrong 2007). The chaperone, Nap-1, and the remodeling protein, CHD-1 in yeast, play a global role at transcriptionally active promoters to regulate nucleosome density and DNA binding (Walfridsson, Ithorosjutina et al. 2007). Nap-1 is well studied and has a role in nucleosome assembly and disassembly (Zlatanova, Seebart et al. 2007). Nap-2 binds histones in a DNA-independent complex and can regulate DNA supercoiling in an ATP-dependent manner (Rodriguez, Pelletier et al. 2000; Abeyta, Clark et al. 2004). Anti-silencing function protein 1(ASF-1) chaperone for 1-13 interferes with H3 binding to the H3/H4 nucleosome complex (Mousson, Lautrette et al. 2005; Recht, Tsubota et al. 2006) and its deletion in yeast leads to increased supercoiling and, paradoxically, increased acetylation of H3K9 (Adkins and Tyler 2004). Nucleosome assembly stimulated by ASF-1 is opposed by another chaperone, HIR, and the pair work together during transcription to expose DNA, to polymerase II and then repackage DNA (Kim, Seol et al. 2007). Chromatin assembly factor 1 (CAF-1) and Rtt106p are chaperones for H3 and H4 that may be necessary for heterochromatin formation at telomeres in C. cerevisiae (Huang Thou et al. 2005; Huang, Thou et al. 2007). The linker histone H1 is essential for mouse differentiation (Meshorer, Yellajoshula et al. 2006) and its chaperone, NASP, is essential for embryonic development and human cell proliferation (Richardson, Alekseev et al. 2006). Assembly of centromeric variant CenH3 into heterochromatin domains requires a specific chaperone, RbAp48, that acts independently of chaperones for non centromeric H3 variant CenH3 (Furuyama, Dalal et al. 2006; Bloom 2007; Ekwall 2007). Centromeric heterochromatin is also maintained by the chromatin remodeling complex, and facilitates chromatin transcription (FACT), independently of RNAi (Laribee, Fuchs et al. 2007)

Accordingly, the presence and/or the activity level of proteins that modify histone activity may serve as an indicator of the differentiation state of a call. In certain aspects, a method for determining a differentiation state of a test cell comprises quantifying levels of chaperone proteins NAP1 and ASF1 in said test cell; and comparing said levels of said chaperone proteins with levels of chaperone proteins derived from one or more reference cells representative of predetermined differentiation states; whereby the differentiation state of said test cells is determined.

Immunostaining of Nuclear Proteins

Immunostaining of nuclear proteins is a technique that may be used to evaluate heterogeneous hESC colonies for chromatin reorganization during differentiation. Not all immunostaining methods are optimized for detection of chromatin and other nuclear proteins. In some embodiments, a method for detecting chromatin proteins or chromatin binding proteins in a cell comprises prefixing the cell with paraformaldehyde; immunostaining said chromatin proteins or chromatin binding proteins, postfixing the cell, e.g., under alkaline conditions or in methanol; and detecting said chromatin proteins or chromatin binding proteins. In some embodiments, the pH and the temperature of the immunostaining solutions may be varied. Exemplary antibodies for immunostaining nuclear proteins may be selected from H3K9me3, H3K9ach, HDAC1, HDAC2, Lamin, Crest, Oct-4, Nestin, HP1 alpha, HP1 beta NAP1, ASF1, lamin or emerin.

Detection of Protein-DNA Binding

In some embodiments, the binding of proteins to chromatin may be detected using fluorescence resonance energy transfer (FRET) between proteins labeled with GFP and DNA labeled with fluorescent dyes. Exemplary DNA labels include syto orange 83 and Sytox orange.

In fixed, lysed cells FRET has been demonstrated with Sytox orange, a membrane impermeable dye (Cremazy, Manders et al. 2005). The dynamics of chromatin—protein interactions may be measured in living cells using the membrane permeable dye Syto 83. Patterns of FRET intensity may be distinguished within the nucleus, depending on the physical distance between protein and DNA, rather than the concentration of a fluorescent reporter.

Measuring Cell Differentiation, Growth and Death by Non-Invasive Video Microscopy In some embodiments, cells may be assayed for differentiation state without damaging cells and/or removing them from the growth media. Non-invasive techniques permit continuous monitoring of cells without contacting the cells, so that cells and/or colonies do not need to be mechanically separated from other cells or from the well where they are growing. Use of non-invasive methods also eliminates the need to remove a sample of cells for further processing, such as immunostaining or fixation for microscopy. Often, cells must be permeabilized and fixed before their features can be analyzed, or cells must be labeled with small molecule dyes and/or molecular probes. This means that select cells are sacrificed for analysis, and are assumed to be representative of the whole population with which they grew. Thus, it may not be possible to monitor the progress of differentiation of a specific cell or colony, and one would instead be forced to rely on an approximation, based on the cells assayed. Since cells within even a homogeneous population do not always differentiate at the same rate, the invasive sampling methods may not be suited for purposes where cells at a precise state of differentiation are needed.

Using non-invasive methods described herein, the growth, differentiation, and/or of stem cell cultures may be monitored and the differentiation state of the cells may be determined by taking images of the cells and processing image information according to the methods described below. Cells may be sampled from the population for analysis, or specific cells and/or colonies may be monitored continuously over a period of time. In one exemplary embodiment, images may be obtained by phase contrast microscopy of live cells or cell colonies.

In some embodiments, one criterion for identifying the induction of trophectoderm, neurectoderm, or progeny cells thereof during differentiation is colony morphology. Morphology may be determined non-invasively permitting measurement of cells that are not perturbed by fluorescent live-cell markers. Non-invasive methods are described for screening large numbers of cells for morphology to identify newly differentiated trophectoderm or neurectoderm. In other embodiments, texture of differentiated trophectoderm, neurectoderm, or progeny cells thereof, may be detected by wavelet analysis (Mangoubi et al., 2007; Sammak et al., 2008) and discriminated against either stem cell progenitors or against feeder fibroblasts. Further, the colony texture of stem cells may be distinguished from the colony texture of stem cells with trophectoderm morphology or neurectoderm morphology. Further, video microscopy can be used to measure the mitotic index and death rates of stem cell colonies. Thus, in some exemplary embodiments, an algorithm design is used to measure one or more (1, 2, or 3) of growth, death and reprogramming morphology during the induction of differentiation under various conditions. The process may be repeated so that cells are iteratively imaged and processed, and the methods may be automated.

Image Analysis

A variety of image analysis methods may be used to identify cells differentiating form stem cells into trophectoderm, neurectoderm, and progeny cells. The methods are detailed in U.S. Pat. No. 7,711,174, U.S. patent application Ser. No. 12/321,360, and U.S. patent application Ser. No. 12/904,158, the contents of which are incorporated by reference herein in their entirety.

It is important to determine when the cells have differentiated to trophectoderm or neurectoderm, or further down these lineages. In some embodiments, image analysis methods may be performed on images of cells. The image collection may be non-invasive or minimally invasive, such that images of the same one or more cells can be analyzed at different time points, without injuring the cell or disrupting its growth. Moreover, real-time imaging of differentiation state may be performed, in order to monitor the extent of differentiation in a given population and/or assess the effects of an environmental change on deprogramming of the cells. Without destruction of cells or addition of exogenous markers, colonies may be continuously evaluated either for kinetics of growth and differentiation and/or for quality control before therapeutic treatment.

In some embodiments, trophectoderm, neurectoderm, and progeny cells thereof are distinguished from parent cells on the basis of their morphology. In addition, the nuclear organization and colony organization of each respective cell type may provide a basis for distinguishing between cells. In some embodiments, differentiated cells or colonies of differentiated cells are identified in a non-invasive and non-destructive fashion using statistical multiresolution texture image analysis. Colonies may be imaged with microscopy techniques known in the art. In some embodiments, phase contrast microscopy is used. Using image-based algorithms, differentiated colonies can be identified and statistically distinguished from differentiated colonies and their exteriors (Mangoubi et al., 2007; Sammak et al., 2008; Desai et al., 2009; Mangoubi et al., 2008).

Texture is a quantifiable method for measuring amorphous, non geometric properties of cell morphology, particularly nuclear and cytoplasm size and edges. Different cell biological functions are reflected in cell size and shape, and so cell morphology is an integrated measure of stem cells and differentiated cell products. Morphology alone may be insufficient to determine the activity of specific molecules, but is often sufficient to determine cellular phenotype based on molecular activity. Statistical multiresolution texture analysis is a non-destructive optical method for discriminating and classifying images of stem cells, colonies, and/or differentiated. In the case of colonies, no chemical is required.

The texture classification algorithms described herein may be used for various hESC lines, or for trophectoderm and/or neurectoderm cells and lineages, under a diversity of culturing conditions. The results may be validated using molecular markers of pluripotency and differentiation. For example, the quality of trophectoderm or neurectoderm derivation methods may be evaluated by non-invasive kinetic methods, and/or the quality of trophectoderm, neurectoderm, and/or progeny cells thereof may be assessed by quantitative immunostaining of single cells with a pluripotency marker panel and epigenetic marker panel.

In some embodiments, kinetic characteristics of living cells may be compared in order to determine differentiation intermediates as stem cells differentiate along trophectoderm or neurectoderm lineages. Cell quality may be verified at early stages with molecular panels of pluripotency and epigenetic markers. This approach may use, in certain embodiments, methods of texture analysis of static images and/or time-lapse images to enable the extraction of kinetic features and help reveal the appearance of newly-differentiated cells. Notably, statistical methods may be used for simultaneous smoothing and segmentation (Park et al., 2009) of small size heterogeneous textures with subregions of irregular shapes. For example, distinct pluripotent morphologies may be identified in colonies that are very small, like the colonies produced just after passaging, and/or morphologies in cells that are dispersed as single cells.

Notably, image based algorithms may also be used for images of stained nuclei, and may be used to classify chromatin organization in single pluripotent cell nuclei (Desai et al., 2009; Mangoubi et al., 2008). In certain embodiments, the algorithm is automated and incorporated into a method for i) identifying and separating differentiated trophectoderm, neurectoderm, or progeny cells thereof from background cells, and ii) providing quantitative colony features.

The Matrix Edge Onion Peel Algorithm

Algorithms for texture analysis usually require that regions to be analyzed be sufficiently large to contain rectangular subregions of relatively homogeneous subtextures. However, single cells, for example, stem cells or differentiated trophectoderm, neurectoderm, or progeny cells thereof may not afford such luxuries; subregions are small, heterogeneous, and of irregular shapes. Analysis of such shapes requires an improved algorithm suited to these colonies. Described herein is a Matrix Edge Onion Peel (MEOP) algorithm (Desai et al., 2009), an approach that may be used to distinguish stem cells nuclei from nuclei of differentiated cells. The methodology quantitates and examines textures that are heterogenous and arbitrarily shaped. For such textures fitting regularly sized rectangular windows of sufficient lengths and width is not possible. The Onion Peel method successfully recognizes layers within the nuclei, and extracts statistics whose values are specific to either differentiated and pluripotent cells. Specifically, the MEOP approach addresses three challenges regarding textures attributed to single cells or stem cells: 1) small size, 2) heterogeneity, and 3) irregularly shaped regions. This algorithm may be used to identify stem cells and/or colonies on the basis of their texture. In some embodiments, where textural regions are sufficiently large, a texture wavelet analysis algorithm may be used, but combined with an MEOP algorithm for textural regions of small size.

The matrix edge at each pixel may be used to extract variety of statistical measures, such as the associated eigenvector and eigenvalues of matrix edge or equivalently associated ellipsoid. The attributes include the orientation of eigenvectors, the eigenvector (or aspect) ratio, fractional anisotropy, trace, and determinants which are all quantitative features whose spatial statistical distribution can be used for classification. By comparing the value of these edge related statistics of borders of pluripotent and differentiated cells, the edges of pluripotent cells were found to be thick, with no small size discreet regions. The interior of pluripotent cells show linear edge structures that are not closed, as is the case for discrete objects in the interior. The edges of differentiated cells were found to be thinner, and to contain discrete objects inside the cell region.

The MEOP methodology overcomes the limitation of other texture analysis methods when dealing with heterogeneous textures that exhibit onion layer type textural variation. Here, the behavior within a layer is assumed to be homogeneous, although there may be variation between layers. The shape of the onion layers is data dependent; radial symmetry is not required. An energy functional approach may be used for simultaneous smoothing and segmentation. The approach relies on two features: a matrix edge field, and adaptive weighting of the measurements relative to the smoothing process model. The matrix edge function adaptively and implicitly modulates the shape, size, and orientation of smoothing neighborhoods over different regions of the texture. It thus provides directional information on the texture that is not available in the more conventional scalar edge field based approaches. The adaptive measurement weighting varies the weighting between the measurements at each pixel.

Matrix Edge Field and Adaptive Weighting:

The variational formulation Consider the variational optimization problem $$\min_{u,V} E(u, V \mid \alpha, \beta, \rho)$$

Where E is the integral of the region R, the image region $$E(u, V \mid \alpha, \beta, \rho) = \int_g \left[ \alpha u_x^\tau (1-V)(1-V)^\tau u_x + \beta \|u - g\|^2 + \frac{\rho}{2} F(V_x) + \frac{G(V)}{2\rho} \right] dX$$

and g is the input image to be smoothed, u and V are respectively the smoothed image and associated 2×2 symmetric edge matrix field, respectively, X represents the 2D space on which g, u, V, are defined. In the above, subscript X represents the spatial gradient operator. The first term is a smoothness fidelity term that penalizes by (1−V) the gradient of u, so that smoothing occurs only on pixels not situated on edges. The second term is a data fidelity term penalizing deviations of smoothed data from input data. The scalar terms G(V) penalize edge strength, while $F(V_x)$ requires that edges be smooth, while still recognizing kinks.

In the formulation of (Okita et al., 2007), the matrix edge field is a generalization of previous formulations, such as those in Mumford et al., 1985 and Ambrosio et al., 1990, where a scalar edge field V(X) is used. A scalar edge field modulates the size of the circular neighborhood over which local smoothing takes place, whereas the more general matrix edge field modulates size, shape, and orientation with an elliptical local smoothing neighborhood. As such the smoothing is more effective.

The Neighborhood Shape, Orientation and Size.

Figure 32:
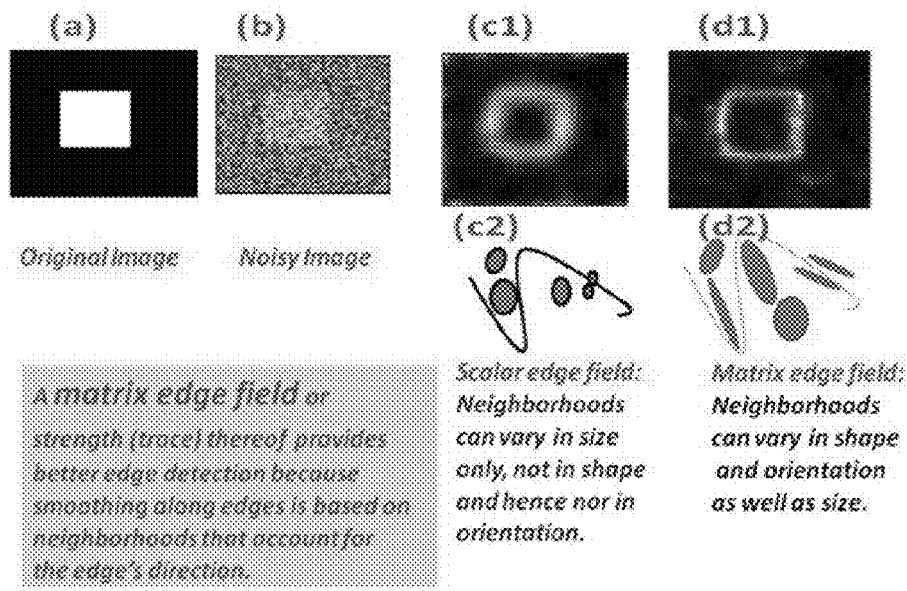
FIG. 32 illustrates the Matrix Edge concept. (a) Noise free image of a square, (b) image corrupted by spatially varying high intensity noise (noise in upper left corner of square much stronger than in other corners), processed (c1) with conventional segmentation, the edges are blurred as (c2) neighborhoods over which local smoothing takes place vary locally in size only, while with (d1) Matrix Edge segmentation, the edges are much improved thanks to (d2) the ability to vary, in addition to size, the shape and orientation of local neighborhoods.

In the process of simultaneously smoothing and segmenting a heterogeneous texture, two features of the algorithm are its ability to i) define local neighborhoods of different shapes and orientation, and not just of different size as is the current practice, thus providing finely segmented images, and ii) adapt to spatially varying noise. Because of these features, it is possible to segment images with narrow regions with a small number of pixels. FIG. 32 illustrates the effect of matrix edge segmentation, meaning the use of smoothing neighborhoods that vary in size, shape and orientation when compared to just size.

Figure 33:
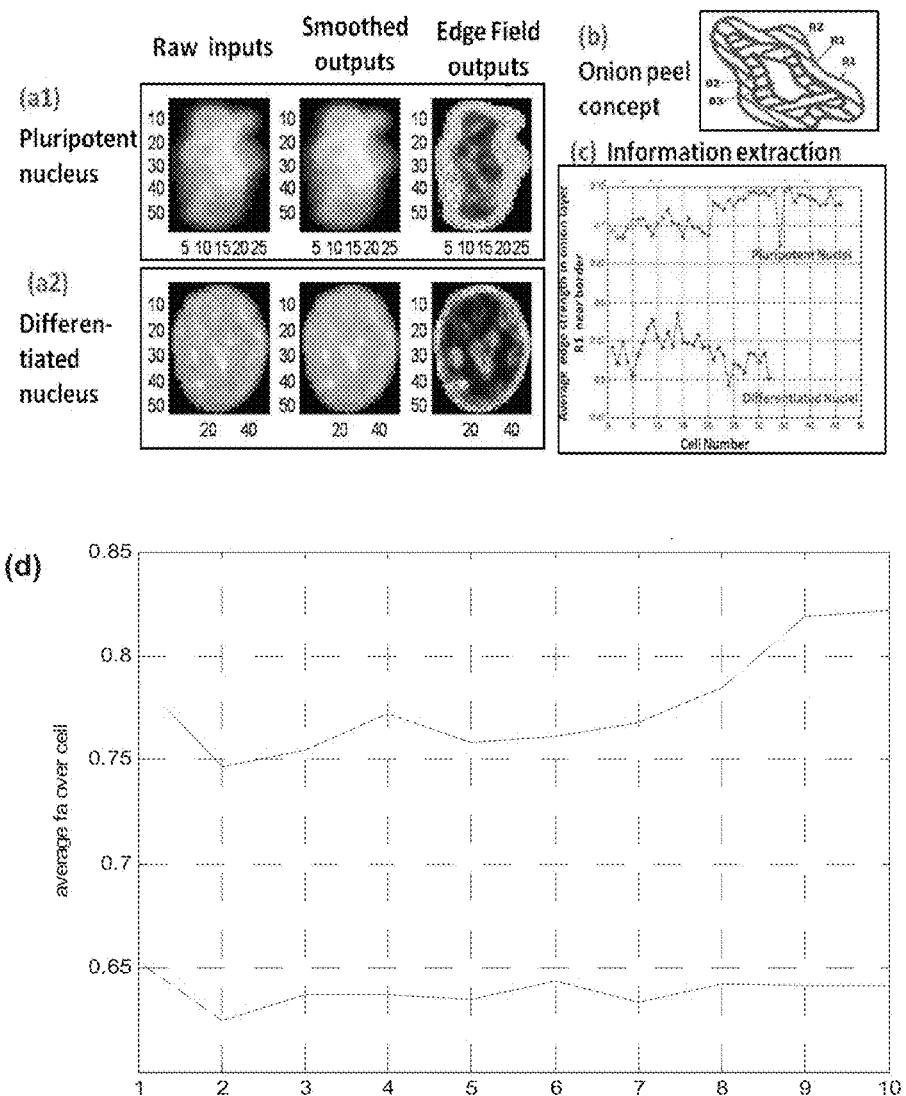
FIG. 33 shows the application of Matrix Edge and Onion Peeling to stem cell nuclei. (a) Raw input (left column), smoothed (middle), and edge field (right) output images of pluripotent (top) and differentiated (bottom) nuclei. Matrix edge field output (right column) is rich in spatially varying details. Layers of the edge field image are to be extracted as if (b) peeling an onion and quantitated to (c) extract numerical features whose values are different in pluripotent (top curve) and differentiated nuclei (bottom curve).
Figure 36:
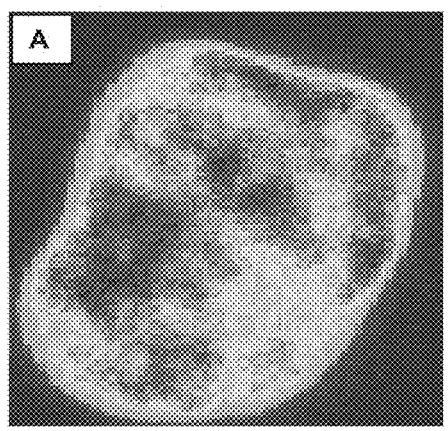
FIG. 36 illustrates different output images obtained using the matrix edge as described herein. Each of these outputs can generate multitudes of statistical features, either from onion peeling or otherwise.
Figure 36:
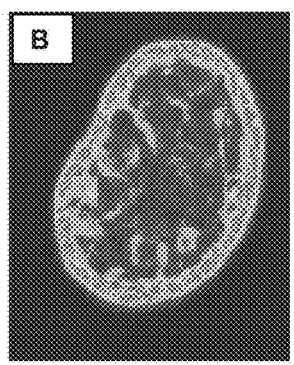
Figure 36:
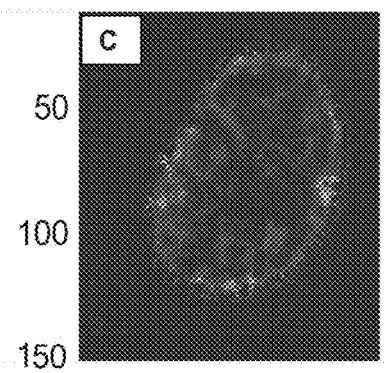
Figure 36:
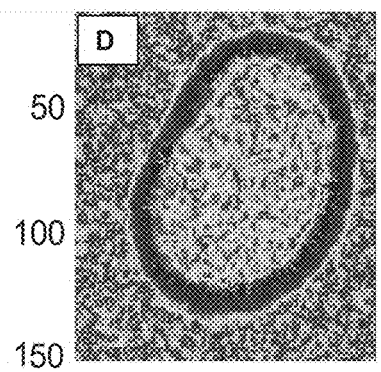
Figure 36:
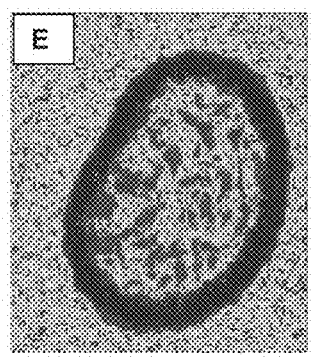
Figure 36:
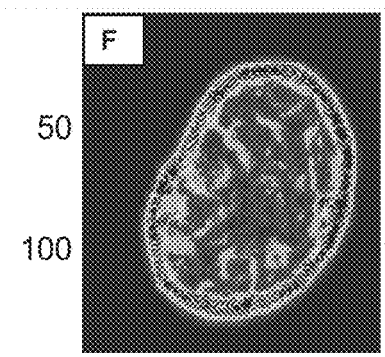
Figure 36:
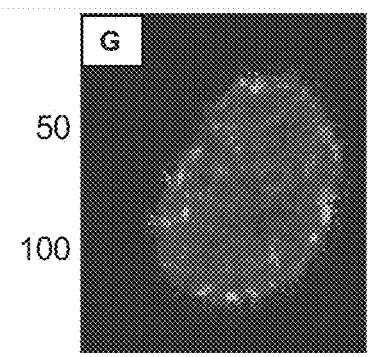

FIG. 33 illustrates the application of an early version of the matrix edge algorithm to stem cell nuclei, and explains another element: onion peeling of a heterogeneous texture. This algorithm may be used to track a small size cell once detected, and to analyze its texture once it grows to a minimum size or differentiates along a trophectoderm or neurectoderm lineage and exhibits a different texture. Finally, the algorithms may provide features and statistics, such as fractional anisotropy (fa), as shown in (FIG. 33d). This is but one example of a useful quantitative feature for comparing, evaluating, and stem cell induction methods in a noninvasive, non-destructive fashion. FIG. 36 illustrates different output images obtained using the matrix edge as described herein. Each of these outputs can generate multitudes of statistical features, either from onion peeling or otherwise. FIG. 36A shows the input image, and FIGS. 36B-G show six exemplary output images.

Image Analysis Methods: Nonparametric Methods

In some embodiments, nonparametric methods for segmenting and classifying cell nuclei may be used. This approach, which enables automatic monitoring of stem cell growth and differentiation into trophectoderm, neurectoderm, and progeny cells thereof, is based on combining level set methods, multiresolution wavelet analysis, and nonparametric estimation of the density functions of the wavelet coefficients from the decomposition. Additionally, to deal with small size textures where the largest inscribed rectangular window may not contain a sufficient number of pixels for multiresolution analysis, an adjustable windowing method may be used in order to enable the multiresolution analysis of elongated and irregularly shaped nuclei. In some exemplary embodiments, the adjustable windowing approach combined with non-parametric density models yields better classification for cases where parametric density modeling of wavelet coefficients may not be applicable or may be applicable but less robust.

Multiresolution texture analysis can be an effective methodology for retrieving (Do and Vetterli, 2002) and classifying textures (Mangoubi et al., 2007) and is particularly successful in classifying stem cell colonies, where textural properties are a qualitative indication of the degree of pluripotency (Mangoubi et al., 2007). Albeit non-invasive, traditional colony analysis by a microscopist is expensive, subjective, and slow, requiring the attention of a trained specialist. Alternatively, while chemical staining is rapid, automatable, and consistent, it is destructive, rendering the stained elements unfit for use in tissue growth or drug testing.

By contrast, image based stem cell colony texture analysis is automatable, non-invasive, consistent, and preserves the colony for subsequent biomedical use. Furthermore, it allows for multiscale qualitative monitoring of stem cell growth and differerentiation at multiple spatiotemporal resolutions. At the nuclei resolution level, even though staining is required, the image based methodology is nevertheless of use in quantitatively classifying nuclei of stem cells or differentiated cells in an automated, consistent, and rapid manner (Mangoubi et al., 2008). As with colony analysis, such quantitation can be of use in understanding the effect various proteins have on the ability to maintain pluripotency and direct differentiation.

In the above references, statistical multiresolution wavelet texture analysis was shown to be effective when combined with a parametric statistical model, the generalized Gaussian density (GGD), used to represent the wavelet coefficients in the detail subbands. Parametric statistical multiresolution wavelet analysis as previously implemented, however, has limitations: 1) it requires a user to manually select rectangular, texturally homogeneous regions of sufficient size to enable texture analysis, and 2) it assumes the distribution of coefficients is symmetric, unimodal, and unbiased, which may be untrue for some textures. As described above, the Matrix Edge Onion Peel algorithm may be used for small size irregularly shaped nuclei that exhibit "onion layer" textural variation, i.e. texture characteristics that change as a function of the nuclear radius.

In some embodiments, an algorithm may be used to automatically segment the nuclei, and an adjustable windowing method may be used in order to maximize the number of coefficients available from the multiresolution decomposition of a small, irregularly shaped (i.e. non rectangular) region. These steps enable the automatic analysis of images with multiple stem cell nuclei, eliminating the need for a human to manually select windows in order to perform texture analysis. Finally, a non parametric statistical analysis may be applied to cases where the parametric GGD model is inapplicable. This step yields superior performance over the parametric model in cases where the latter is not applicable.

Four non-Gaussian methods are exemplary of non-Gaussian methods that may be used for estimating the statistical dissimilarity and can be applied to classify one or both of time-series images of individual cells and phase contrast images of entire hESC colonies.

Texture Analysis: Wavelet-Based Texture Model

It was noted early on (Mallat, 1989) that the empirical probability density function (pdf) of the coefficients in each of the wavelet detail subbands often resembled the symmetric, unimodal generalized Gaussian distribution:

$$f(x; \alpha, \beta) = \frac{\beta}{2\alpha\Gamma(1/\beta)} e^{-(|x|/\alpha)^\beta}$$

Here, x is the random variable (detail coefficient), and $\alpha$ and $\beta$ are the width and shape parameters which define the density.

This statistical correspondence suggests a texture model—the set of estimated GGDs characterizing the wavelet detail subbands of a texturally homogeneous region. While this model assumes both statistical independence across subbands and the absence of texturally relevant information in the approximation band, it has been validated for several textures, and techniques for calculating the $\alpha$ and $\beta$ parameters have been developed for use in content-based image retrieval by Van de Wouwer et al. (1999) and Do and Vetterli (2002). The method has been successfully applied to stem cell image classification (Mangoubi et al., 2008; Mangoubi et al., 2007).

In some embodiments, the GGD model becomes inapplicable at wider scale subbands. Consider the image in FIG.

Figure 34:
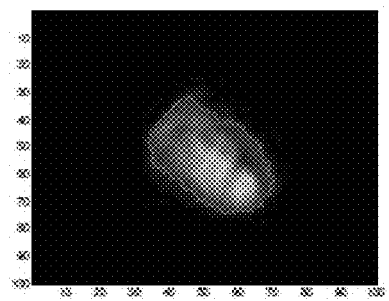
FIG. 34 shows a stem cell nucleus. (a) segmentation of the nucleus, blue contour indicates identified nuclear region; (b) the image normalized (note that the brightest region is to the bottom right); (c) locus of internal window centers at each decomposition level, red are the internal windows at level 3, orange at level 2, green at level 1; (d) Parzen vs. GGD estimate of the coefficient distribution in the third horizontal subband.
Figure 34:
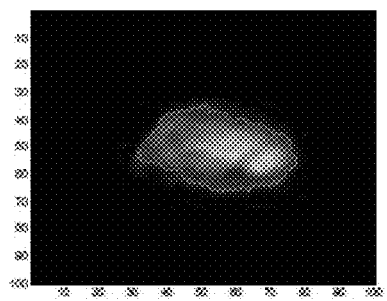
Figure 34:
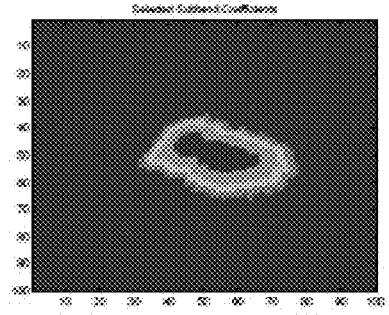
Figure 34:
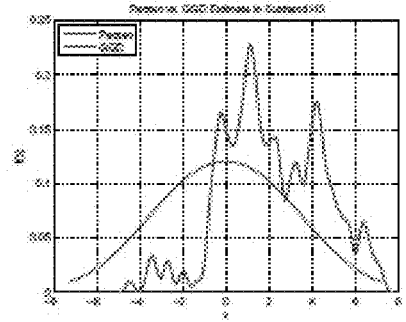
Figure 35:
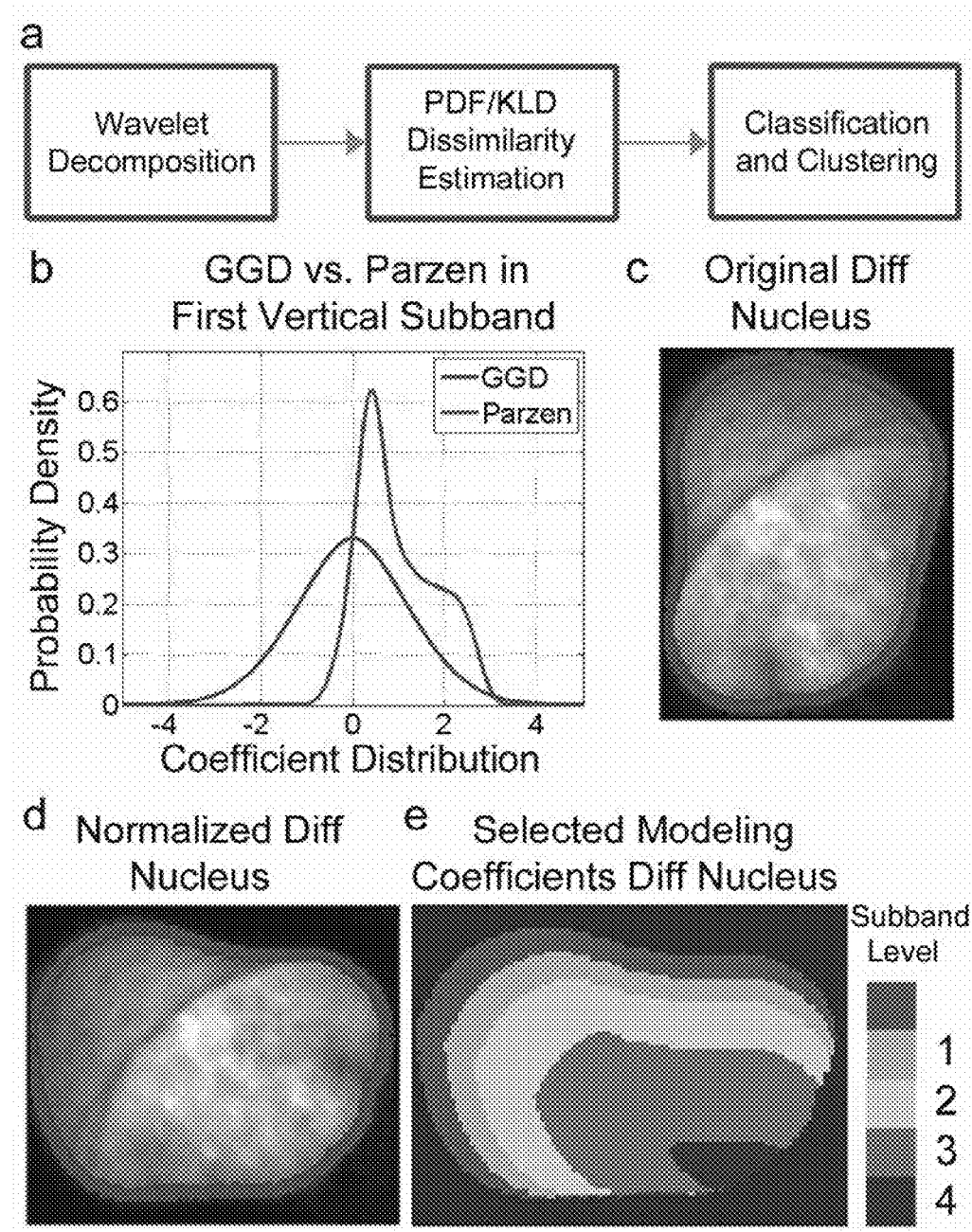
FIG. 35 shows adaptive windowing and texture analysis. (a) Conceptual flow diagram for three-state textural classification. (b)-(e). Textural analysis of early differentiated nucleus. (b) Parzen vs. GGD estimate of the coefficient distribution in the first vertical subband of d; (c) segmentation of the nucleus, blue contour, indicates the identified nuclear region; (d) the normalized image (note that the brightest region is to the bottom right); (e) modeling coefficients selected at each decomposition level (red are the coefficients for level 4, orange at level 3, and yellow at level 2, and cyan at level 1; light blue are interior to the cell but exterior to level 1; dark blue is exterior to the cell). (f)-(g) as (c)-(d) but for a pluripotent cell.

34b, which displays a noticeable increase in mean intensity while moving from left to right. As may be seen in the pdf plot in FIG. 34d, this gradient couples into the third horizontal subband, leading to a wavelet coefficient distribution that is noticeably biased and hence poorly modeled by the GGD, which is constrained to be symmetric about the origin. This is accounted for by modeling the coefficient pdf using a Parzen density estimator with Gaussian kernel (Thompson and Tapia, 1990), effectively transforming the coefficient histogram into a pdf via Gaussian smoothing:

$$f(x; \{xi\}, \sigma^2) = \frac{1}{N\sqrt{2\pi\sigma^2}} \sum_{i=1}^{n} \exp\left(\frac{(x-x_i)^2}{2\sigma^2}\right)$$

Again, x is the random variable (detail coefficient), while $\{x_i\}$ is the set of N detail coefficients calculated for a particular subband. The width parameter σ modulates the kernel's effective smoothing radius, set equal to a constant fraction of the histogram support in order to normalize across subbands.

As the texture model is the set of estimated pdfs for each subband, the dissimilarity measure between models is based on the Kullback-Leibler divergence (KLD), which is defined between two pdfs $f_1$ and $f_2$ as:

$$D_{KL} = \int f1(x) \log \frac{f_1(x)}{f_2(x)} dx$$

The KLD is asymmetric, but a symmetric version is obtained using $KLD_{sym}(1, 2) = D_{KL}(1, 2) + D_{KL}(2,1)$. This distance is then summed across the detail subbands. When using the Parzen model, the KLD may be determined via numerical integration.

i) Adaptive Windowing for Coefficient Extraction from Small, Irregularly Shaped Regions Here, it is possible to develop segmentation masks as restricted to regions of interest (ROI), so that attributes may be restricted from this region.

Wavelet pyramid analysis decomposes two-dimensional signals in square or rectangular regions. In many applications, this is acceptable; an image may be large enough to tile or to crop in order to isolate texturally homogeneous rectangular regions for modeling.

In some embodiments involving small or irregularly shaped objects, such as stem cell nuclei, however, isolating a rectangular region of appropriate size may not be possible. A highly plastic or mobile nucleus might exhibit an irregular shape that deforms considerably over time, preventing the identification of any rectangular region for analysis with sufficient size to estimate accurate statistics. Too, various matrix extension techniques (e.g. periodization, symmetrization, etc.) may introduce statistical artifacts.

In order to extract as many coefficients as possible from each subband of the multiresolution wavelet decomposition of such regions, we introduce adjustable windowing (Lowry et al., 2010). To explain the procedure, assume the existence of a segmentation mask indicating a region of interest within the image, and consider some particular pixel within the mask. If the pixels to the left, above, and diagonally up and to the left are also within the mask, then a 2×2 window whose bottom right corner is that pixel is also within the mask. Now, consider that 2×2 window. If the pixels immediately to its left, above it, and diagonally up and to the left are also within the mask, then a 3×3 window terminating at the initial pixel is entirely within the mask. This process may be iteratively continued to determine the maximum window length that may begin at a particular pixel and remain entirely within the mask.

More precisely, assume the existence of some segmentation mask $M_1$, in which the region of interest is marked 1 and the exterior 0. If a filter of length k is applied to the image, mask $M_k$ indicates the filtered outputs derived from information located entirely within $M_1$ and may be computed recursively as:

$$M_{k+1} = M_k^{0,0} \cap M_k^{0,1} \cap M_k^{1,0} \cap M_k^{1,1}$$

Here, $M_k^{i,j}$ denotes mask Mk right-shifted i pixels and down-shifted j pixels.

We then apply the stationary wavelet transform (SWT) (Pesquet et al., 1996), which up-samples the filter rather than down-sampling the output to the image, so that the detail subbands are identical to the original image in size. For base filter length $n_f$, the SWT decomposition window at level d has length:

$$k = 2^{d-1}(n_p - 1) + 1$$

Via the recursive process above, it is then possible to determine which coefficients belong solely to the region of interest at each level. This process is illustrated in FIG. 36c-e. FIG. 36c shows the original image. In 36d, it is rotated to place the cell's lightest quadrant in the bottom right so that any asymmetry in the wavelet decomposition will be biased to the right of the origin. FIG. 36 shows the coefficients selected at each decomposition level; red indicates level 4, orange level 3, yellow level 2, and cyan level 1.

ii) PDF and Textural Dissimilarity Estimation

In order to compute the dissimilarity between textural patches, a pdf estimator may be selected to apply to each of the 3n detail subbands, and then quantify dissimilarity using the information divergence (i.e. Kullback-Leibler divergence or KLD). While other divergence measures exist, such as the LI divergence ($\int |f_1 - f_2|$) and Bhattacharyya distance, the information divergence is especially convenient as it admits tractable closed-form solutions for two of our pdf models. For two pdfs f and g, the information divergence is defined:

$$D_{KL}(f \| g) = \int_{-\infty}^{\infty} f(x) \log \frac{f(x)}{g(x)} dx$$

For textures with n decomposition levels, the total dissimilarity between two models is:

$$KDL(\{f\}, \{g\}) = \sum_{t=1}^{gn} k_t (D_{KL}(f_t \| g_t) + D_{KL}(f_t \| g_t)$$

Generally, $D_{KL}(f\|g)$ {fourth root} $D_{KL}(g\|f)$, so both are added in order to regularize. Likewise, $\{k\}$ are simply weights assigned to particular subbands i. In general, we set all $k_i = 1$, but they might be used to emphasize or penalize certain bands according to prior knowledge.

A variety of different methods may be used to estimate the pdf of the wavelet coefficients and their corresponding KLDs; four exemplary methods are provided below. In practice, model selection involves trade-offs between computational simplicity (parametric models such as the GGD and SαS) and accuracy (more detailed, non-parametric models such as A-L and L-Q).

Generalized Gaussian Density (GGD) Models

It was noted early on (Mallat, 1989) that the pdf of the detail coefficients often resembled the symmetric, unimodal generalized Gaussian distribution (GGD):

$$f(x;\alpha,\beta) = \frac{\beta}{2\alpha\Gamma(1/\beta)} e^{-(|x|/\alpha)^\beta}$$

Here, x is the random variable (detail coefficient) and α and β are the width factor and shape parameter, respectively. Γ indicates the gamma function. The location parameter (i.e. process mean) is assumed to be zero.

The GGD may be used to model a wide variety of symmetric, unimodal density functions. Indeed, special cases include the Gaussian ($\alpha=\sqrt{2}\sigma$, $\beta=2$), Laplacian ($\alpha=\sigma/\sqrt{2}$, $\beta=1$), and uniform ($\beta\to\infty$) densities for standard deviation σ. The standard deviation of a GGD process is:

$$\sigma = \alpha\left(\frac{\Gamma(3/\beta)}{\Gamma(1/\beta)}\right)^{1/2}$$

The utility of this density function in texture characterization was shown in (Van de Wouwer et al., 1999) and (Do et al., 2002), who respectively developed moment-matching and maximum likelihood procedures for calculating α and β.

One of the key advantages of this method is that a closed-form solution exists for the KLD between two GGD processes (Do et al., 2002), simplifying computation:

$$D_{GGD}(f_1\|f_2) = \log\left(\frac{\alpha_2\beta_1\Gamma(1/\beta_2)}{\alpha_1\beta_2\Gamma(1/\beta_1)}\right) + \left(\frac{\alpha_1}{\alpha_2}\right)^{\beta_2}\frac{\Gamma(\beta_2+1/\beta_1)}{\Gamma(1/\beta_1)} - \frac{1}{\beta_1}$$

Symmetric Alpha-Stable (SαS) Density Models

Another density family used for texture classification is the symmetric α-stable densities (SαS), used to model distributions with heavier tail probability than allowed by the GGD. While multiple parameterizations exist for the characteristic function of the SαS, we follow type 2 from (Tzagkarakis et al, 2004):

$$\phi(\omega;\alpha,\gamma)=\exp(-\gamma^\sigma|\omega|^\alpha)$$

Here, ω is frequency, and a and y are respectively the characteristic exponent ($0<\alpha\leq 2$) and dispersion ($\gamma>0$). Like the GGD, we assume the location parameter is zero. Unlike the GGD, the pdf of the SαS only exists in closed form for a few special cases, including the Cauchy (α=1, scale γ) and Gaussian ($\alpha=2$, $\gamma=\sigma/\sqrt{2}$) distributions.

We therefore follow the method of (Tzagkarakis et al., 2004), who applied this density to texture analysis by noting that the normalized characteristic function $\hat\phi$ forms a valid pdf:

$$\hat\phi(\omega;\alpha,\gamma) = \frac{\alpha\gamma}{2\Gamma(1/\alpha)}\phi(\omega;\alpha,\gamma)$$

The closed-form KLD between two normalized SαS characteristic functions is:

$$D_{S\alpha S}(\hat\phi_1\|\hat\phi_2) = \log\left(\frac{\alpha_2\beta_1\Gamma(1/\beta_2)}{\alpha_1\beta_2\Gamma(1/\beta_1)}\right) + \left(\frac{\alpha_1}{\alpha_2}\right)^{\beta_2}\frac{\Gamma(\beta_2+1/\beta_1)}{\Gamma(1/\beta_1)} - \frac{1}{\beta_1}$$

SαS parameters may be calculated using the maximum likelihood method detailed in (Nolan, 1997) and (Veillete, 2009).

Ahmad-Lin (A-L) KLD Estimation

The above pdf families both assume that the distribution is symmetric with process mean at the origin. These assumptions are generally reasonable, especially as we normalize the image according to mean in pre-processing and the detail coefficients are the output of high-pass filters. In some cases, such as the hESC nucleus shown in FIG. 11e, a pronounced increase in intensity may be seen as one traverses the cell. This gradient couples into the wider-scale detail subbands, leading to coefficient distributions which are noticeably asymmetric and biased (2b) and are thus poorly modeled via either GGD or SαS distributions.

In some embodiments, it may be desirable to use a KLD estimator which makes no assumptions as to the shape of the underlying distribution. One exemplary embodiment is based on the Ahmad-Lin (A-L) entropy estimator (Ahmad, et al., 1976):

$$D_{A-L}(X\|Y) = \log\left(\frac{|Y|}{|X|} + \frac{1}{|X|}\right)\sum_{z\in X}\left[\log\sum_{z\in X}K(z-x) - \log\sum_{z\in Y}K(z-y)\right]$$

Here, X and Y are the two sets of detail coefficients, and |X| denotes the number of elements in the set X. K(x) indicates some kernel function. By way of example, we have used a Parzen (Gaussian) kernel with bandwidth (Boltz et al., 2007):

$$\sigma = 0.9 \min\left(\hat\sigma, \frac{\hat\rho}{1.34}\right)|\Omega|^{1.5}$$

Here, Ω is the set of data under estimation (either X or Y), σ̂ is the empirical standard distribution, and ρ̂ is the interquartile range.

In comparison to the GGD and SαS distribution, non-parametric methods have the significant advantage of generality; they make no assumption about the underlying shape of the distribution. However, such estimates are generally expensive to compute and require storing or recomputing the entire decomposition. Consequently, this estimator is most usefully applied in situations in which the empirical coefficient distribution exhibits significant asymmetry or multimodality.

Loftsgaarden-Quesenberry (L-Q) KLD Estimation

Kernel-based methods, like the Ahmad-Lin estimator, are famously sensitive to the bandwidth σ. In an attempt to circumvent this, (Boltz et al., 2007) have combined the Ahmad-Lin entropy estimator with the Loftsgaarden-Quesenberry (L-Q) pdf estimator (Loftsgaarden et al., 1965):

$$D_{L-Q}(X\|Y) = \log\frac{|Y|}{|X|-1} + \frac{d}{|X|}\sum_{x\in X}\log\frac{\rho_k(Y,x)}{\rho_k(X,x)}$$

The dimension is d, which equals one in the univariate case, and $p_k(Y, x)$ is the distance from x to the $k^{th}$ nearest element in the set Y, excluding any elements located at x. The neighborhood size k must be chosen a priori; a common choice is $k=\sqrt{|X|}$. (Boltz et al., 2007) claim that, in general, the KLD estimate is less sensitive to the choice of k than to σ.

iii) Classification

Using the KLD dissimilarity measure, textural patches obtained from stem cells or differentiated cells may then be classified using any convenient classification or clustering algorithm, according to methods known in the art. Exemplary classification methods are described in U.S. Pat. No. 7,711,174, U.S. patent application Ser. No. 12/321,360, and U.S. patent application Ser. No. 12/904,158, the contents of which are incorporated herein in their entirety. For example, the k-Nearest Neighbor (kNN) algorithm may be applied, or a Support Vector Machine (SVM) may be applied (Mangoubi et al., 2007).

Combination of Techniques

In some embodiments, a combination of techniques described herein may be used. For example, any method known in the art for inducing differentiation of stem cells along a trophectoderm or neurectoderm lineage may be used in combination with the Matrix Edge Onion Peel algorithm and/or the adaptive windowing method for analyzing images of the cells. Likewise, stem cells may be induced to differentiate in the specific media described herein, and other statistical methods for analyzing cell images may be used. According to the methods, any stem cells may be used as a starting point for differentiating into trophectoderm, neurectoderm or progeny cells thereof, including, but not limited to, cells from a blastula, cells of the inner cell mass, embryonic stem cells, adult stem cells, and induced pluripotent stem cells. Moreover, the stem cells may be derived from virtually any organism, such as mouse, rat, pig, non-human primate, and human.

In addition, some embodiments provide a method for inducing differentiation of trophectoderm or its progeny cells, comprising growing a culture of stem cells in the absence of feeder cells, adding a protein that induces differentiation into trophectoderm, such as a transforming growth factor-beta (TGFβ) superfamily member, whereby the stem cells are induced to differentiate into trophectoderm, and further comprising identifying the trophectoderm or progeny cells by obtaining an image of one or more cells, representing the image as a multiplicity of pixels, using a processor to extract one or more image features from the multiplicity of pixels, comparing the one or more image features with image features derived from one or more reference, wherein the processor applies one or more statistical comparison methods to compare the image features, and whereby trophectoderm or progeny cells are identified.

Other embodiments provide a method for inducing differentiation of neurectoderm or its progeny cells, comprising at least one of: (a) growing a culture of stem cells in a medium comprising an antagonist of a protein in the TGFβ superfamily, for example an antagonist of BMP4 such as noggin; (b) growing a culture of stem cells on a conductive polymer doped with at least one polypeptide derived from an extracellular matrix protein; or (c) growing a culture of stem cells on feeder cells plated at low density, whereby stem cells are induced to differentiate into neurectoderm, and further comprising identifying the neurectoderm or progeny cells by obtaining an image of one or more cells, representing the image as a multiplicity of pixels, using a processor to extract one or more image features from the multiplicity of pixels, comparing the one or more image features with image features derived from one or more reference, wherein the processor applies one or more statistical comparison methods to compare the image features, and whereby neurectoderm or progeny cells are identified.

Having generally described the invention, Applicants refer to the following illustrative examples to help to understand the generally described invention. These specific examples are included merely to illustrate certain aspects and embodiments of the present invention, and they are not intended to limit the invention in any respect. Certain general principles described in the examples, however, may be generally applicable to other aspects or embodiments of the invention. The invention contemplates that any one or more of the aspects, embodiments and other features described above and below can be combined.

EXAMPLES

Example 1

Figure 6:
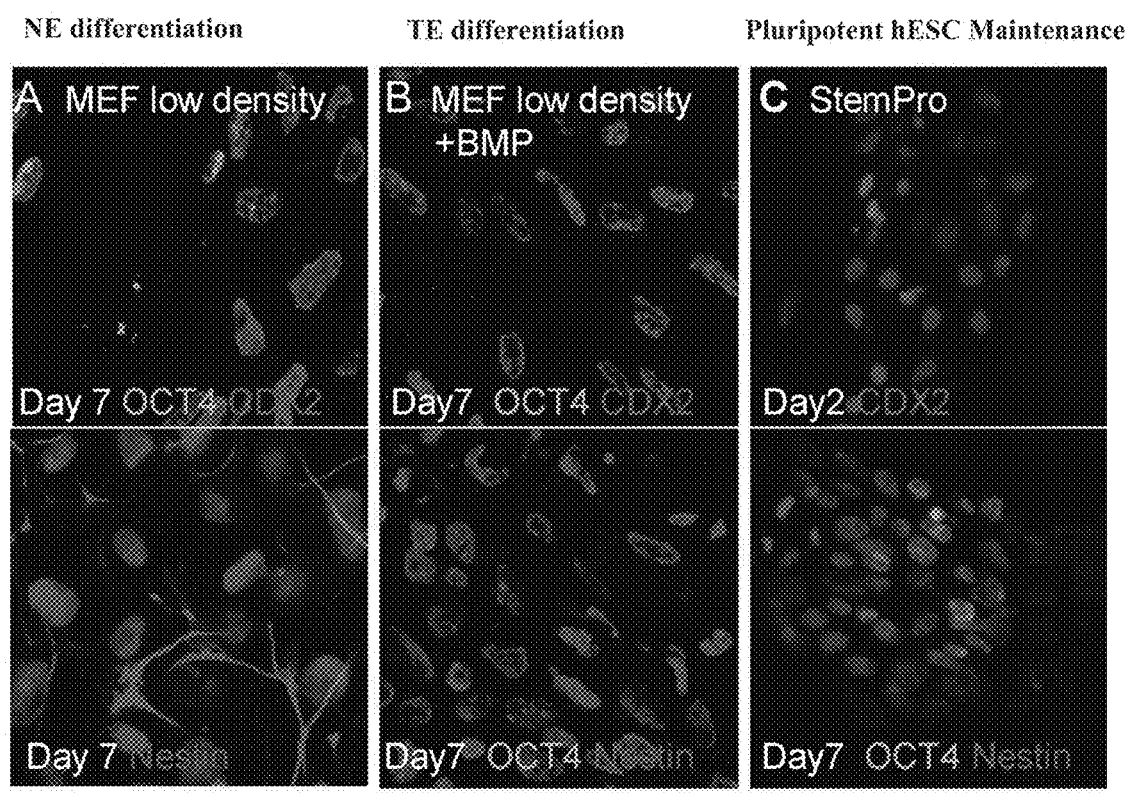
FIG. 6 shows that some methods for trophectoderm differentiation of pluripotent hESCs revealed inconsistencies. hESCs grown on low-density MEF feeders for seven days exhibited variable and lower OCT4 levels, prevalent nestin, and rare CDX2 expression (A), confirming neurectoderm (NE) differentiation as expected. BMP4 supplementation to hESC monolayers, cultured on low density MEFs differentiated but not to TE or NE since, OCT4 expression, nestin and CDX2 were rare (B), inconsistent with reports of trophectoderm (TE) differentiation from hESCs on feeders. In contrast, pluripotent (pluri) hESC culture in StemPro produced, high intensity, CDX2 expression in occasional cells by day 2 of culture (C, upper panel). Despite infrequent CDX2 expression at day 2, a majority of hESC colonies retained OCT4 staining with very low expression of early-differentiation markers including nestin (C, lower panel).

Pluripotent hESCs in Feeder Free Media are Efficiently but not Selectively Induced to Form TE, Unlike hESCs on MEF Feeders TE-differentiation from hESCs by addition of BMP4 was disappointing under standard MEF culture conditions (FIG. 1). Potentially, MEF's maintained pluripotency and inhibited differentiation so reduction of MEF density was evaluated. Reducing MEF density by half does not maintain pluripotency and enhances neural differentiation, but fails to facilitate BMP4 induced TE from hESCs in monolayers (FIG. 6B). Since low CDX2 expression might result from colony size-dependent autocrine factors (Harun et al., 2006; Ungrin et al., 2008), it was desirable to evaluate whether adherent hESC colony size influenced TE induction after BMP4 supplementation on low density MEFs. Monolayer colonies from 50-1000 cells rarely expressed CDX2 (FIG. 1C). BMP4 supplementation on low density MEFs decreased OCT4 expression and transformed cell morphology (FIG. 6B). However CDX2 was restricted to multi-layered colonies (FIG. 1B) and was not seen in monolayers. Thus BMP4 was insufficient for TE-induction from hESC on MEFs, except in compact multi-cellular bodies.

Inefficient TE-induction might result from competing soluble factors secreted from MEFs, such as Activin A, (Beattie et al., 2005; Wang et al., 2007; Parashurama et al., 2008; Saha et al., 2008) since TE differentiation by BMP4 is augmented by SB (Parashurama et al., 2008; Saha et al., 2008; Wu et al., 2008). To eliminate variable levels of activin A production from MEFs, TE-induction was evaluated in a defined, feeder-free, pluripotency media, StemPro (Table 1). Pluripotency in StemPro was confirmed at day 7 with prominent OCT4 staining (FIG. 1D), cuboidal cell morphology and low differentiation marker expression, including nestin (FIG. 6C). Occasional, single hESCs in StemPro expressed high-intensity CDX2 by culture day 2 (FIG. 6C) as expected, but early BMP4 supplementation (first 48 hours) to hESCs in StemPro produced homogenous, low level CDX2 (FIG. 1E) expression. Quantification of percent CDX2-positive cells revealed higher TE-induction from hESCs in StemPro than from hESC on MEFs at low density (FIG. 1F; $p<0.05$). Despite higher TE-induction, BMP4 supplementation to StemPro was not TE-selective (FIGS. 1G and H), and also induced mesoderm as measured both by average nuclear brachyury intensity (FIG. 1G) and percentage of brachyury positive cells (FIG. 1H) by day two of culture.

The difference in TE-induction between pluripotent hESCs grown on MEFs versus StemPro could be explained because hESC developmental potential is inherently different when maintained on MEFs vs. MEF-free conditions. Alternately, the difference could be explained by the differentiation media composition since cofactors/inhibitors differ between DSR vs. StemPro. Next, media cofactor and inhibitor requirements were evaluated for selective TE-induction from source cells maintained in StemPro by developing a defined, growth factor deficient, minimal media capable of maintaining viable and differentiation-competent hESCs to understand initiating requirements for TE-differentiation.

Example 2

A Minimal Induction Media Maintains Viable, Differentiation-Competent hESCs

Figure 2:
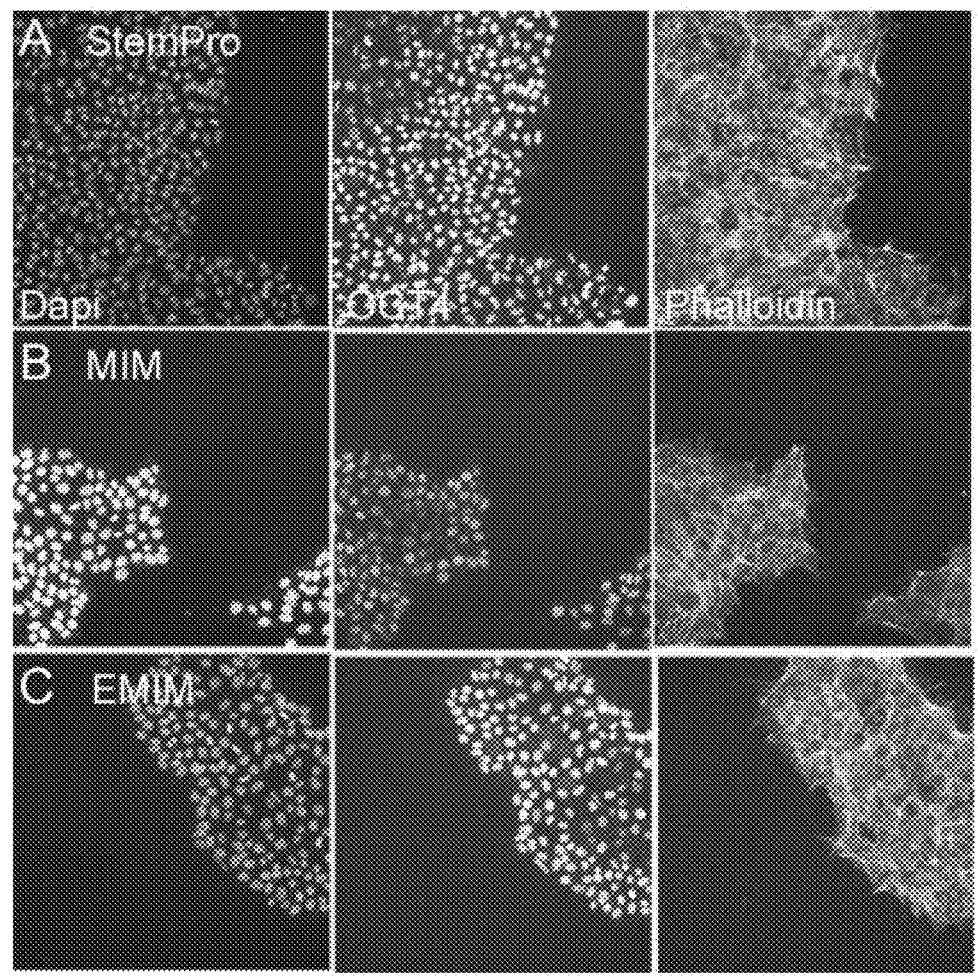
FIG. 2 shows that minimal induction media (MIM and EMIM) maintain viable, differentiation-competent hESCs for 2 days. Pluripotent hESCs maintained in StemPro pluripotency media were characterized by a cuboidal morphology, closely packed, OCT4 expressing nuclei and prominent peripheral actin bands shown by phalloidin staining which is characteristic of tight junctions (A). HESCs maintained in a growth factor-deficient minimal media without heparin (B, MIM) or with heparin (C, EMIM) were morphologically indistinguishable from pluripotent hESCs in StemPro and continued to express OCT4 at the same level (D). hESCs grown in MIM and in EMIM for 2 days not only continue to express OCT4, but also were not induced to over-express lineage specific transcription factors including CDX2, brachyury (T), and GATA6 when compared to pluripotent hESCs grown in StemPro (D).
Figure 2:
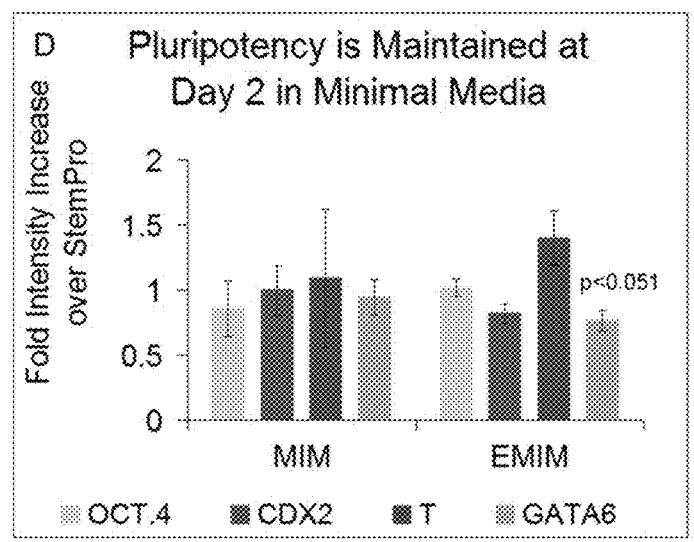
Figure 7:
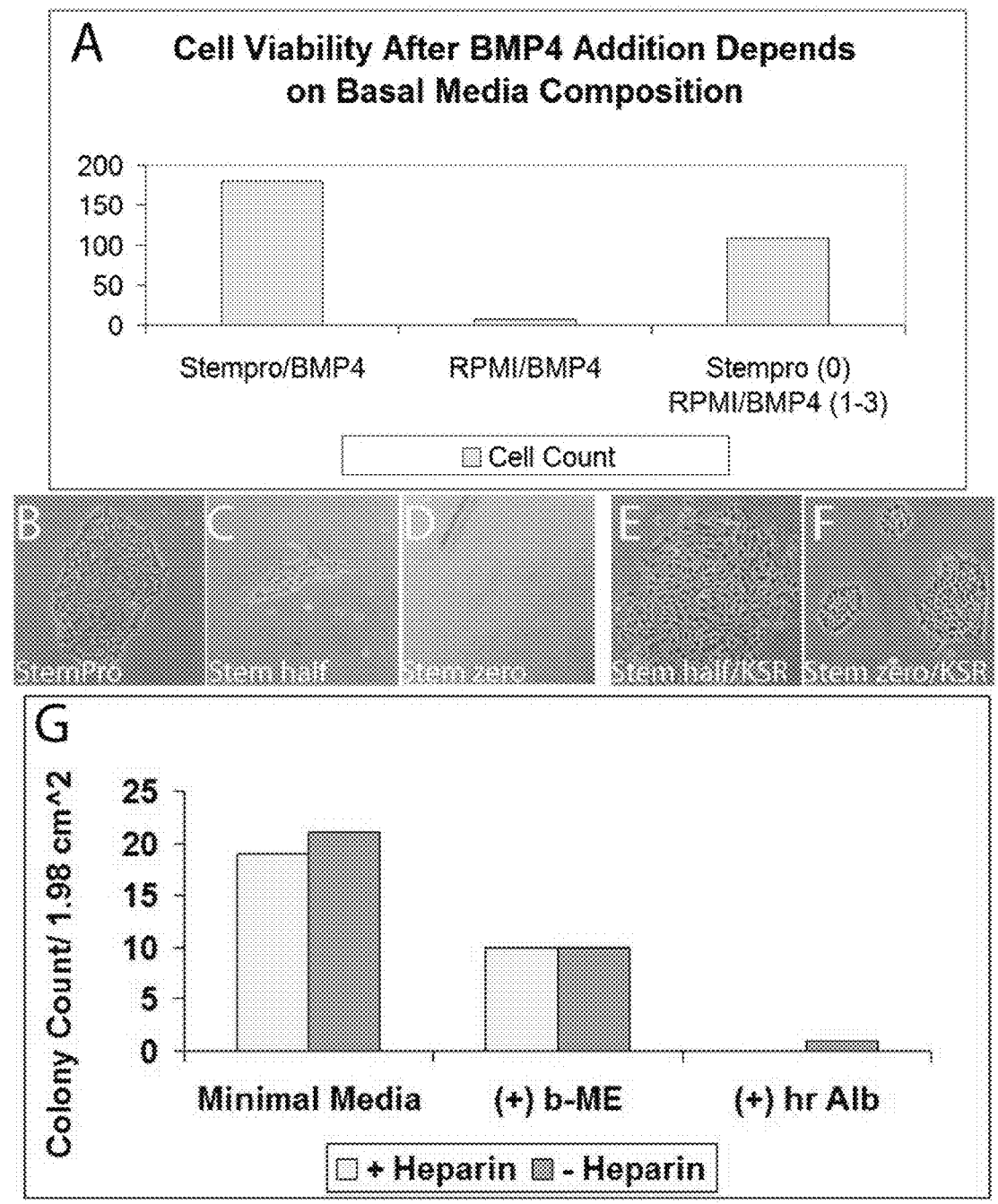
FIG. 7 shows that StemPro source cells require a DMEM/F12 base, insulin and KSR, for viability in a minimal induction media, but not β-mercaptoethanol or human recombinant heparin. (A) BMP4 supplementation to an RMPI-based media (RPMI/BMP4) produced low hESC survival, whereas BMP4 addition to StemPro (Stempro/BMP4) maintained viable hESCs after 3 days. The protective effect of StemPro on StemPro source hESC viability was dose dependent as StemPro maintenance for 24 hours prior to culture in an RPMI-based media supplemented with BMP4 (Stem (0) RPMR/BMP4 (1-3)) revealed intermediate levels of hESC viability compared to StemPro-based and RPMI-based media. The removal of StemPro supplement had a dose-dependent detrimental effect on hESC survival (B-D) however addition of KSR to StemPro supplement-deprived cultures improved hESC viability (compare C to E, and D to F). (G) In a minimal induction media with (yellow bars) or without (lilac bars) heparin, the addition of β-mercaptoethanol (b-ME) or human recombinant albumin (hr Alb) reduced hESC survival.

A media was designed to serve as a foundation for differentiation with two criteria: high viability and minimal exogenous pluripotency factors that would otherwise compete with differentiating factors. Two candidate starting media from which to devise a minimal basal media for TE-induction studies included StemPro, used primarily for hESC pluripotency maintenance, and RPMI with KSR (Zhang et al., 2008), a TE-supportive media. RPMI with KSR supported differentiation to TE but it was found that switching basal media when passaging from the DMEM/F12-based StemPro to an RPMI-based media was responsible for very low viability (not shown). Thus, to maintain compatibility with StemPro-cultured hESC, a DMEM/F12-based minimal induction media (MIM, Table 1) was developed by testing short-term hESC viability (FIG. 7) and OCT4 expression (FIG. 2) after systematically reintroducing cell survival, but not pluripotency, components. Insulin and BSA were critical components for cell viability, but while heparin was non-essential for short term viability of hESCs in basal media, it did improve hESC viability once BMP4 was supplemented (not shown). Thus, MIM with heparin (Erb's Minimal Induction Media, EMIM) became a second candidate minimal media for TE-induction studies.

Figure 9:
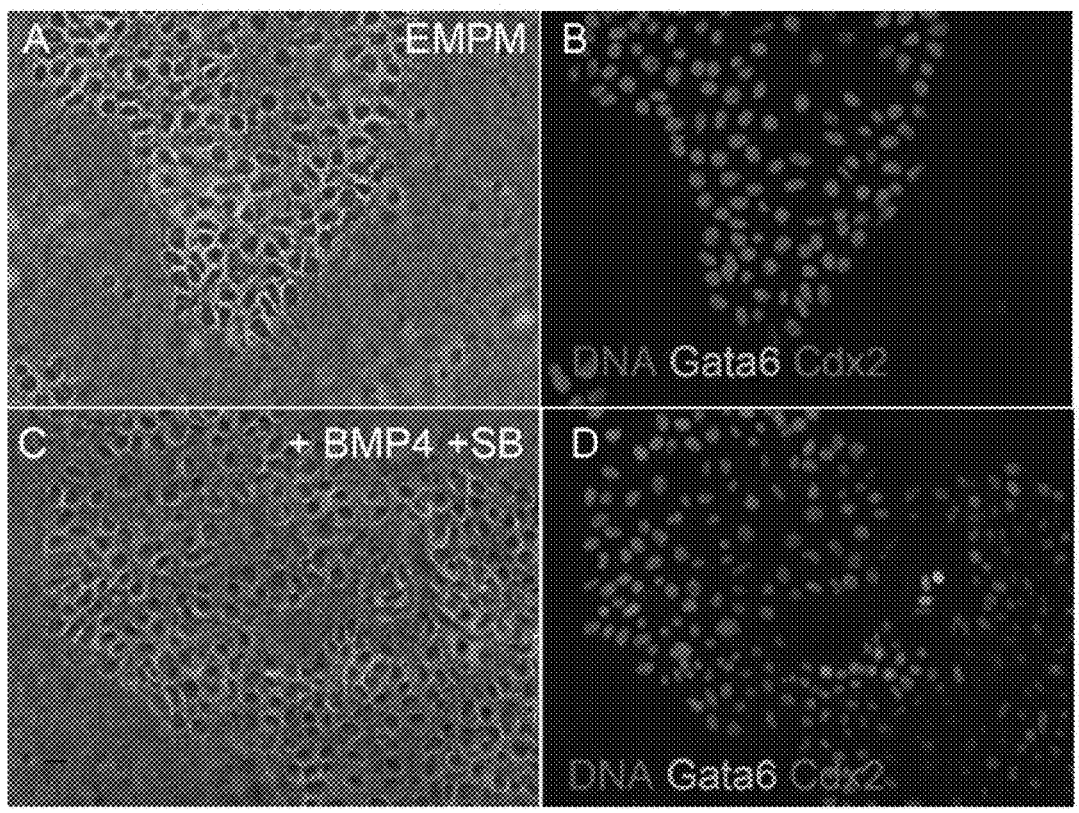
FIG. 9 shows that induction of the extraembryonic lineages, trophectoderm and extraembryonic endoderm, co-occur at the treatment level, but are mutually exclusive at the cellular level. In short term culture, EMIM maintained cuboidal hESC morphology (A) and absence of extraembryonic endoderm (GATA6) and trophectoderm (CDX2) differentiation (B). Addition of low dose BMP4 plus SB to EMIM promoted robust hESC morphological differentiation (C), homogenous CDX2 expression, and rare GATA expression (D). Upon hESC differentiation, treatment-level trophectoderm (CDX2) and extraembryonic endoderm (GATA6) transcription factor expression mirrored each other (compare shapes of radar graphs in E and F, respectively). However, cells which express CDX2 do not express GATA6, and vice versa (D).
Figure 9:
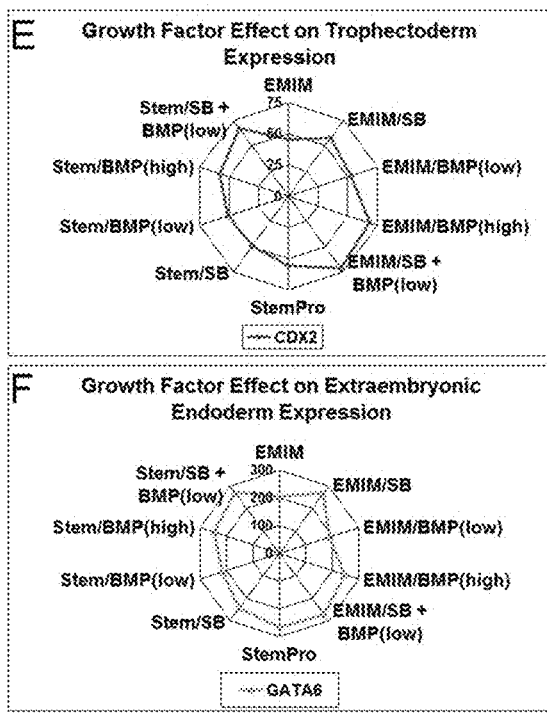

One criterion for derivation of a minimal induction media was that hESCs would be viable and continue to express the OCT4 pluripotency marker. Short-term hESC culture in MIM or in EMIM consistently maintained viable, OCT4-expressing hESCs with pluripotent cell morphology (FIG. 2B-D) for up to 4 days when cultured on matrigel or Geltrex. A second criterion for the derivation of a minimal induction media was that hESC would remain competent to differentiate. Compared to standard StemPro pluripotency conditions at day two, expression levels of the differentiation markers, CDX2, brachyury and GATA6 were not statistically increased (FIG. 2D) in either minimal media. Thus, MIM and EMIM provided a growth factor-deficient basal media that maintained hESC-competence for lineage-specific induction in the short-term (4 days) as determined by the presence of a pluripotent hESC morphology, continued OCT4 expression (FIGS. 2B-D) and the absence of TE-, mesoderm-, and extraembryonic endoderm-induction (FIGS. 2D and 9B).

Example 3

BMP4 Produces a Dose Response Increase in TE Induction in MIM Media, and is Selective when Applied with Activin A and Heparin in EMIM Both MIM and EMIM were evaluated as foundation media for evaluating paracrine requirements for selective TE-differentiation. To evaluate initiating events, multiple lineage-specific transcription factor levels were quantified after a 48-hour exposure to presumptive TE-inducing growth factors in StemPro, and growth factor-deficient MIM or EMIM A systems approach was used to compare multiple independent and dependent variables in radar charts (FIGS. 3A, 9E-F) to allow analysis of multiplexed data. The increase in staining of the transcription factors brachyury (T, purple) and CDX2 (red) in the presence of TE-inducing growth factors (SB, low dose BMP4, high dose BMP4) used either alone or in combination in either StemPro or EMIM was plotted as the fold change without stimulant over the basal media alone (in the pluripotent state). StemPro with all addition shows a tendency for mesoderm-induction in StemPro while EMIM shows a preference for trophectoderm-induction (FIG. 3A).

Statistical analysis specified paracrine requirements for TE induction in these media. Significant CDX2 induction (p<0.01) occurred with combination low dose BMP4 and SB in StemPro or in EMIM or when BMP4 was used alone at higher doses (500 ng/mL) in EMIM by day2 (FIG. 3B). While BMP4 in EMIM was sufficient, dose-dependent, and synergistic with SB for TE-differentiation in EMIM, these effects were lost in StemPro except when combined with activin A antagonism (SB). However, selectivity varied with base media. Short-term treatment with SB or with low-dose BMP4 was accompanied by a significant increase in brachyury expression in StemPro, but not in EMIM (FIG. 3C). Thus activin A inhibition alone or low-dose BMP4 promoted mesoderm-induction in StemPro, but not in EMIM suggesting higher TE-selectivity over ME in EMIM compared to StemPro.

Figure 3:
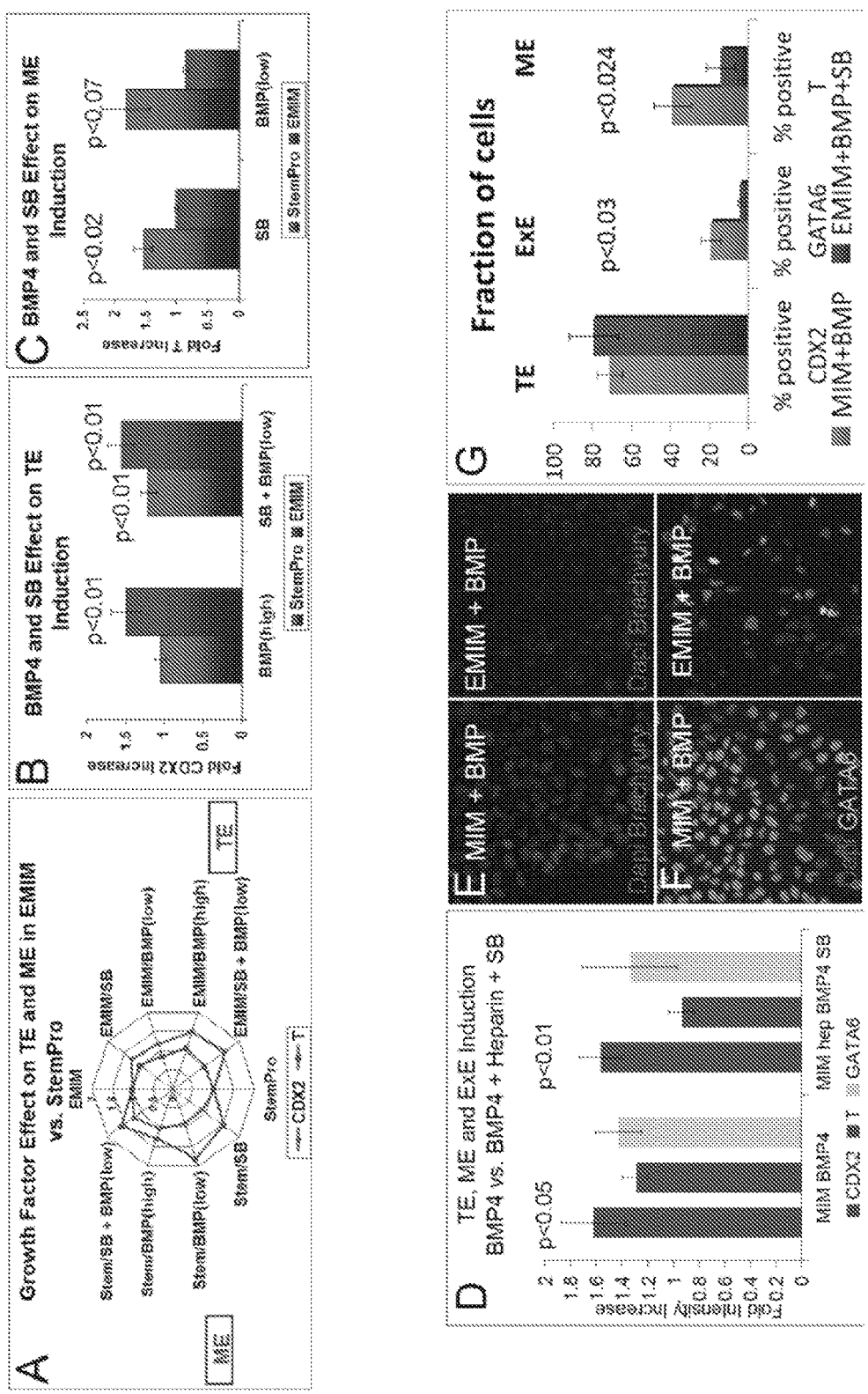
FIG. 3 shows that BMP4 produces a dose-dependent induction of TE, and is TE-selective in EMIM. A radar graph displaying fold change of the transcription factors brachyury (T, purple) and CDX2 (red) expression levels in the presence vs. absence of growth factors (Activin antagonist, SB; low dose BMP4; high dose BMP4) in either StemPro or EMIM basal media shows ME-induction in StemPro versus TE-induction in EMIM (A). CDX2 expression was significantly induced when low dose BMP4 was used in combination with SB in StemPro or in EMIM or when BMP4 was used alone at higher doses (500 ng/mL) in EMIM (B). In StemPro but not EMIM, short-term treatment with either SB or low dose BMP4 alone significantly increased brachyury expression (C). BMP4 supplementation to MIM significantly increased the fold induction of CDX2 over MIM alone, but did not increase brachyury and GATA6 over MIM alone (D). This same pattern of fold increase of transcription factor expression levels was seen with BMP4 and SB addition to EMIM (MIM with heparin, D). BMP4 and SB addition to EMIM produced a predominantly CDX2 positive cell population by reducing the percentage of brachyury (E) and GATA6 (F) positive cells, compared to MIM plus BMP (G; $p<0.024$ and $p<0.03$ respectively).
Figure 8:
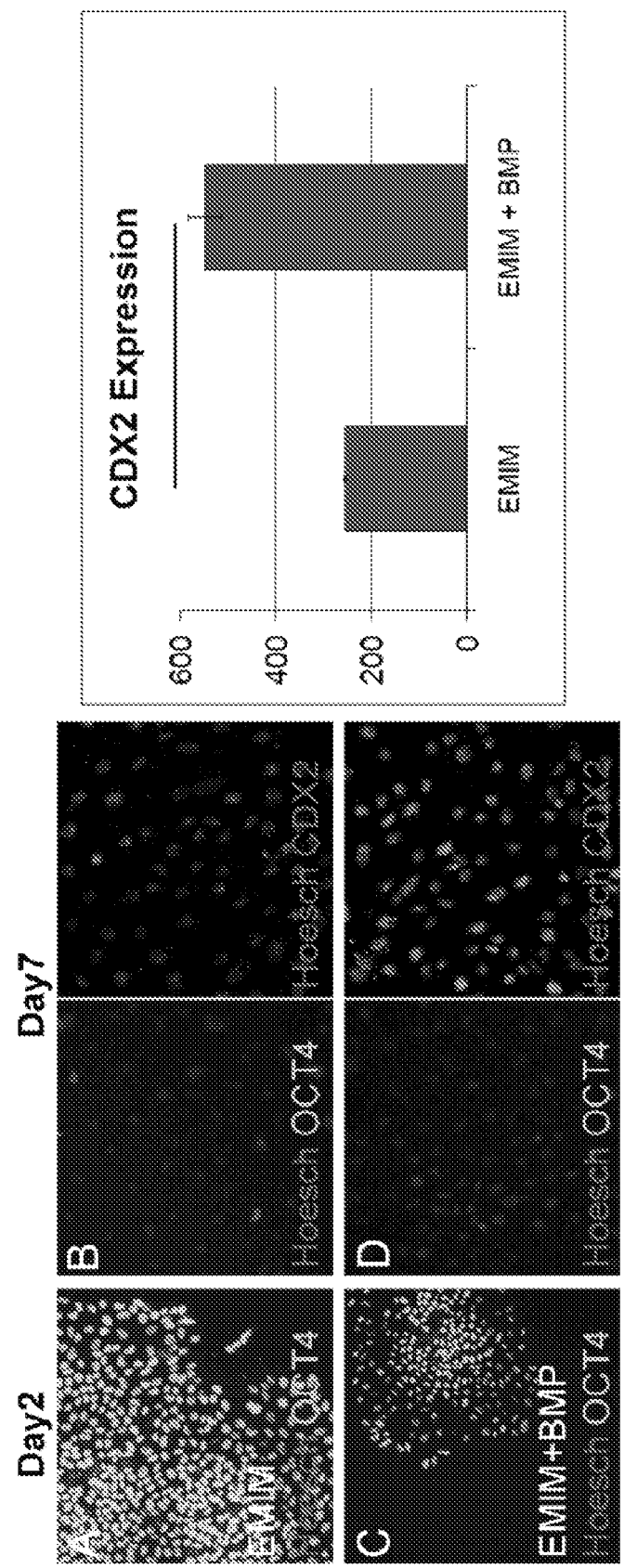
FIG. 8 shows that BMP4 is necessary for TE-induction in EMIM. Short term hESC culture in a growth factor deficient minimal media plus heparin, termed Erb's minimal induction media (EMIM), consistently maintained cell survival and OCT4 expression (A) up to 4 days in the absence of any growth factor besides insulin. After 4 days, EMIM permitted spontaneous hESC differentiation to an epithelial morphology with decreased OCT4 expression, however these cells were negative for CDX2 even at culture day 7 (B). Conversely, BMP4 supplementation to EMIM induced diffuse CDX2 expression by culture day 7 (D) which was significant at the p<0.04 level (Graph).

Despite the capacity to induce TE in both MIM and EMIM minimal media (FIG. 3D, 3G and FIG. 8), BMP4 was more TE-selective in EMIM than MIM (FIGS. 3D-G) because the fraction of ME and ExE positive cells were significantly suppressed in EMIM media (FIG. 3G). For example, 100 ng/mL BMP4 induced non-TE lineages in over half of the cell population in MIM (FIG. 3E-G), while BMP4 plus SB supplementation to EMIM reduced extraembryonic endoderm from nearly 20% to 8% of cells (FIGS. 3F and G; p<0.03) and reduced mesoderm from over 40% to less than 20% (FIGS. 3E and G; p<0.024) producing a population of cells that were predominantly trophectoderm (~80% Cdx2-positive). BMP4 selectivity for TE induction was increased by inclusion of both SB and heparin. Interestingly, GATA6 and CDX2 were mutually exclusive at the cellular level, (FIG. 9D) unlike brachyury and CDX2, demonstrating a mosaic pattern of development, consistent with reports that ICM develops as a mosaic of embryonic and extraembryonic progenitors (Chazaud et al., 2006).

Example 4

Figure 4:
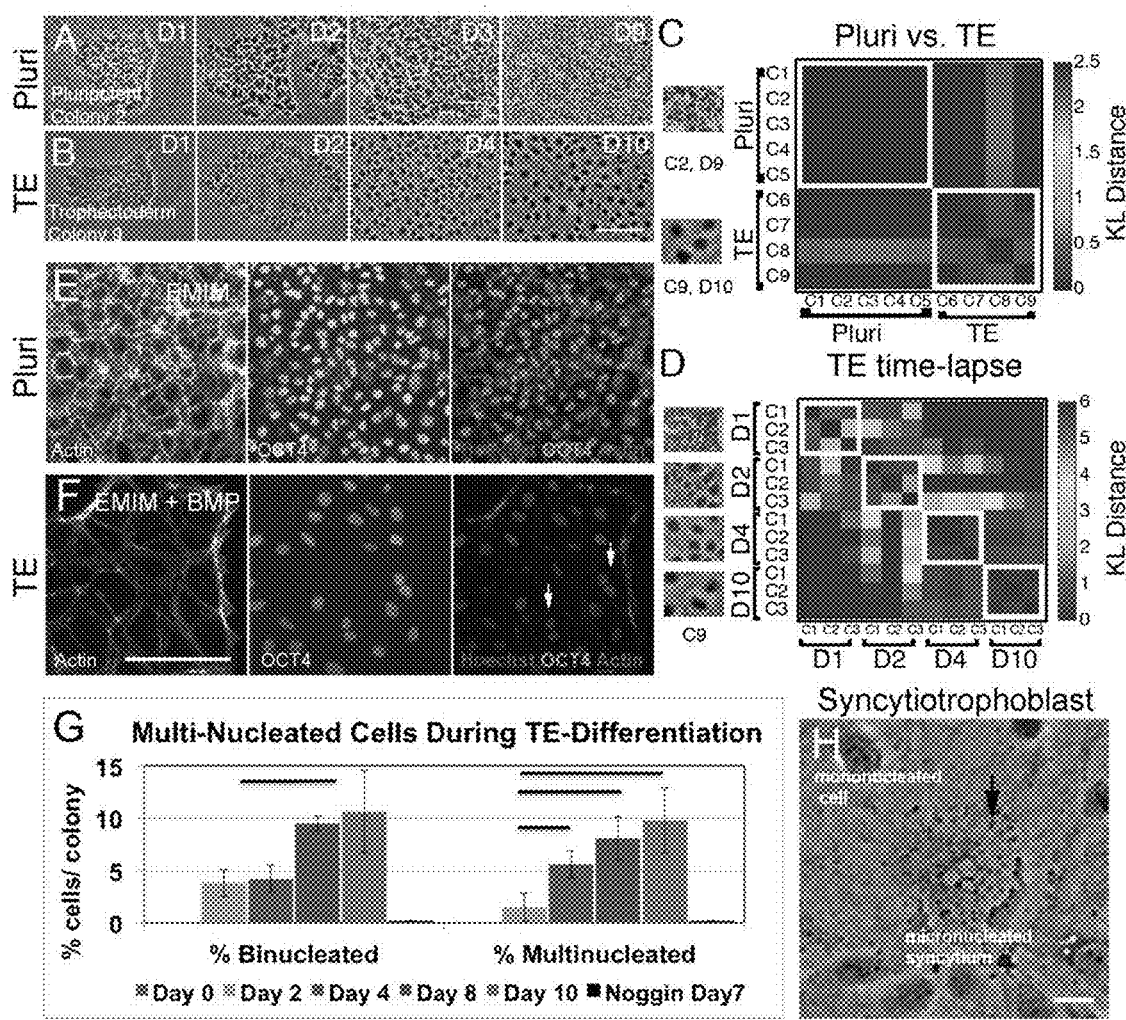
FIG. 4 illustrates that TE identity of hESCs after TE-selective differentiation is characterized by a quantitative morphological transformation from a cuboidal to a squamous epithelium and is confirmed by terminal differentiation to syncytiotrophoblast. Pluripotent hESCs in StemPro (A) consisted of small tightly packed cells that remained tight during colony growth by phase contrast microscopy on day 9. BMP4 (100 ng/mL) in EMIM plus SB initiated colony spreading at day 2 (B) that was complete by day 3. Colony texture was quantified and displayed with the help of a color scale (C, D) where blue represents similar (small KL distances) and red represents distinct (large KL distances) colony textures. Colonies were compared just before passaging [5 pluripotent colonies (C1-05) at day 9 (D9) vs. 4 TE colonies (C6-C9) at day 10 (D10)]. Self-comparisons among pluripotent or among TE colonies showed high uniformity (blue) while cross comparisons showed high differences (red, two-sample t-test conducted at the 0.98 confidence level, $p<1\times10^{-6}$. Time-lapse TE differentiation (B) was also quantified by texture analysis (D). A comparison of each TE colony (C1-C3) showed similarity between all colonies on days 1 and 2 [D1-D2 (blue-green rectangles outlined in white)] and very high similarity between all colonies on days 4 through 10 [D4-D10 (blue rectangles outlined in white)], but that colony texture was distinct when day 2 and day 4 TE colonies were compared (two-sample t-test conducted at the 0.98 confidence level, p=8.6×10-7). Pluripotent cells were further characterized by confocal microscopy (E), which revealed a cuboidal nuclear morphology, prominent peripheral actin bands, closely packed, OCT4 expressing nuclei and small cytoplasmic-nuclear ratios (E). TE cells spread out and formed a squamous epithelium with weak peripheral bands, reduced OCT4 levels, large internuclear distance and cytoplasmic nuclear ratios (F). Subsequent to TE-induction on day 2, a time lapse of TE-differentiation revealed that bi- and multinuclear trophoblast cells each occurred in 10% of cells by day 10 (G, bar graph showing mean, SD, and two sample t-test at p<0.05). Multinucleated cells were absent from hESC cultured in noggin (a BMP4 antagonist) used to promote NE differentiation. Multinucleated syncytium (I-1, arrow) in EMIM plus SB after BMP4 supplementation were typical of syncytiotrophoblasts with rounded, smaller, darker cells and condensed chromatin structure. (Bar in B, 1 um; F, 100 mm; H, 10 um.)

TE-Selective Differentiation is Characterized by a Quantitative Morphological Transformation from a Cuboidal to a Squamous Epithelium and Subsequent Terminal Differentiation to Multinucleated Cells TE-selective culture conditions, EMIM supplemented with low dose BMP4 and SB, was evaluated for morphological change to cell colonies. The morphology of pluripotent hESC colonies consisted of small, tightly packed cells that remain tight during colony growth (FIG. 4A). BMP4 (100 ng/mL) with SB in EMIM initiated cell spreading at colony edges by day 2 (FIG. 4B), which progressed to the colony core by day 3. The observed conversion to a squamous epithelium was complete and quantitative before day 4 (FIG. 4 B-D). Phase contrast images of pluripotent hESC and TE-differentiated colonies were compared by texture analysis, which is sensitive to subtle changes in cell and nuclear size, and colony uniformity (Mangoubi et al., 2007; Sammak et al., 2008). Texture analysis demonstrated that pluripotent hESC colony morphology was statistically distinct from TE-differentiated colonies at day 9-10 (FIG. 4C). Further, the kinetics of TE differentiation was quantified by texture analysis (FIG. 4D) of time-lapse images, which revealed that colonies in TE induction media were not significantly different from pluripotent cell colonies on days 1-2 (FIG. 4D), but that colony texture was distinct on day 4-10 with near certainty ($p=8.6\times10-7$). Thus, TE-transformation was complete by day 3 in TE-selective culture conditions.

Pluripotent cells with high OCT4-expression had a cuboidal morphology with prominent peripheral F-actin bands suggestive of tight cell-cell junctions, closely packed nuclei and very small cytoplasmic-nuclear ratios (FIG. 4E). Conversely TE had reduced OCT4 levels, and formed a squamous epithelium with weak peripheral F-actin bands, cytoplasmic stress fibers, large internuclear distance and increased cytoplasmic-nuclear ratios (FIG. 4F). Finally TE identity was confirmed by a functional assay of hESC differentiation to binucleated (FIG. 4F, white arrows) and multinucleated (FIG. 4H, black arrow) syncytium, characteristic of terminally differentiated syncytiotrophoblasts. Time-lapse experiments revealed that 100 ng/mL BMP4 and SB supplementation to EMIM caused a significant ($p<0.05$) increase in the percentage of binucleated and multinucleated cells by days 4 and 8, respectively. Multinucleated cells were absent from pluripotent hESCs (not shown) and from neurectoderm culture conditions induced by the BMP4 antagonist, noggin, confirming the selective occurrence of multinucleated syncytium (FIG. 4H, arrow) in TE-selective culture conditions. The morphology of multinucleated cells (FIG. 4H, arrow) on day 8 were typical of syncytiotrophoblast with smaller, darker nuclei and condensed chromatin structures (Palmer et al., 1997; Ramalho-Santos et al., 2002).

Example 5

HDAC Inhibition with TSA Slows BMP4-Induced hESC Differentiation

Figure 5:
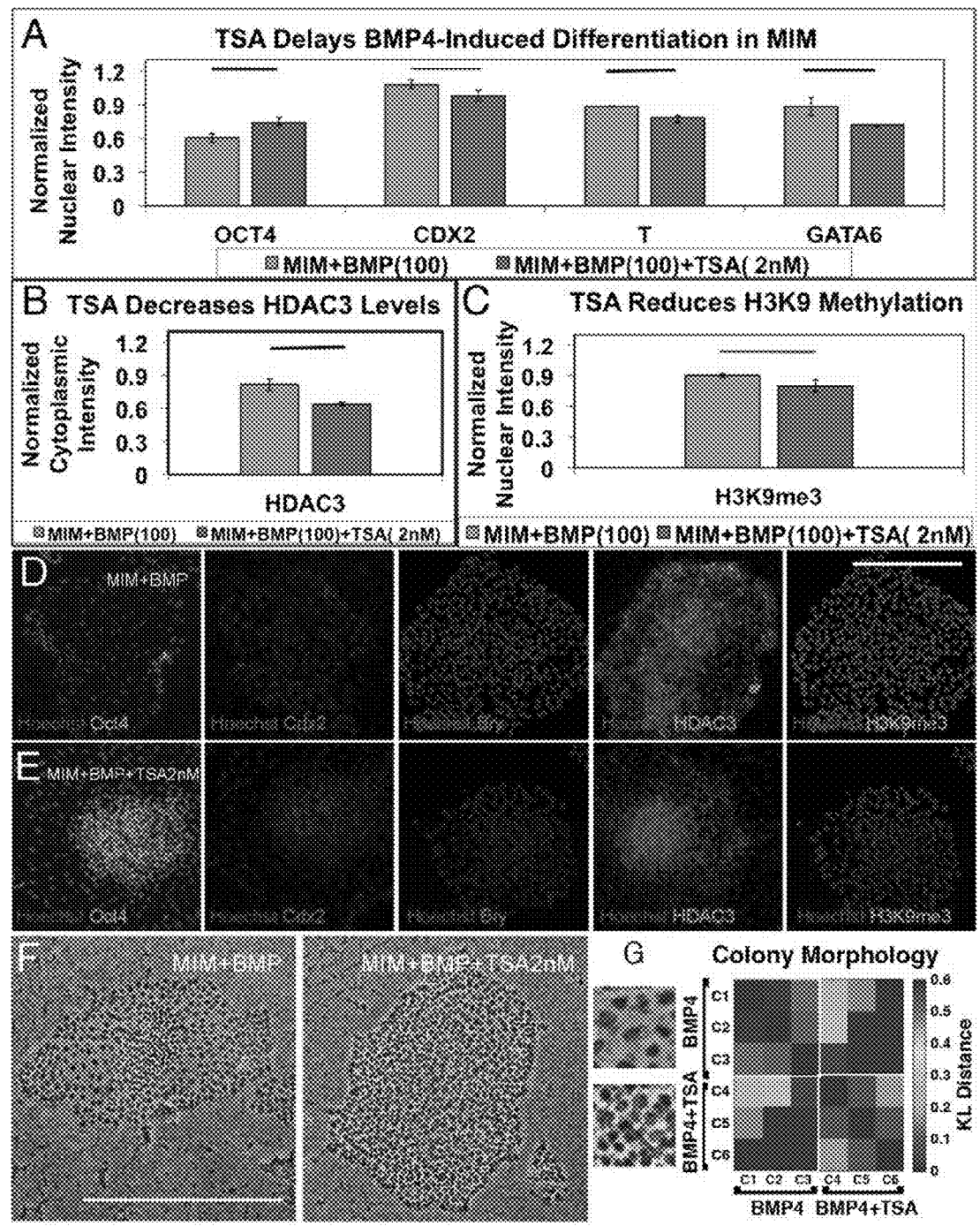
FIG. 5 shows that HDAC inhibition with TSA slows BMP4-induced hESC differentiation. Compared to BMP4 alone (A, red bars) TSA addition to MIM with BMP4 (blue bars) significantly increased OCT4 expression and decreased the expression of CDX2, brachyury and GATA6 (all p<0.05; also shown in panels D versus E). TSA also significantly reduced the expression of HDAC3 (B) and methylation of histone H3K9 (C) and redistributed HDAC3 from the plasma membrane (compare HDAC3 in D and E). Net differentiation at 48 hours was also significantly reduced with TSA addition to MIM plus BMP as measured by morphological transformation to a squamous epithelium (F and G, p<0.05).

Though not TE-selective, BMP4 supplementation to MIM was the most robust protocol for hESC differentiation to multiple lineages. To test whether or not TSA caused lineage specific inhibition, this protocol was used to assess HDAC inhibition on hESC differentiation to TE, ME or ExE. Addition of 2 nM TSA to MIM plus BMP4 for 48 hours produced a significant OCT4 level increase with a concomitant decrease in CDX2, brachyury, and GATA6 expression relative to BMP4 addition alone (FIG. 5A; compare panels 5D versus 5E). Thus HDAC inhibition delayed BMP4-induced hESC differentiation in the short-term, without altering lineage selection HESC colony morphology at 48 hours evaluated by texture analysis showed that TSA addition significantly delayed BMP4-induced epithelial transformation (FIG. 5F-G). BMP4 produced heterogeneous morphological transformation at 2 days in MIM However addition of 2 nM TSA maintained tight colonies with small internuclear distance (FIG. 5F) and produced a colony texture that significantly differed from TE (FIG. 5G; $p<0.05$).

Example 6

Effects of HDAC3 Inhibition with TSA on hESC Colony Morphology and Differentiation The drug TSA affects HDAC3 preferentially (data not shown), increases several markers of pluripotency, and reduces three markers for chromatin methylation. Molecular or drug targeting of the epigenetic enzyme histone deacetylase 3 (HDAC3) alters the developmental stage of pluripotent cells and reprograms epiblast (post implantation) stem cells into an earlier, preimplantation state, like inner cell mass (1CM) stem cells. Thus, epigenetically active agents not only affect the differentiation state of stem cells, but also induce reprogramming. Whole nuclear epigenetic markers were used to evaluate developmental stage, and were shown to affect colony morphology by increasing F-Actin based cell-cell junctions and producing smooth colony texture. The smooth colony texture was evaluated non-invasively by texture analysis of phase contrast images of living stem cells and can be used to measure changes over time.

Figure 11:
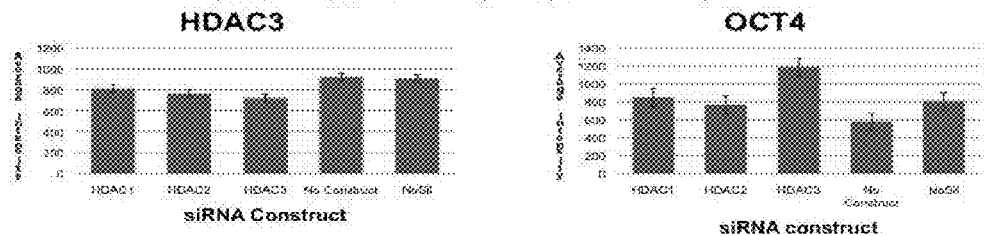
FIG. 11 shows the effects of HDAC3 inhibition on hESC colony differentiation and morphology.
Figure 11:
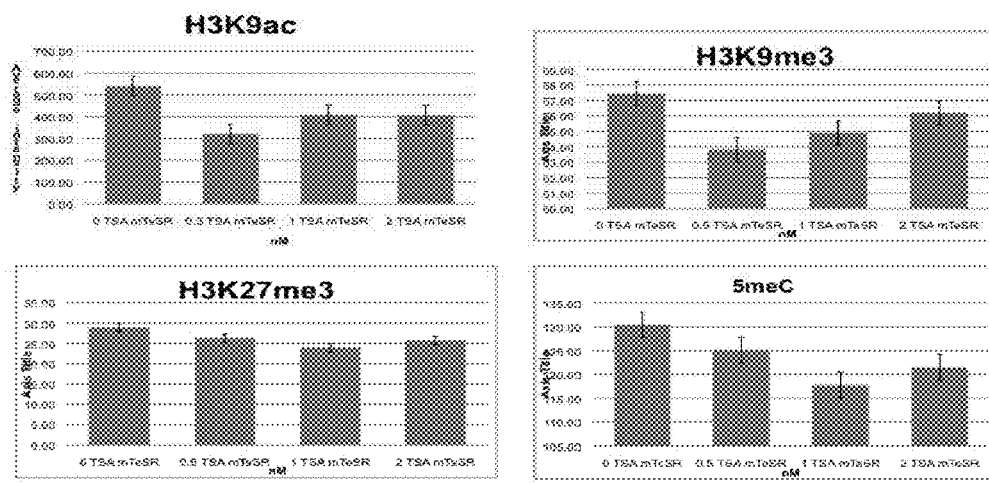
Figure 11:
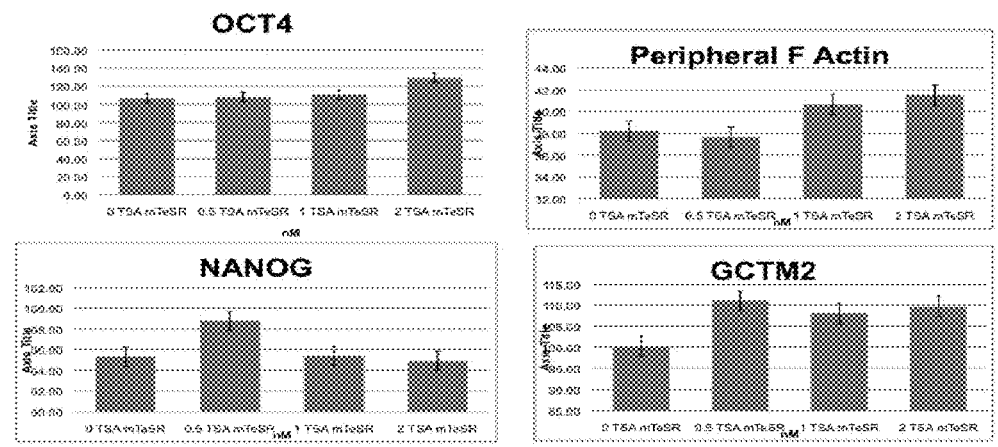

In all panels of FIG. 11, pluripotent hESC, line H7, were cultured in mTeSR media were plated in 96 well plates, fixed and immunostained for developmental and epigenetic markers, and the intensity was measured using the Thermo Fisher Arrayscan. 300 cells per well, 3 wells per condition were measured and standard deviations (error bars) and T Tests were evaluated. FIG. 11A shows cells that were transfected with siRNA (Invitrogen, USA) directed against HDAC2, 2 or 3. Anti-HDAC3 antibodies confirms that siRNA directed against HDAC3, but not HDAC1, HDAC2, or control knocked down the concentration of HDAC3 ($P<0.05$, data not background subtracted). FIG. 11B shows that knockdown of HDAC3, but not HDAC1 or 2 increased the pluripotency of hESC as measured by the transcription factor Oct4. FIG. 11C shows that Tricostatin A (TSA), an inhibitor of Class 1 HDACs (1, 2, 3, and 8), was applied at 0.5, 1.0 and 2.0 nM for 2 days. hESC cultures had increased colony size by 2 fold and uniformity of texture. TSA significantly reduced HDAC3, more than HDAC 1 or 2 at these concentrations (not shown). TSA did not increase histone acetylation on H3K9, but instead decreased acetylation. FIG. 11D shows that TSA decreased H3K9me3, an indicator of constitutive heterochromatin. FIG. 11E shows that TSA decreased H3K27me3, and indicator of facultative heterochromatin and gene silencing. FIG. 11F shows that TSA decreased DNA methylation on 5'cytosine, an indicator of heterochromatin gene silencing. Reduced levels of H3K9me3, H3K27me3, and 5'meC indicate a more primitive epigenetic state, suggestive of reprogramming from an epiblast like state to a more pluripotent ICM-like state. FIG. 11G shows that TSA increased Oct4, a pluripotency transcription factor in a dose dependent manner. FIG. 11H shows that TSA increased peripheral F-actin, a marker of tight cell junctions, distinct for the ICM not epiblast state. This protein changes colony texture by producing smooth, homogeneous colonies. FIG. 11I shows that TSA increased Nanog but with a different concentration profile than Oct4, suggesting a different mechanism of induction. FIG. 11J shows that TSA increased GTCM2, a cell surface marker of pluripotency. This marker is selective for high cells with high levels of pluripotency.

Example 7

Figure 12:
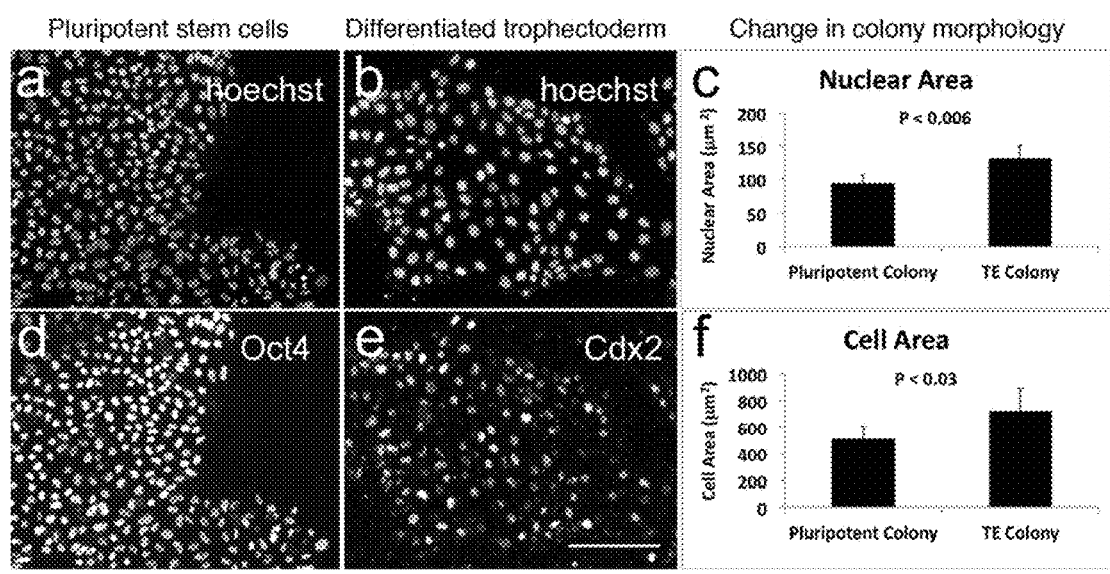
FIG. 12 shows a morphological comparison of pluripotent hESC and differentiated trophectoderm colony images. Pluripotent hESC cultures, line WA07 (A, D) were compared to hESC that were differentiated in vitro for 4 days in culture with 100 ng/ml BMP4 (b, e) demonstrated by the pluripotency marker OCT4 (d) and the trophectoderm marker, CDX2 (e). Morphological differences include a significant increase in cell (c) and nuclear size (D.

High-Content Imaging of Differentiation and Epigentics in hESC and Differentiated Cells Quantitative measurement of stem cells by image analysis can provide cell level details of molecule distribution and interaction. High Content Screening (Sammak et al., 2008) of transcription factors that are characteristic of pluripotent or differentiated stem cells was used to develop new protocols for early development of trophectoderm, placental precursor cells, from human embryonic, stem cells (hESC). Measurement of Oct4, Cdx2, and Handl was used to show that BMP4 in a minimal defined media was sufficient for trophectoderm differentiation without other exogenous growth factors. Morphological transformation of hESC colonies to trophectoderm was measured over time non-invasively by texture analysis, demonstrating the uniformity and efficiency of the differentiation process (FIG. 12).

Figure 13:
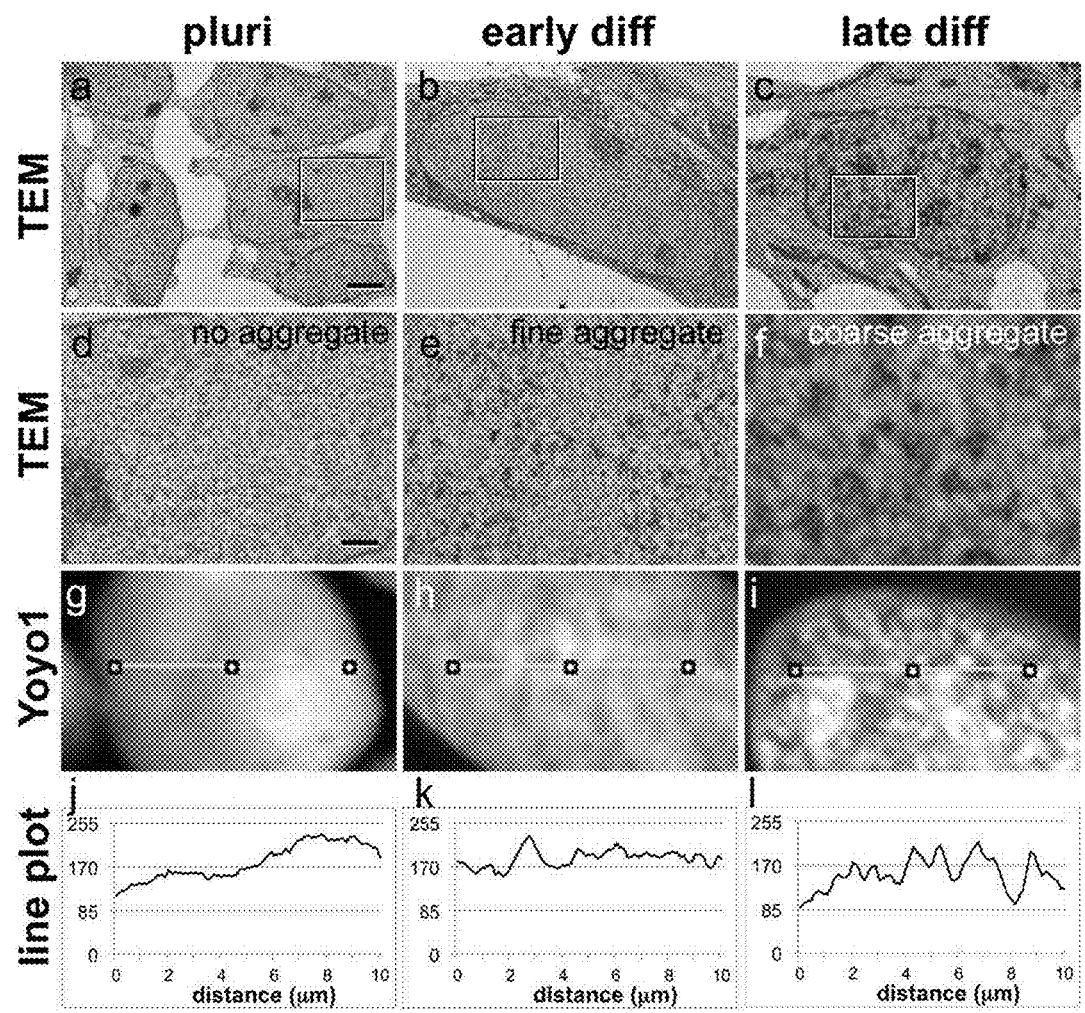
FIG. 13 shows that hESC have smooth chromatin and neural stem cells have condensed chromatin. Images from pluripotent (column a-j), early differentiated (column b-k), and late differentiated (column c-l) colonies show increasing granularity as detected by electron microscopy and light microscopy (g-i). In early diff, fine aggregates of chromatin are formed by accretion of osmophillic aggregates that are separated by 0.2 mm. Line plots of confocal sections of Yoyo-1 stained DNA show low spatial frequencies in pluripotent cells (j), high frequency, in early-differentiated cells (k), and longer frequency in late-differentiated cells (i) Bar in a, 0.5 µm Bar in d, 0.125 µm, Yellow bars in g-i, 10 µm.
Figure 14:
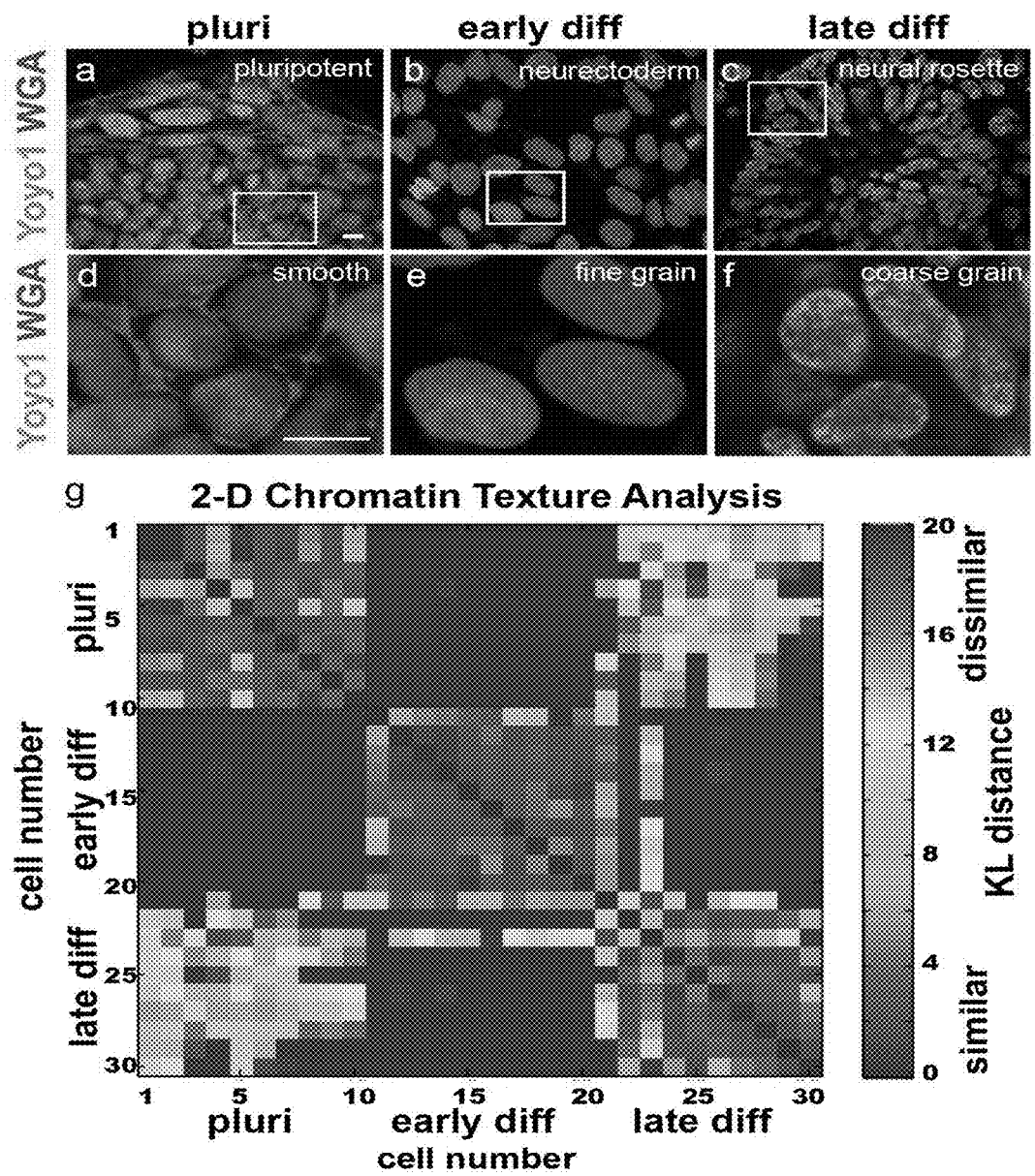
FIG. 14 shows that chromatin condenses by accretion via a fine grained intermediate step. Pluripotent hESC (left), neurectoderm (middle) and neural rosettes (right) were stained with the DNA dye Yoyo1 and quantitatively evaluated for texture by wavelet analysis. Among 20 pluri and differentiated cells, the Kullback-Leibler (KL) distance between pluri early diff and late diff cells significant and showed a novel intermediate step with fine grained chromatin, demonstrating heterochromatin formation by accretion during stem cell differentiation.
Figure 15:
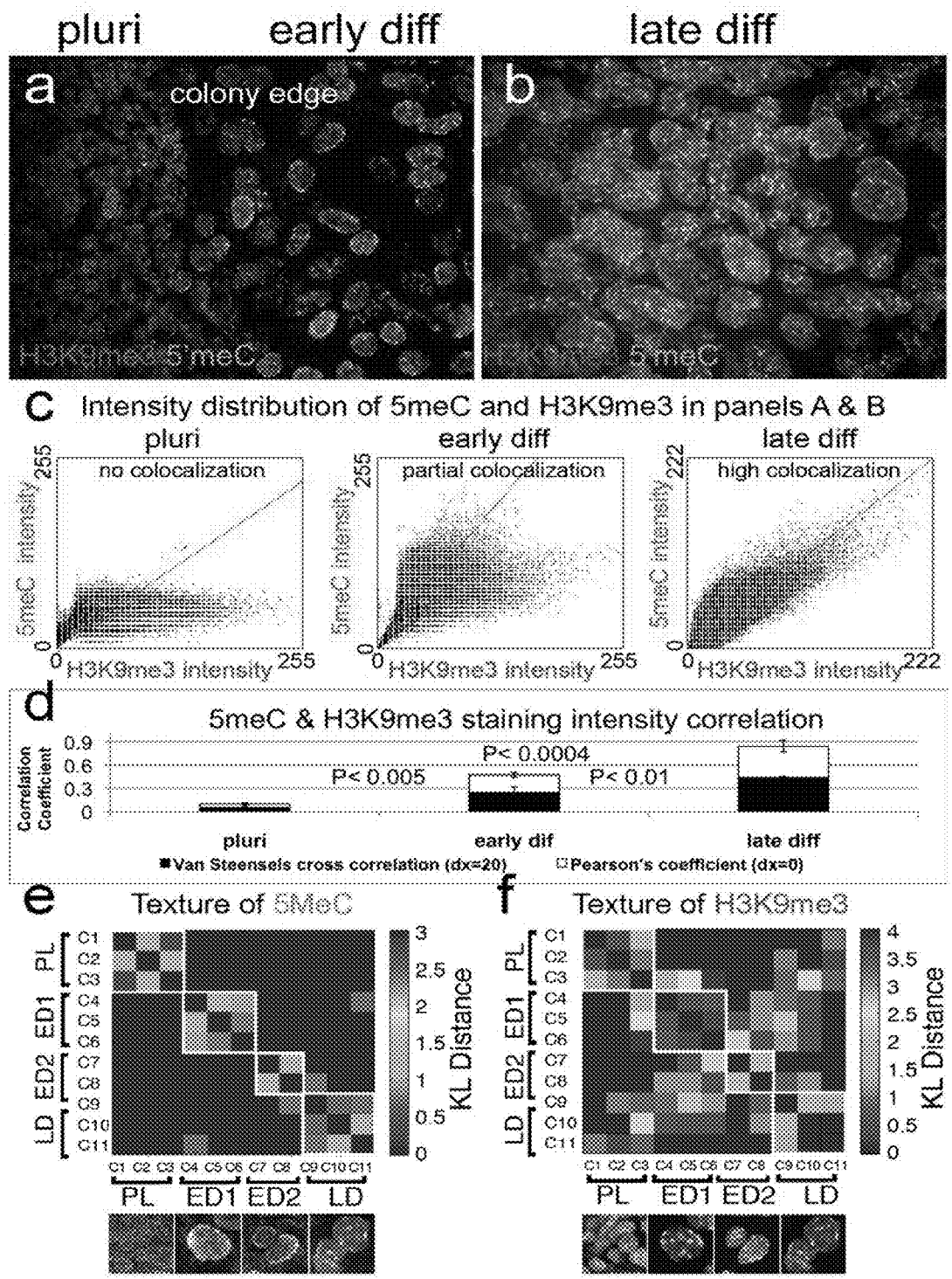
FIG. 15 shows that methylated histone and DNA become correlated and condensation of methylated DNA increases. Methylated histone and DNA are increasingly colocalized during neural differentiation. Maximum Projection, contrast stretched images (a, b) of hESCs line HSF-6 are stained for methylated H3K9me3 (red) and 5me Cytidine (green). By day 10, methyl-DNA and histone coincide. Correlation in single confocal slices is shown in cytofluorograms (c) that show the pixel distribution of DNA and histone methylation. The Pearson's coefficient (white bar, d) shows increasing correlation (mean, SD and P value). Van Steensel's cross correlation (black bar) is the Pearson's Coefficient after a 20-pixel shift of one of the images and measures the spatial sharpness of the co-distribution. Texture analysis of methylated DNA (e) and methylated histone H3K9me3 (f) was performed on Pluripotent (PL) Early Differentiated (ED 1 and 2) and Late Differentiated (LD) colonies (C1 through 11, 20 cells each). 5MeC texture could be separated into 4 statistically distinct classes ($P<1.0047 \times 10^{-015}$) of increasing intensity and condensation. In contrast the texture of H3K9me3 (constitutive heterochromatin) did not change significantly.

The changes in chromatin organization during differentiation to neurectoderm, precursors to brain lineages, was also characterized by nuclear texture analysis and cross correlation between histone and DNA methylation. Condensation of heterochromatin in stem cells was initiated during neural differentiation (FIG. 13). Texture analysis demonstrated a progressive accretion of chromatin into larger aggregates, while increased methylation of Histone H3 on lysine 9 and DNA on cytosine and correlated co-distribution followed the structural changes seen during the condensation of chromatin (FIGS. 14, 15). Structural and biochemical measurements demonstrate that canonical heterochromatin is absent from hESC and that heterochromatin formation occurs progressively during differentiation.

Example 8

Neurectoderm Differentiation from hESCs

There are several laboratories that have applied the BMP4 antagonist noggin for differentiation of hESC to neurectoderm or neural stem cells (Ying, Stavridis et al. 2003; Gerrard, Rodgers et al. 2005; Yao, Chen et al. 2006; Cohen, Itsykson et al. 2007). Here, small colonies grown in StemPro are used as the starting material. Cells were plated in StemPro media or neural differentiation media (DMEM/F12 media supplemented with N2/B27). After each day of growth, colonies with the smallest colonies were changed into Noggin media. When colonies grown in noggin had differentiated along a neurectoderm lineage, the cells were fixed for immunostaining. If the colonies had not differentiated, the media was changed and the cells remained in Noggin media for another day. The process was repeated each day for 6-7 days. Cells were immunostained with the following antibodies: Pax6 mouse (Santa Cruz), Otx2 rabbit (Abeam), Nestin mouse (Covance), Alexa 488 goat anti mouse green, Cy3 goat anti rabbit red, Cy5 goat anti mouse far red.

Under these conditions, differentiation was rapid and proceeded within 3-7 days to produce Nestin-positive cells, with an efficiency close to 100%. Cells grown N2/B27 DMEM/F12 media containing Noggin form a stable neural cell line in culture that was successfully passaged and maintained at high purity for over 2 months.

A. Surface Characterization of Polypyrrole Films

It is well known that surface characteristics of the substrate material may affect cell behavior (Salto et al., 2008b). As surface properties of polypyrrole films are largely influenced by the dopant type and concentration, characteristics of the four different PPy surfaces were compared. The amount of the peptide electrochemically deposited in the film was quantified by hydrolyzing peptide in HCL for 24 hrs and quantifying individual amino acids by HPLC. This method confirmed the presence of peptides on all PPy/peptide surfaces and the amount of peptide on each surface was estimated to be on the order of pmol/mm$^2$ surface area. The surface morphology of the film was observed by SEM. The thickness of the films synthesized at this charge density condition had been previously quantified to be around 40-50 nm (Stauffer and Cui, 2006). This condition showed the highest bioactivity manifested by highest neuron attachment possibly due to the maximum surface availability of the peptides (Stauffer and Cui, 2006). Therefore, the same charge density, i.e., thickness, was used for this study. At this thickness, the surface morphology of the film mostly conforms to the underlying gold layer on coverslips. SEM images at high magnification (40,000×, not shown) revealed no significant difference in surface morphology between four groups. The RMS roughness of the surface detected by AFM is shown in (Table 3) and no significant difference among four types of surfaces was found. These data excluded surface morphology and roughness as a factor affecting cell attachment and differentiation. Wettability or hydrophilicity of all surfaces was measured by static water contact angle (WCA) and reported in Table 4. All surfaces were hydrophilic with a WCA value ranging from 34.5° to 57.6°. The surface of PPy/p20 was slightly more hydrophobic than others with a WCA of 57.6°±0.6°. The PPy/PSS surface was the most hydrophilic with a WCA of 34.5°±1.6°. The PPy/p31 and PPy/pmix have intermediate WCAs that are very similar. As p20 is composed of more hydrophobic amino acids than p31, the higher WCA than PPy/p31 is expected. Notably, the PPy/pmix showed a water contact angle closer to PPy/p31.

B. Neuronal Differentiation of hESCs on Different Surfaces

Figure 16:
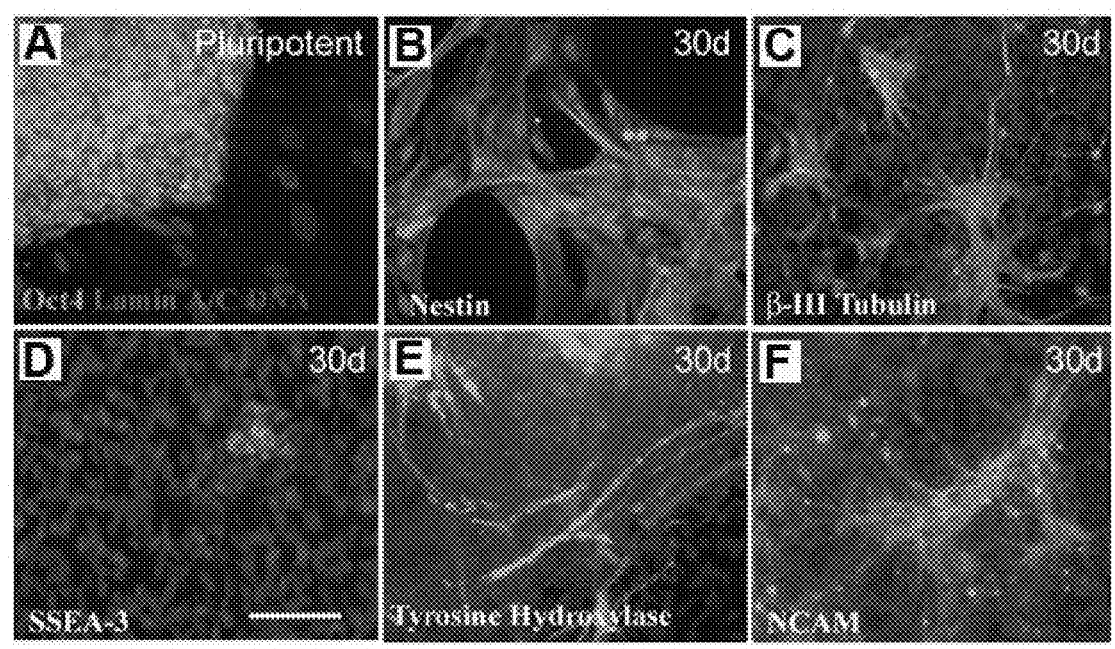
FIG. 16 shows that hESCs, cultured on normal density feeders, formed tight pluripotent colonies positive for Oct4 (A, green) and negative for Lamin A/C (A, red). Feeder fibroblasts stained positively for nuclear lamin A/C (A). Cells cultured on 50% feeder density for 30 days (B-F) presented markers in hierarchy of differentiation from pluripotent to committed neuronal lineages including the neural progenitor marker (B, Nestin) and neuronal markers (C, β-III Tubulin, E, tyrosine hydroxylase, and F, NCAM). Rare pluripotent cells were seen (D, SSEA-3, green). Nuclei were stained with Hoechst 33258 (blue). Bar in D, 100 µm.

The hESCs (line UCO6 (HSF6)) were routinely confirmed for pluripotency by morphology and immunostaining for Oct4 and SSEA3 and the absence of Lamin A/C, an early marker for differentiation (Constantinescu et al., 2005) (FIG. 16A). For neuronal differentiation, embryoid bodies were passaged onto low-density feeders that were plated at 50% of that needed to maintain pluripotency. Low-density fibroblasts promoted hESC survival and restricted differentiation to neural lineages (Ozolek et al., 2007; Ozolek et al., 2010). After 30 days on 50% feeder density, HSF6 cells produced various neuronal lineages and neural progenitor stem cells (FIG. 16B-F). Cells stained positively for neural differentiation markers including nestin (neurectoderm and neural stem cells, FIG. 16B), Tuj 1 antibody (β-III Tubulin, for committed neurons, FIG. 16C), NCAM (neural cell adhesion molecule for committed neurons, FIG. 16F) and tyrosine hydroxylase (specific for terminally differentiated dopaminergic neurons, FIG. 16E), but not GFAP (astrocyte marker, not shown) and not 04 (oligodendrocyte marker, not shown). Pluripotency markers, SSEA-3 and SSEA-4 were rare (FIG. 16D). Therefore, the HSF6 have the capacity to form a variety of neural lineages depending on external conditions.

Figure 17:
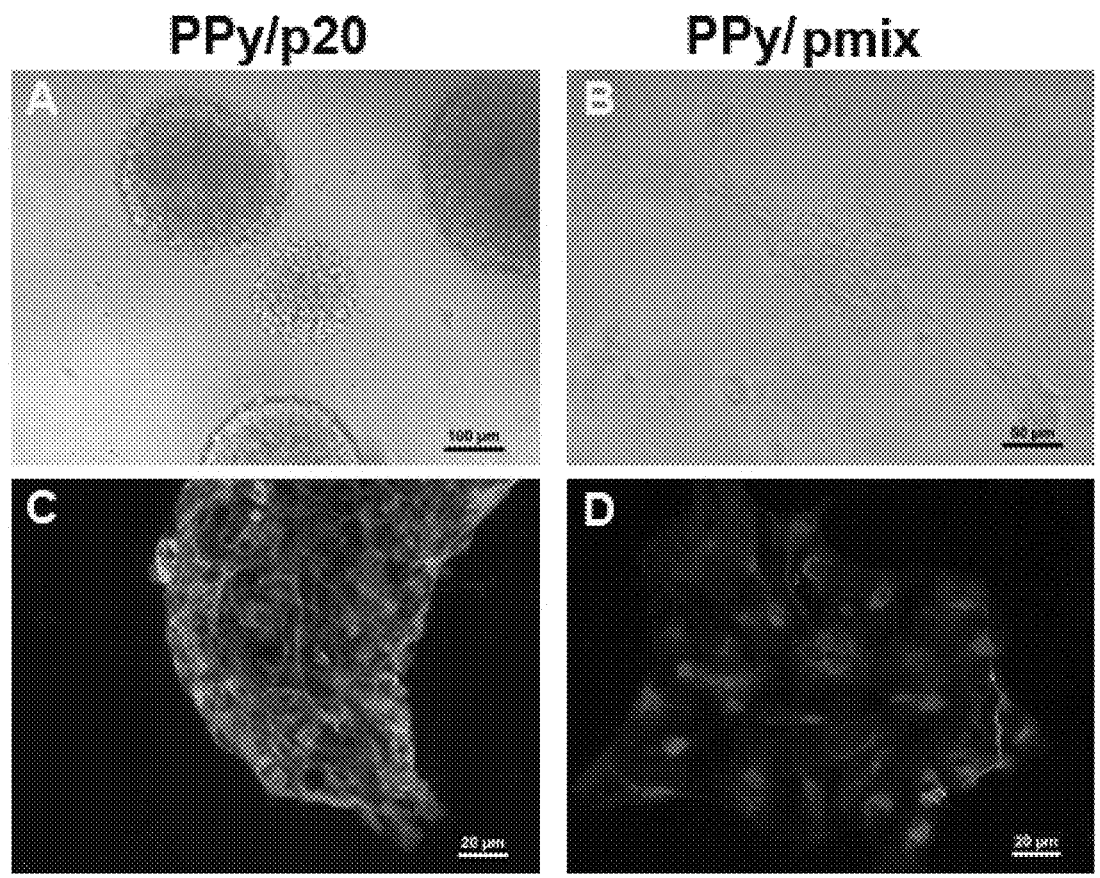
FIG. 17 shows hESCs cultured on PPy/p20 and PPy/pmix surfaces for 7 days. hESC colonies spread more widely on PPy/pmix surface (B) compared to those on PPy/p20 surface (A), although nestin positive neural stem cells (red) were seen in both conditions, fewer neurons (β-III Tubulin positive, green) were found on PPy/pmix surface (D) than on PPy/p20 surface (C). The pluripotent marker SSEA-3 was not found, suggesting that pluripotent cells differentiated more readily than on control surfaces (gelatin and feeder fibroblast conditioned substrates).

Next, hESCs were cultured in feeder-free conditions coated with various substrates. The hESC colonies on tissue culture plastic did not adhere or survive. Within the first week, embryoid bodies adhered to laminin and PPy/peptides surfaces while very few attached to PPy/PSS. The hESCs on PPy/p20 adhered but did not spread while hESCs on PPy/pmix spread and extended neurites. The hESCs on PPy/p31 adhered and spread most widely (not shown). Cells in non-spread colonies did not extend lamella but differentiated into neuroectodermal (nestin) and neuronal lineages (β-III tubulin). Spread colonies on PPy/pmix substrates extended lamella and differentiated to nestin positive neuroectoderm or neural stem cells (FIG. 17). Unlike hESC grown on low-density feeders, pluripotent cells (SSEA-3) were not found, suggesting laminin-induced differentiation with higher efficiency.

Figure 18:
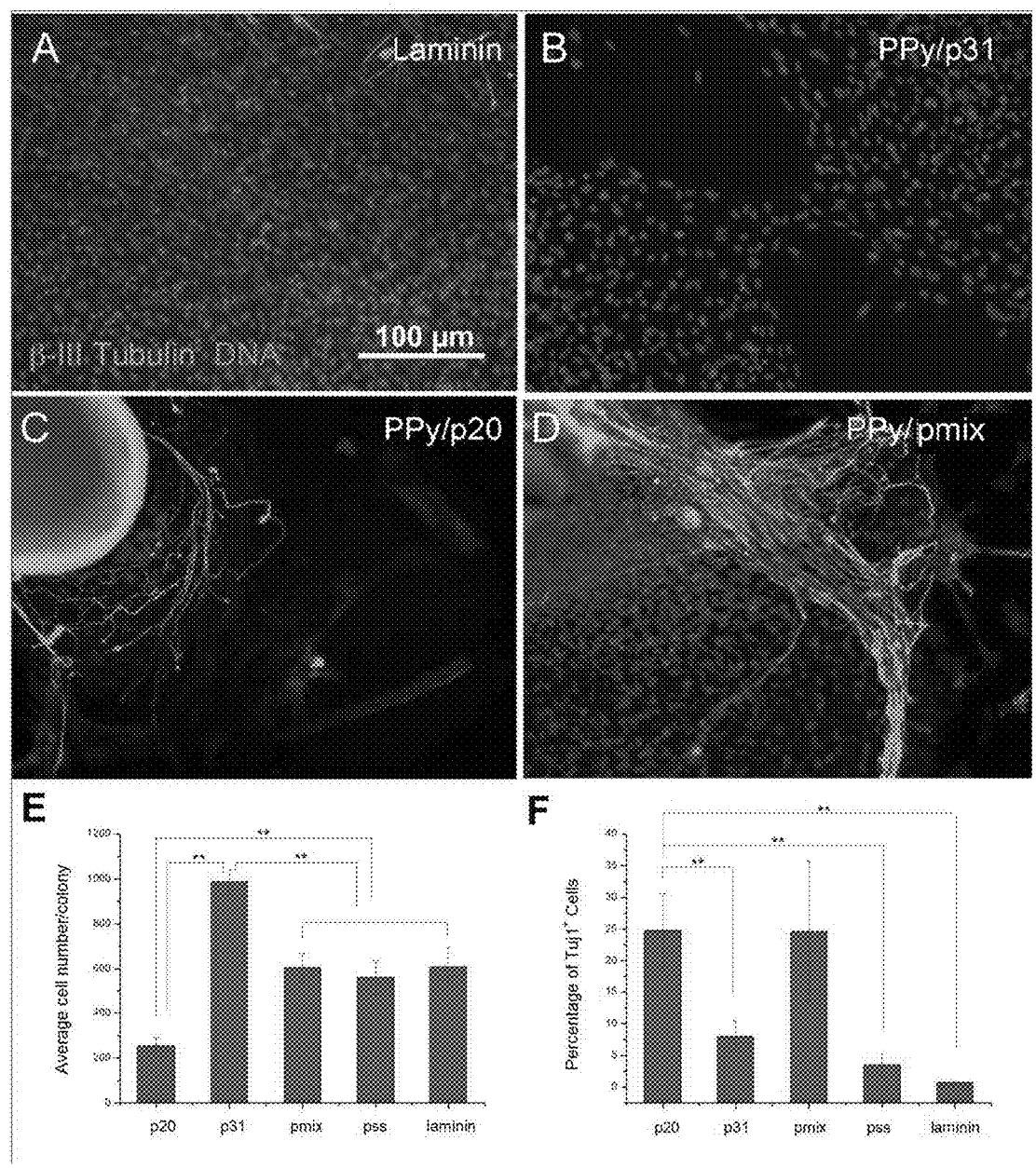
FIG. 18 shows hESC-derived neuronal cells on various surfaces after 14 days in culture, immunostained for (β-III Tubulin (green) and counterstained with Hoechst for nuclear (blue). Average cell number per colony was the highest on PPy/p31 surface and the lowest on PPy/p20 surface. There is no significant difference in average cell number between pmix, PSS and laminin. Percentage of cells that were β-111 tubulin positive committed neurons was found to be the highest on p20 containing surfaces (PPy/p20 and PPy/pmix), and all PPy/peptide surface produce a higher fraction of neuronal cells than the laminin control. A: Laminin; B: PPy/p31; C: PPy/p20; D: PPy/pmix, E: Average cell number/colony and F: percentage of neurons. n=20; **, $p<0.01$.

At the end of the second week, cell number and the fraction of committed neurons were evaluated (FIG. 18). PPy/PSS surfaces had very few colonies attached and few cells were β-111 tubulin positive. Laminin surfaces showed very large monolayers of cells with β-III Tubulin that was not yet bundled into processes, characteristic of neuronally committed progenitor cells. Very large monolayer colonies of early neuroectodermal cells with very sparse neurons were observed on PPy/p31 surfaces while cells on PPy/p20 surfaces had small dense multilayer colonies with a high proportion of more differentiated, neuronal populations (FIG. 18, A-D). The number of cells in each colony was quantified and significantly more cells per colony were found on PPy/p31 surfaces than on any other tested substrate, while fewer cells per colony were produced on PPy/p20 than on all other substrates (p<0.01). The number of cells per colony on PPy/pmix, PPy/PSS and laminin were indistinguishable. Most cells under these conditions were nestin positive neural stem cells (FIG. 17). However, the percentage of β-111 tubulin positive committed neurons could be increased to 25% with comparison between laminin and PPy/p20 containing substrate. The percentage of cells that were β-111 tubulin positive committed neurons was found to be the highest on p20 containing surfaces (PPy/p20 and PPy/pmix) and all PPy/peptide surfaces produced a higher fraction of neuronal cells than the laminin control (FIG. 18, E-F).

Differentiation of hESC line HSF6 has been studied on feeder fibroblasts on gelatin (Constantinescu et al., 2005; St John et al., 2005; Postovit et al., 2006; Ozolek et al., 2007). Fibroblasts modify the levels of Activin A, bFGF and BMP in culture media containing knockout serum replacer (Xu et al., 2005). While feeders are necessary in knockout serum containing media, pluripotent HSF6 can be maintained in chemically defined feeder-free media on matrigel or on defined fibronectin or collagen I substrates, and also can be induced to neuronal lineages in feeder free media by the addition of bFGF and inhibition of BMP4 signaling (Ludovic et al., 2009; Vallier et al., 2009). However, since hESC do not survive in knockout serum replacer media in the complete absence of feeders, our results show that modifying substrate chemistry is sufficient to promote neural differentiation in knockout serum replacer media. Addition of PPy surfaces without bioactive dopants is insufficient for survival.

However, better adhesion and differentiation can be obtained on PPy surfaces doped with peptides. Notably, all PPy/peptide surfaces promoted exit from pluripotency and more uniform neural differentiation than on low-density feeders. p20 and p31 both promoted cell adhesion and neuronal differentiation compared to the PPy/PSS, however, they showed different properties. The surfaces with p31 showed much higher cell attachment and spreading, while the surface with p20 showed much higher terminal neuronal differentiation. When both peptides are present on the surface, both cell number and neuron number are highest and show superior properties compared to the laminin control.

Figure 19:
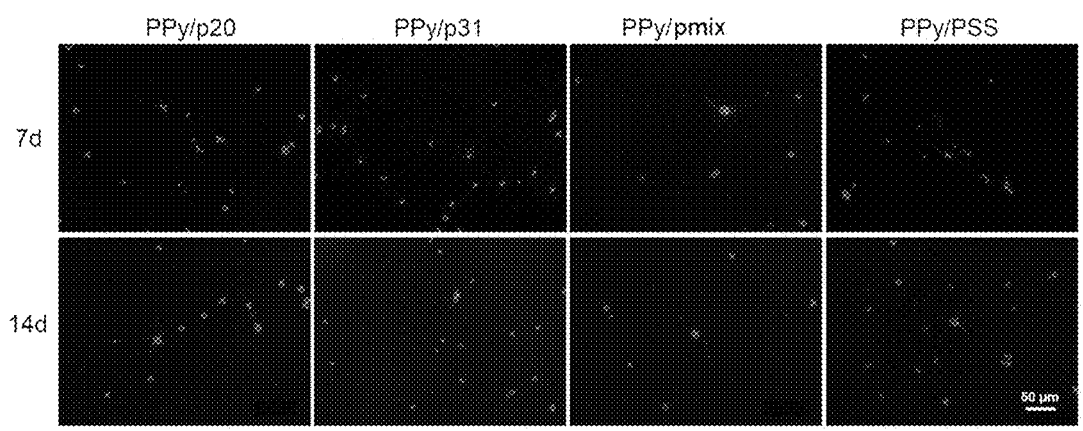
FIG. 19 shows neuronal differentiation of rNSCs on PPy/p20, PPy/p31, PPy/pmix and PPy/PSS surfaces after culturing for 7 days (7 d) and 14 days (14 d), shown by immunostained NF-200 (red) and counterstained with Hoechst for nuclear (blue). At 7 d, the NF200-positive cells extend short neurites. At 14 d, the neurites extended much more longer than those at 7 d.

C. Neuronal Differentiation of rNSCs Cultured on Different Surfaces rNSCs were originally isolated and purified from adult rat hippocampi (Gage et al., 1995; Palmer et al., 1997b). rNSCs have the potential to differentiate into all three lineages in the central nervous system, and the relative proportion of each lineage can be largely affected by environmental cues, such as serum, hormone and growth factors. rNSCs were induced to differentiate on PPy/p20, PPy/p31, PPy/pmix, PPy/PSS and laminin surfaces for 3 days, 7 days and 14 days. On all surfaces, similar total number of cells was found at 3 d, 7 d and 14 d (data not shown). Neuronal differentiation was detected by immunofluorescence staining for NF-200. The number of neurons (NF positive cells) increased between 3 d to 7 d and remained steady up to 14 d. The positive control laminin surface had a higher percentage of neurons than any other PPy surfaces at both 7 d and 14 d. Among the PPy samples, at 7 d, significantly more neurons were found on the PPy/p20 than others. There was no difference between PPy/p31, PPy/pmix and PPy/p20. At 14 d, a significantly higher percentage of neurons was found in PPy/p20 than all other PPy groups. There was also a significantly higher percentage of neurons on the pmix surfaces than PPy/p31 and PPy/PSS, but no difference between PPy/p31 and PPy/PSS (FIGS. 19 and 20A). Both the "all neurites length" and "primary neurite length" were quantified. Significantly longer "primary neurite length" were found on PPy/p20 than on all other PPy surfaces, while no differences were found among PPy/p31, PPy/pmix, and PPy/PSS. Significantly longer "total neurites length" was found on PPy/p20 and PPy/pmix than on PPy/p31 and PPy/PSS surfaces (FIGS. 19 and 20B).

In the rNSC study, PPy doped with p20 significantly promoted neuronal differentiation compared with all other groups, and there was significant difference between PPy/p20 and PPy/p31 groups at both day 7 and day 14. This result concurred with what was found in the hESC study. However, unlike the hESCs, the rNSCs can survive and differentiate on PPy surface without bioactive dopants and no difference in number of cells among all groups was observed at any examined time points. This line of rNSCs is highly adherent and can easily attach to any surface without adhesive molecules such as polylysine or laminin. Therefore, the cell attachment was not affected by the peptides presented at the surface. Primary neurite outgrowth of rNSCs was promoted on p20 containing PPy surfaces, and the total neurite length on PPy/p20 was significantly longer than on all other surfaces. Thus, p20 not only promoted the neuronal differentiation but also promoted the neurite outgrowth of the differentiated neurons.

Example 9

In Vitro Neural Differentiation of hESCs Using a Low-Density Mouse Embryonic Fibroblast Feeder Protocol In this example, hESCs were "naturally" directed into primarily neuroglial phenotypes with between 50 and 80% efficiency by using a low-density mouse embryonic fibroblast (MEF) feeder protocol. Both the HSF-6 hESC line and the H7 hESC line were used. Using the low-density MEF feeder approach, cells began to express neuroepithelial/neural stem cell markers (nestin, Pax-6) in the first week with continued expression into the second week with little expression of other germ layer markers. Markers of maturing neural cells such as b-tubulin, NCAM, and DCX were present in the first week, but expression was accelerated between the first and second weeks and NeuN, a mature neural phenotypic marker, was initially seen sparsely but increased in the second and third weeks in culture. 50-80% of cells expressed markers of developing and maturing/mature neural lineages. For both of the hESC lines, an MEF density of 10.4 K cells/cm$^2$ promoted an orderly and rapid progression to neural phenotypes. Very reduced densities (5.2 K cells/cm$^2$) promoted increased proliferative and programmed cell death and perhaps delayed and aberrant emergence of neural phenotypes, particularly in the H7 line. Embryoid bodies (EBs) appeared already differentiated toward neuroglial phenotypes even after a short time in culture and this program is maintained on the low-density protocol.

Figure 21:
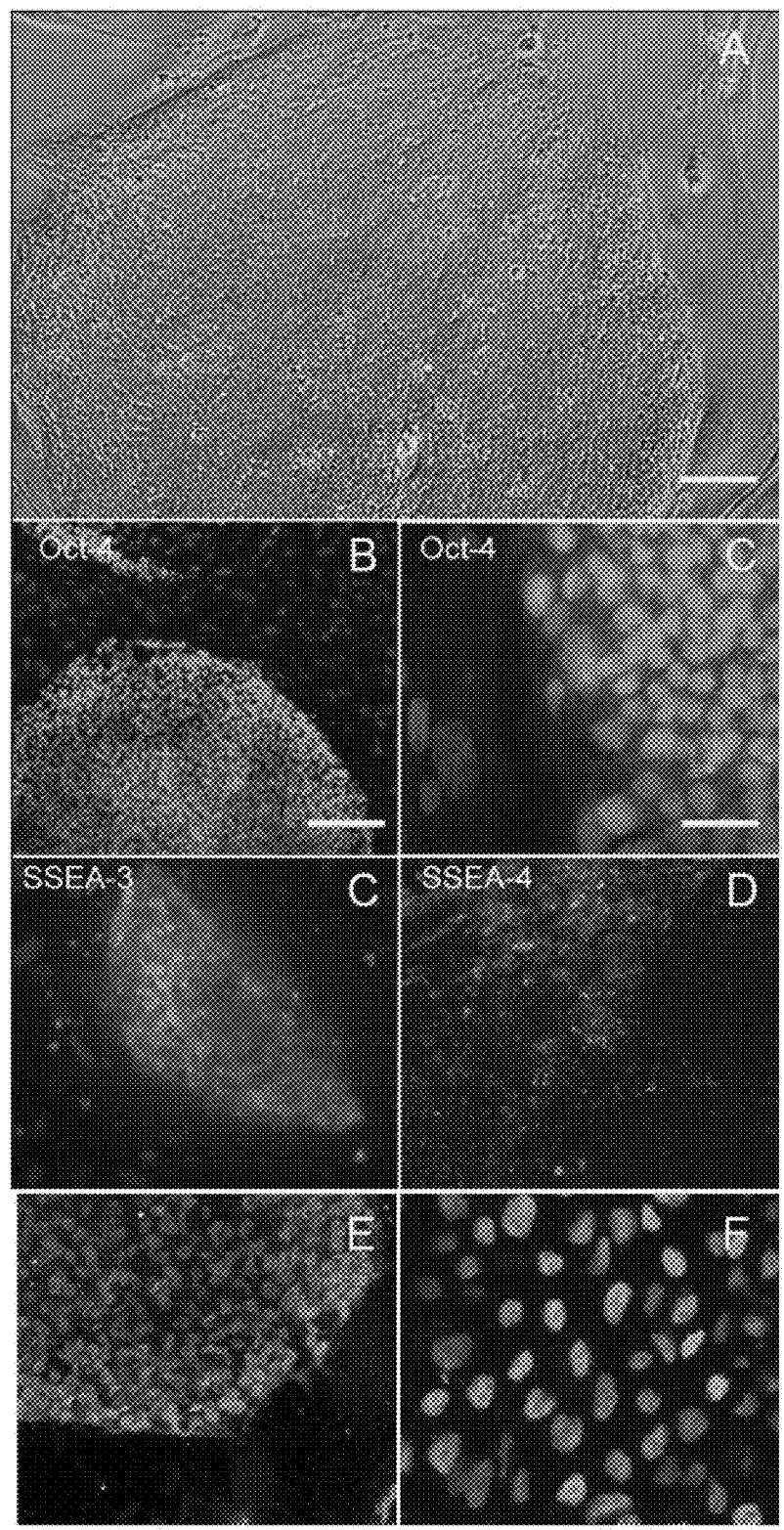
FIG. 21 shows an image of pluripotent hESCs.

FIG. 21 shows an image of pluripotent hESCs. HSF-6 and H7 grown on mouse embryonic fibroblasts feeder cells at density of 5.2K cells/cm$^2$. FIG. 21A shows a phase contrast image of HSF-6 pluripotent colony. FIGS. 21B-C shows Oct-3/4 staining (green) of undifferentiated HSF-6. Feeders are Oct-3/4 negative. Note the nuclear size difference (Hoechst DNA-blue) between cells within the colony and fibroblast-like feeder cells. FIG. 21D shows SSEA-3 staining of an entire undifferentiated HSF-6 colony. Note that the cell surface proteoglycan partially covers the colony. FIG. 21E shows an H7 hESC colony on mouse embryonic fibroblast feeders stained with Oct-3/4 (green) and the neurectodermal marker, nestin (red). Differentiation is commonly seen in cells at the colony periphery and nestin is found at low levels in cells within the colony. FIG. 21F shows that on feeder fibroblasts, Oct-3/4 positive colonies (green) are negative for the trophectodermal marker CDX-2 (red). Bar in A. 100 μm.; B. 50 μm; C. 25 μm.

Figure 22:
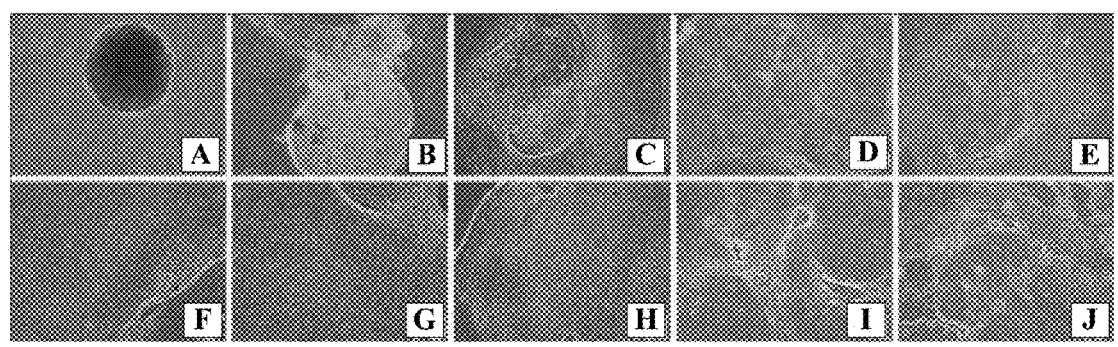
FIG. 22 shows phase contrast images of H7 hESCs.

FIG. 22 shows phase contrast images of H7 hESCd. FIG. 22A shows H7 EB in suspension at day8. FIGS. 22B-22E show day 15 on feeders; Left to right: H7EB/LDMEF, H7 EB/NDMEF, H7/LDMEF, H7/NDMEF. EBs at day 15 after seeding still maintain thick centers with complex formations within the central portions while differentiated cells spread in a corona from the center. EBs on NDMEF are spreading from the center of the EB compared to EB on LDMEF. FIGS. 22F-22J show day 30 on feeders; Left to right H7EB/Gelatin only, H7EB/LDMEF, H7 EB/NDMEF, H7/LDMEF, H7/NDMEF. At day 30, EBs are plated out in sheets of differentiated cells. H7s on LD and ND MEFs shows spreading of differentiated cells at day 15 and form more complex tubular structures at day 30 (arrows). All images taken using 4× objective. EB=embryoid body, LDMEF=low-density mouse embryonic fibroblast, NDMEF=normal-density mouse embryonic fibroblast.

Figure 23:
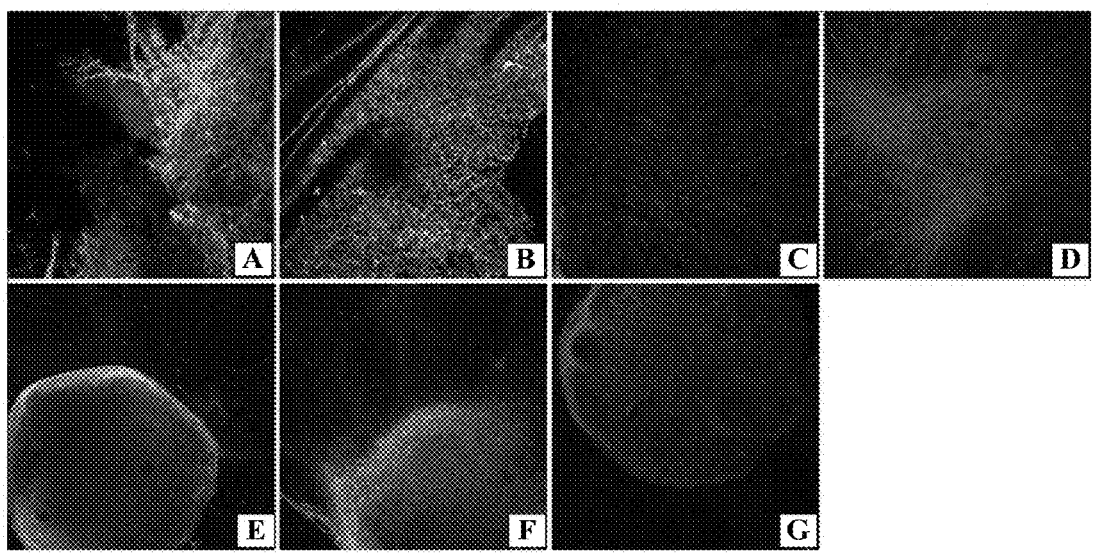
FIG. 23 shows H7EB cells grown on gelatin, LDMEF, and NDMEF.

FIG. 23 shows H7EB cells grown on gelatin, LDMEF, and NDMEF: FIG. 23A shows Nestin (red)/DCX (green) double labeling of H7EB/LDMEF after 5 days (20×). FIG. 23B shows NCAM (red)/Class III β-tubulin (green) double labeling of H7EB/LDMEF (20×). FIGS. 23C-23D show H7EB/LDMEF-D 15: Diffuse staining with Class III β-tubulin (red) and weaker staining with DCX (green) (10×). 5D) H7EB/LDMEF-D30: Persistence of labeling with Class III β-tubulin (red) and DCX (green) (10×). FIGS. 23E-23F show both H7EB/NDMEF and EB/Gelatin at day 15 show widespread appropriate expression of Class III β-tubulin (red) and DCX (green) (10×). FIG. 23G H7EB/Gelatin at day 15 shows diffuse expression of GFAP (red) and no Oct-3/4 staining (10×). EB=embryoid body, LDMEF=low-density mouse embryonic fibroblasts, NDMEF=normal-density mouse embryonic fibroblasts, D15=day 15 after plating on feeders, D30=day 30 after plating on feeders, DCX=doublecortin, GFAP=glial fibrillary acidic protein.

Figure 24:
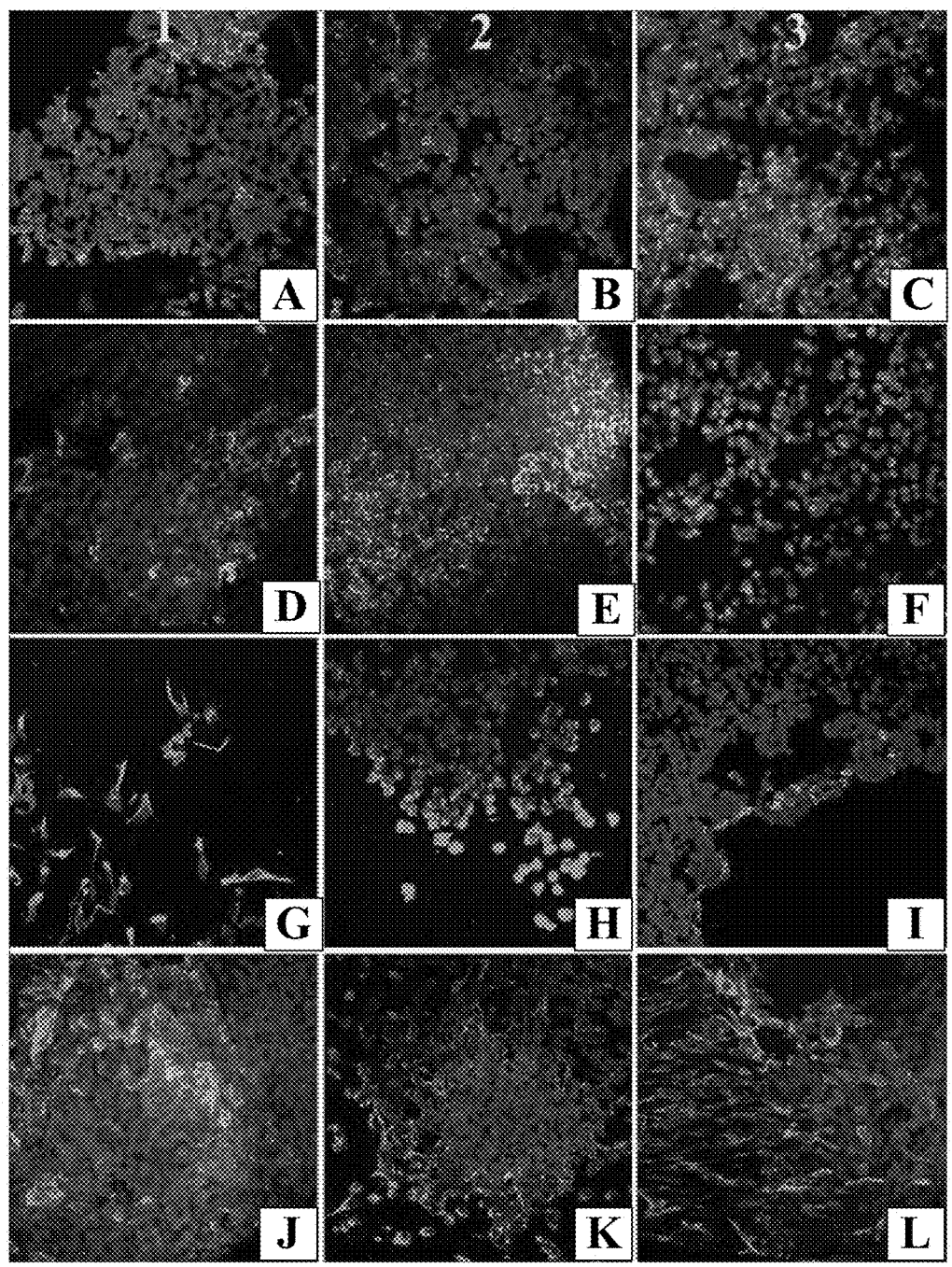
FIG. 24 shows H7 cells grown on LDMEF at day 5 and 10 in culture.

FIG. 24 shows H7 cells grown on LDMEF at day 5 and 10 in culture. Rows 1-4 (red numbers): D5/10.4K, D5/15.6K, D10/10.4K, D10/15.6K respectively; Columns 1-3 (yellow numbers): Nestin (green)/Oct-3/4 (red), Nestin (green)/DCX (red), Class III β-tubulin (green)/NeuN (red) respectively. Widespread staining for nestin was apparent at both days and feeder densities. Oct-3/4 was focally present at day 5 and almost gone by day 10 in culture. The staining for Oct-3/4 seen at day 10 at 150K density was mostly in the cytoplasmic compartment. Staining for DCX was consistently present in greater amount when H7 were grown on 150K density at both day 5 and day 10. Class III β-tubulin was present at both time points and feeder densities. All images using 40× objective. Feeder density represented as MEFs/cm$^2$ (10.4K=10,400 MEFs/cm$^2$). LDMEF=low-density mouse embryonic fibroblast, DCX=doublecortin.

Figure 25:
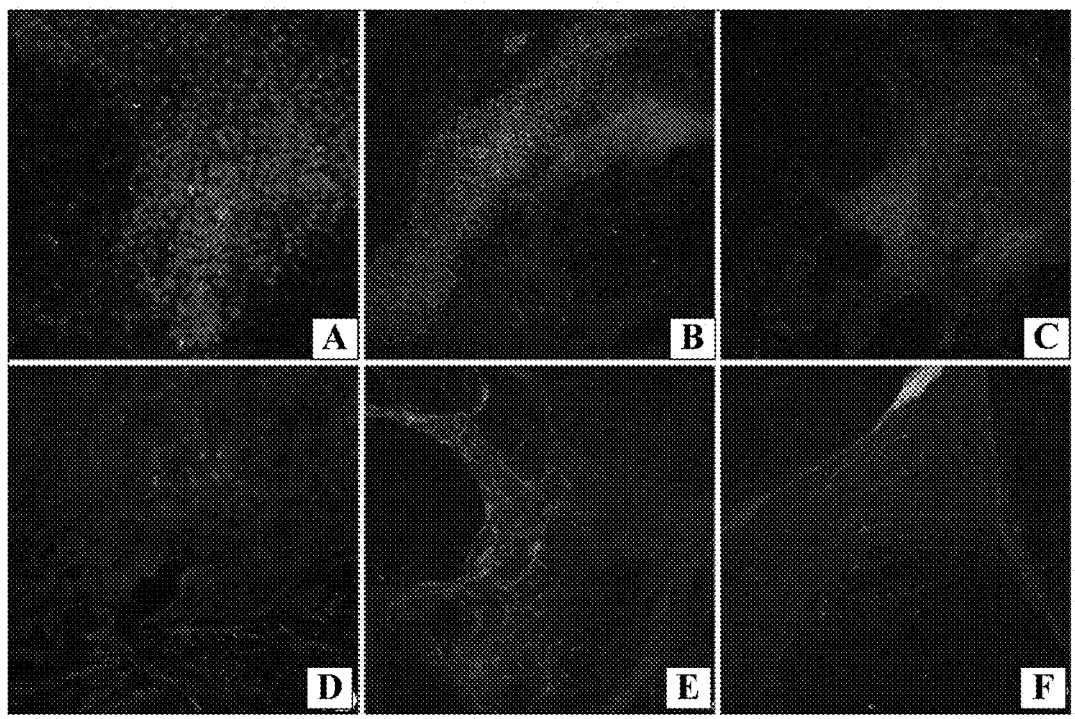
FIG. 25 shows H7 cells grown on LD- and NDMEF at days 15 and 30 in culture.

FIG. 25 shows H7 cells grown on LD- and NDMEF at days 15 and 30 in culture. FIG. 25A-25C shows Nestin (red) and Pax-6 (green) expression. Sparse expression of nestin and Pax-6 at day 15 on LDMEF (7A) (40×). Very diffuse staining for nestin and Pax-6 at day 30 on LDMEF (25B) with decreasing expression at day 30 on NDMEF (25C). H7/LDMEF at both days 15 and 30 demonstrated widespread expression of Class III β-tubulin (red) with more noticeable expression of DCX (green) at day 30 (25D, 25E). Day 30 expression of Class III β-tubulin is more structured with cells containing long processes connecting to each other in networks. Similar expression of Class III β-tubulin and DCX is seen for H7/NDMEF at day 30 (25G). All images except 7A using 10× objective. LDMEF=low-density mouse embryonic fibroblasts, NDMEF=normal density mouse embryonic fibroblasts, DCX=doublecortin.

Figure 10:
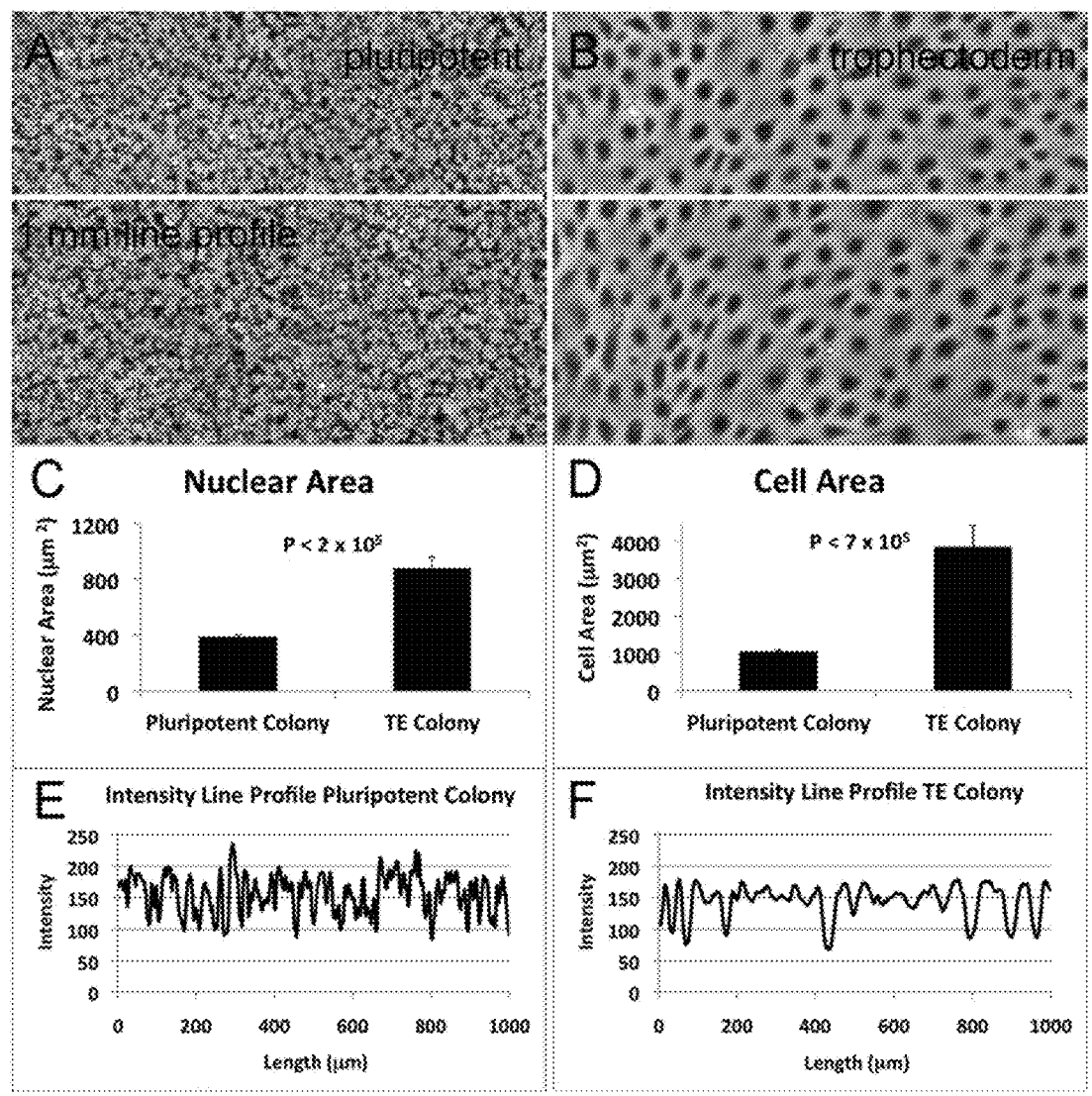
FIG. 10 shows that texture analysis is sensitive to subtle changes in cell size, uniformity and internuclear distance. Pluripotent hESCs (A) and differentiated TE colonies at days 9 and 10, respectively. Morphological measures of nuclear and cell area increased 2.4 and 3.6 fold respectively and changes were statistically significant (p<0.05). An integrated measure of colony morphology is illustrated by the one dimensional intensity line profile (1 mm line in A, B, plotted in E, F). The changes in image intensity with position (spatial frequency) depend on both nuclear and cell size and were higher in pluripotent than in TE colonies. Spatial frequency can then be measured using wavelet analysis, a generalized two-dimensional, multiscalar measure of image texture.
Figure 20:
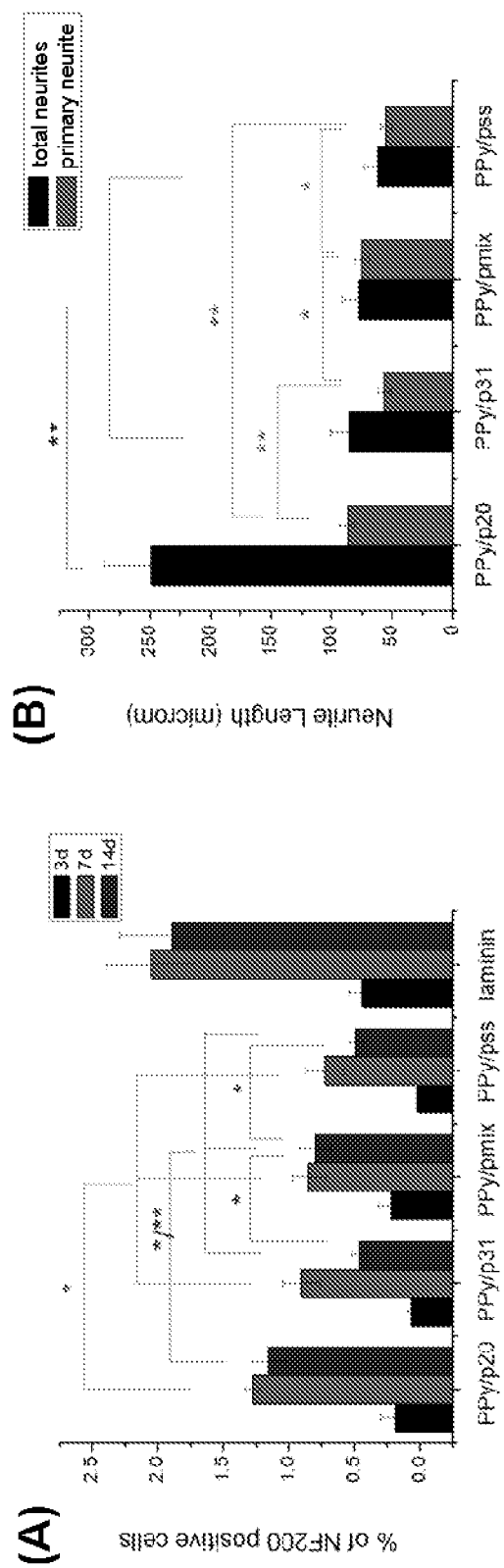
FIG. 20 shows the percentage of NF200 positive cells and neurite lengths on four PPy surfaces. Differentiation of rNSCs on laminin surfaces was included as a control. Enhanced neuronal differentiation was found on PPy/p20 surfaces. There is a significant difference in percentage of NF200-positive cells between PPy/p20 and PPy/p31 surfaces at 7 d and 14 d (A) while there were nearly the same total number of cells on these surfaces (not shown). (n=3, more than 1000 cells were counted in each sample.) Average "total neurite length" of NF200⁺ cells in each group at 14 d showed a significant difference between PPy/p20 and all other groups, while other groups showed no difference when compared to each other. A significantly longer "primary neurite length" was found on PPy/p20 and PPy/pmix surfaces (B) (*, $p<0.05$; **, $p<0.01$; n>25).s
Figure 26:
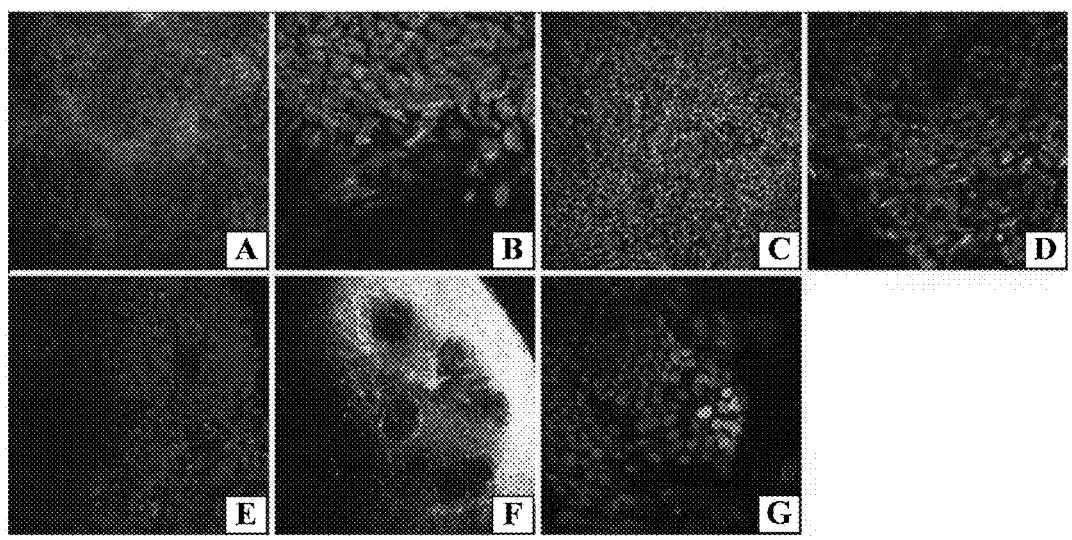
FIG. 26 shows HSF-6 hESCs grown on LDMEF.

FIG. 26 shows HSF-6 hESCs grown on LDMEF. FIG. 26A-26B shows that on 5.2K at day 7 in culture there is widespread nestin (green) and little to no Pax-6 (red) expression (FIG. 26A, 10×) with only focal expression of Pax-6 at the edges of colonies (FIG. 26B, 40×). By day 7, nestin expression is widespread particularly at the differentiated edges of colonies. However, when grown on 10.4K MEFs, Pax-6 expression peaks at day 7 (FIG. 26C, 20×) and very little is seen at day 12 at 10.4K MEF (FIG. 26D, 40×). Sparse staining for mature neuronal markers such as NeuN is seen at any density or time point and very little Class III β-tubulin is present at 10.4K MEF at day 7 (FIG. 26E, 20×). Widespread Class III β-tubulin and NCAM expression is seen by day 12 again most prevalent in cells grown on 10.4K MEF (FIG. 26F, 10×). Oct-3/4 staining is minimal at day 7 on 10.4K MEF (FIG. 26G, 40×). MEFs=mouse embryonic fibroblasts, MEF density given as cells/cm$^2$ (10.4K-10,400 cells/cm$^2$).

Figure 27:
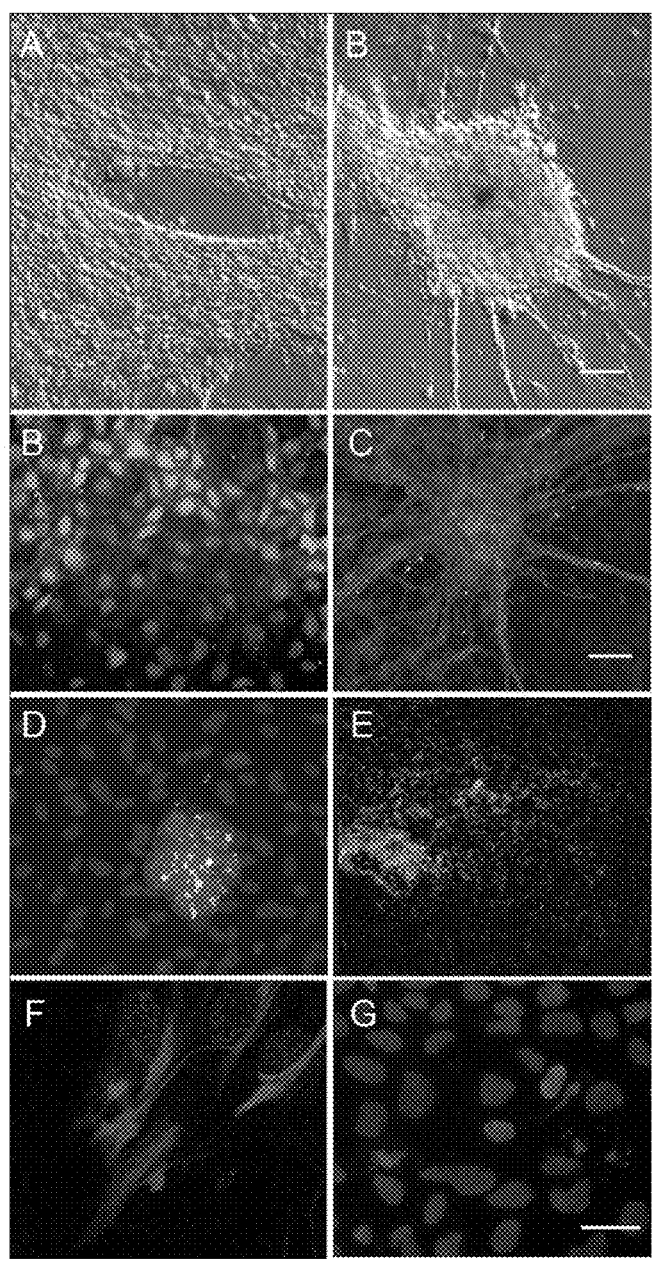
FIG. 27 shows neurectodermal lineages from adherent HSF-6 hESC and H7 on low density feeders (5.2K cells/$cm^2$).

FIG. 27 shows neurectodermal lineages from adherent HSF-6 hESC and H7 on low density feeders (5.2K cells/cm$^2$). HSF-6 cells cultured on low density feeders form either epithelioid sheets (A) or foci with radial fibers (B). Colonies exhibit positive staining with neurectodermal markers sox-1 (green), mushashi-1 (red, C) and sparse staining with mesenchymal marker, brachyury (red, D) or extra-embryonic marker, GATA-4 (Red, E). HSF-6 cells were differentiated on 0.1% gelatin for 42 days (A) or 36 days (C) before fixing and imaging. While both sox-1 and brachyury staining was observed within tight colonies, no individual cells outside of the groups exhibited staining for brachyury or GATA-4. H7 cells differentiated for 1 week also show high levels of nestin (red, F), typically over 60% of cells in culture. Rare cells were positive for the trophectodermal marker, CDX-2 (red, G).

Example 10

Figure 28:
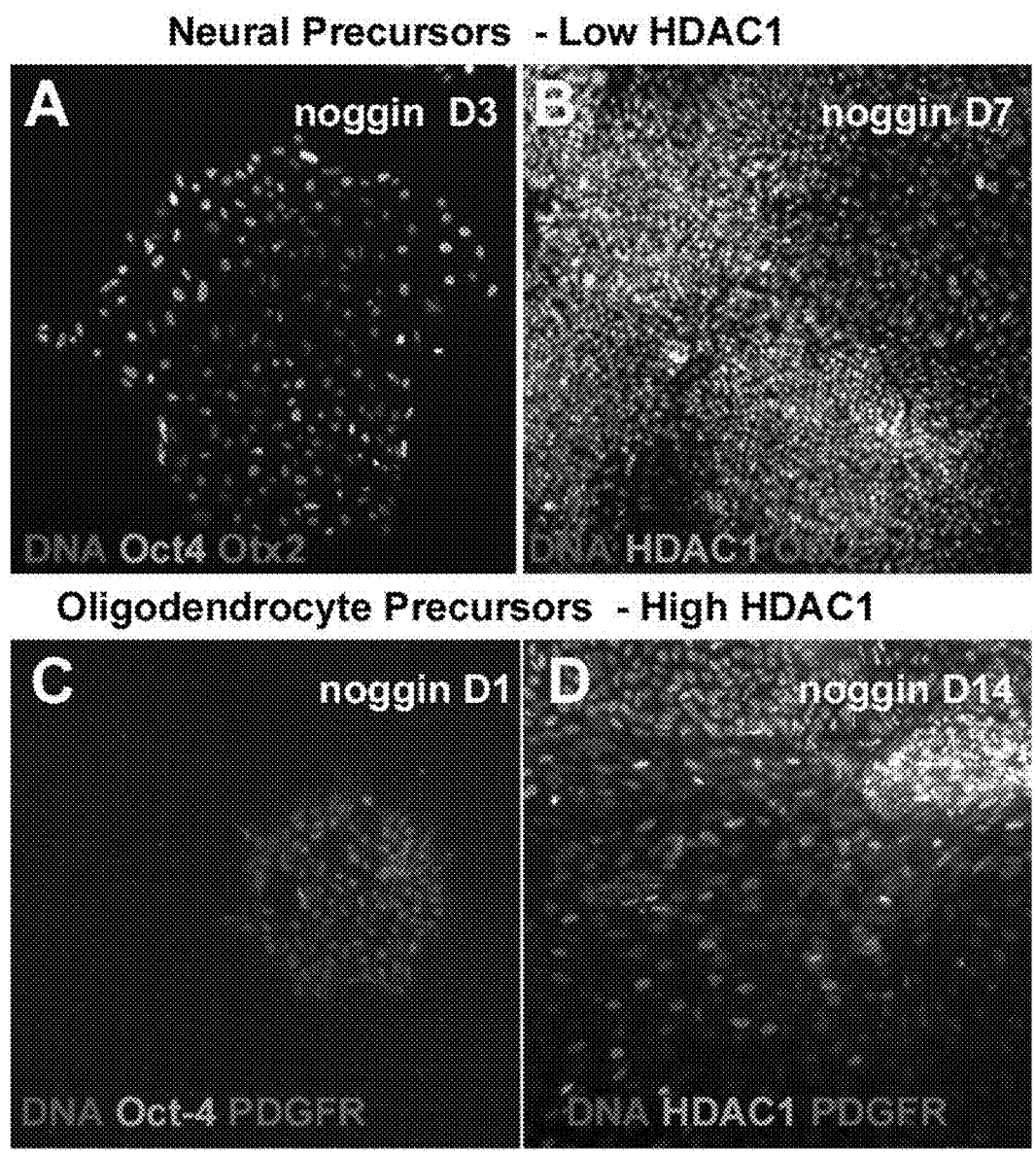
FIG. 28 shows enrichment of HDAC 1 in oligodendrocyte progenitors, but not in neural progenitors derived from hESC. hESC were passaged as large colonies (>100 cells) (A, B) or small colonies and single cells (C, D) in neural differentiation media containing 100 ng/ml noggin, N2/B27 supplements in a DMEM/F12 base. (A) On day 3, colonies were partly differentiated, with the epiblast/early neural marker, Otx2 (red) co-staining with Oct-4 (costaining of red and green and DNA in blue appears mauve). (B) By day 7, larger, multilayer colonies were positive for Otx2, but levels of HDAC 1 were reduced compared to pluripotent cells (see FIG. 4). (C) On day 1, small colonies of cells in noggin/N2/B27 media lost Oct4 staining more rapidly but were negative for the oligodendrocyte precursor marker, PDGFR. (D) By day 14, Oligodendrocyte markers appeared in mixed population colonies. Only cells positive for PDGFR co-stained for HDAC1.

Enrichment of HDAC 1 in Oligodendrocyte Progenitors, but not in Neural Progenitors Derived from hESC Starting with large embryoid bodies (>1000 cells), cells were induced to differentiate along neural lineages (FIGS. 28A-28B). Oligodendrocyte precursor cells (OPCs), positive for platelet derived growth factor receptor (PDGFR), were produced by starting with hESC cultured in StemPro® (Invitrogen, USA) or mTeSR® (Stem Cell Technologies, Inc., USA) media rather than using cells cultured on feeder cells, and by passaging cells as single cells or small colonies (FIGS. 28C-28D). The PDGFR-positive cultures are negative for beta III tubulin and nestin (not shown). Further confirmation of OPC identity is obtained from staining with the definitive marker set, Olig1, SOX10, A2B5, NG2, and PDGFR. OPC proliferation and differentiation are sensitive to cell density and the microenvironment. OPCs are enriched using protocols known in the art, for example employing a second stage treatment with PDGF-AA or FGF2 and EGF, or magnetic bead sorting using the cell surface marker, AC133.

Neural cells are further enriched by treatment with noggin and SB431542. Therefore controlling cell density and differentiation media is sufficient to produce Pax6+ neural progenitor in sufficient numbers for live cell and biochemical studies. Selective protocols for astrocyte precursors have not been as well investigated, but fetal bovine serum and BMP4 promote astrocyte precursors over neural precursor cells (NPCs) by inducing the transcription factor IDI.

Example 11

Effects of HDAC Inhibition on Growth, Differentiation and Motility of hESCs

Valproic acid (VPA), an HDAC inhibitor, is a fatty acid derivative with mood-stabilizing and anticonvulsant properties, is a pan-specific HDAC inhibitor that binds to the active site of the enzymes; VPA inhibits class I and class IIa HDACs, but not class Jib.

Figure 29:
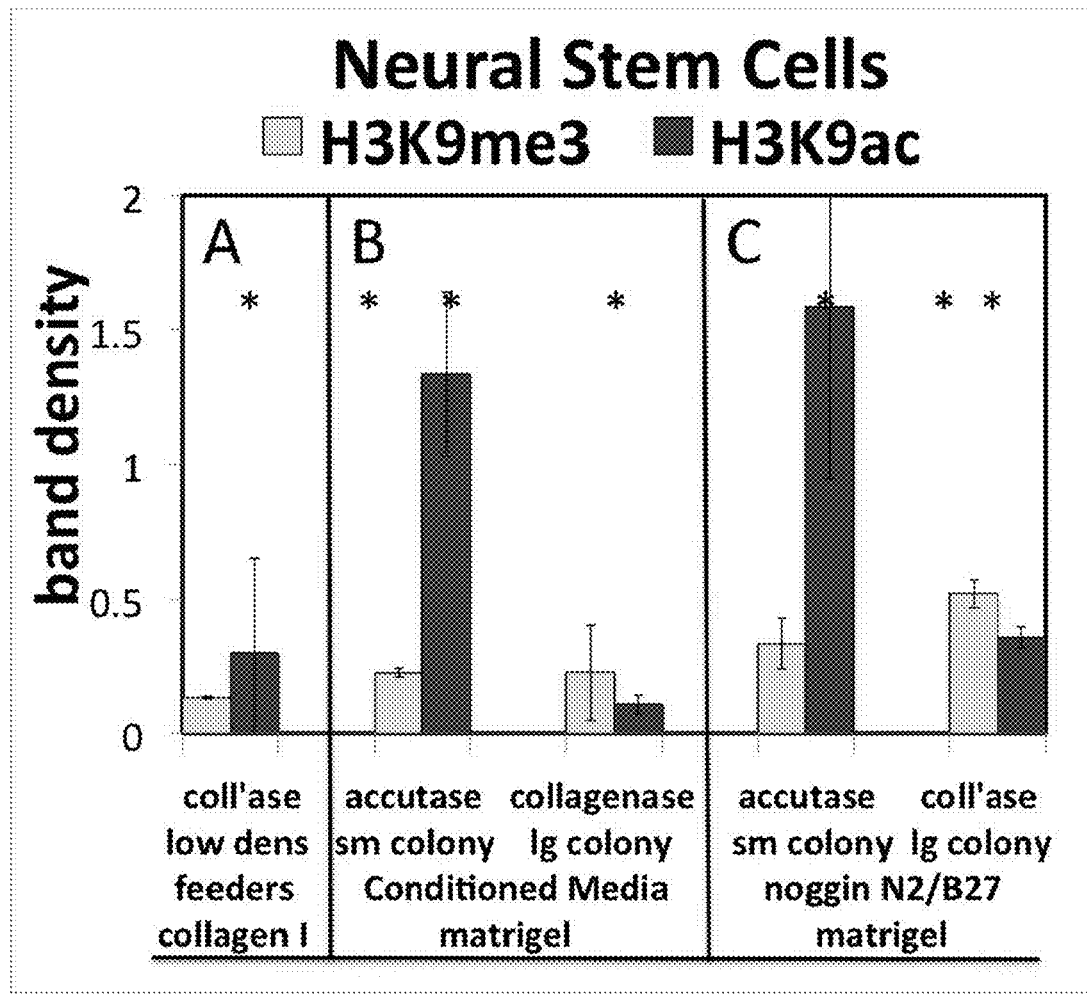
FIG. 29 shows acetylation and methylation of histone H3K9 in different neural lineages. H3K9me3 (gray) and H3K9ac (blue) in hESC were measured by western blot in different culture conditions. Neurectoderm was produced on low-density feeders (A), and in conditioned media (B) or noggin N2/B27 media (C). Cells were dispersed as small colonies or single cells (left in A, B) using accutase or as 100 cell colonies (right in A, B), using collagenase. Small colonies were enriched in oligodendrocyte and astrocyte precursors and had very high levels of 1-13K9 acetylation (Mean±SD, P<0.05 indicated by stars).

VPA (0.3 to 1.0 mM) is applied at various stages and durations during differentiation to modulate progenitor cell number, cell adhesion and motility. Experiments with TSA have shown very high molar sensitivity in hESC (1 nM, FIG. 29) compared to somatic cells (300 mm). TSA treatment for 2 days at the initiation of differentiation inhibited neurectoderm formation (FIG. 29), while treatment for 4 or more days did not inhibit longer-term formation of neurectoderm (not shown). Here, hESCs growing in noggin/N2/B27 differentiation media will be exposed to VPA for 2, 7 and 14 days. Formation of early neurectodermal markers (Otx2, and nestin) are measured, followed by evaluation of expression of later markers for NPCs (Pax6), APCs (GFAP, ID1) and OPCs (Olig1, PDGFR). Proliferation rates are affected by VPA treatment of mouse hippocampus without effects on cell death or apoptosis. The number of cells in S phase are counted using EdU® (Invitrogen-Molecular Probes, USA) a thymidine analog that is similar to BrdU staining of hESC. Cell adhesion is assessed by measuring the fraction of adherent cells after passage onto extracellular matrix, laminin or matrigel at various times (1-6 hrs) after passaging. Motility is measured by time-lapse measurement of phase contrast images (FIG. 29E) quantified by image analysis.

Example 12

Figure 30:
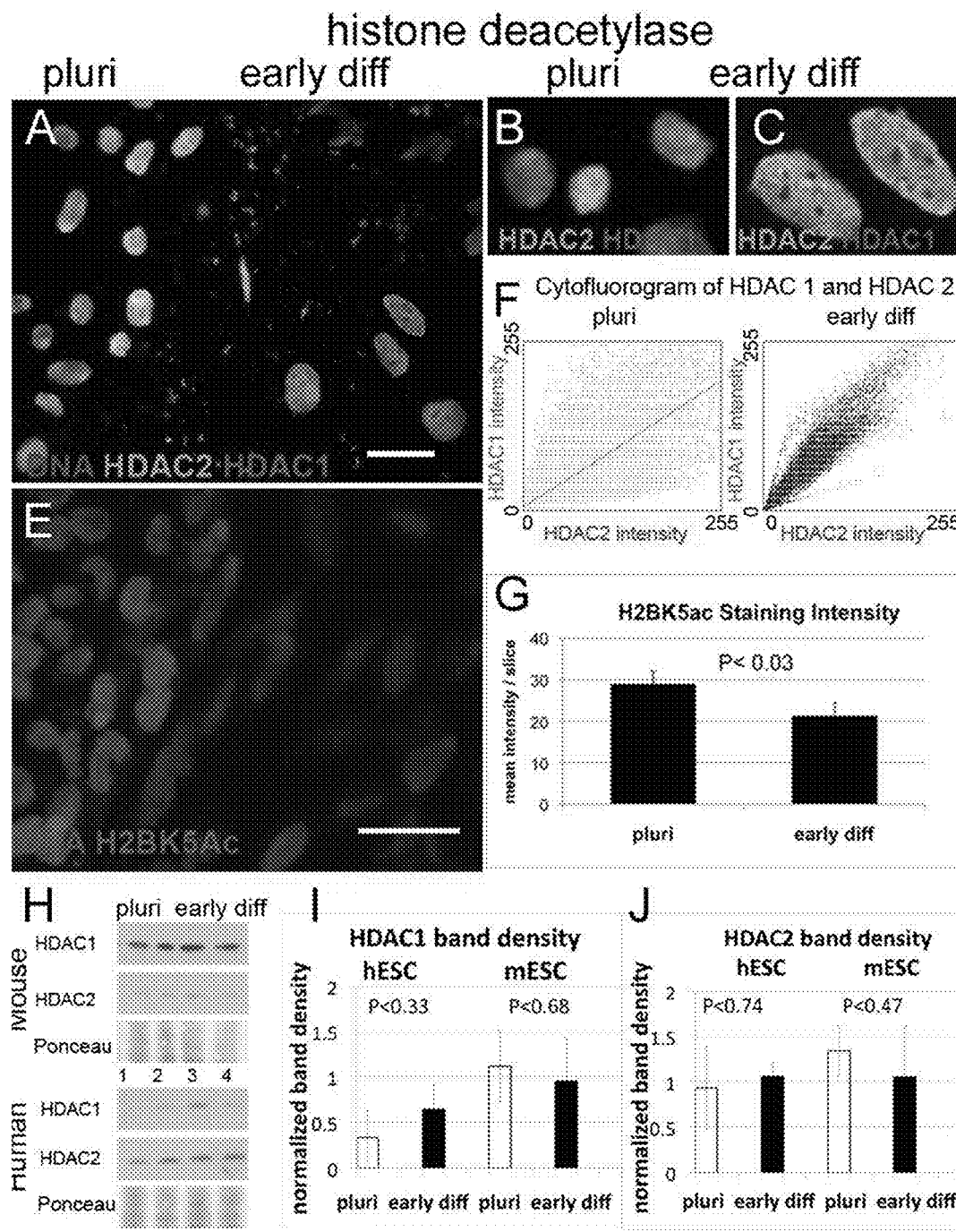
FIG. 30 shows HDAC levels and activity during neural differentiation of hESC. The ratio of HDAC1, HDAC2 and DNA varies between different nuclear domains as illustrated by polychrome pluripotent cell nuclei (A, B, Oct4 positive, not shown) but is uniform in differentiated cells (A, C). Cytofluorograms show that HDAC 1 and 2 distributions are uncorrelated in pluripotent cells and become more tightly correlated in early-differentiated cells (F) suggesting the HDAC complex formation changes during differentiation. A selective substrate for HDAC I (H2BK5ac) remains acetylated in pluripotent cells and become deacetylated in differentiated cells (E, G) suggesting increased enzymatic activity during differentiation. Western blots (H) in mouse and human ESC show no change in protein expression. Normalized mean and SD of 3 samples of HDAC 1 (I) and 2 (J) are not statistically different between pluripotent and differentiated cells in mouse and human ESC. Bar in C & E, 10 µm. Bar in F, 100 µm.
Figure 31:
FIG. 31 shows shRNA HDAC1 knockdown in hESC is as effective as 1 nM TSA. Cells in B were nucleofected with Open Biosystems shRNAmir to HDAC1 in a retroviral pSM2 backbone. Cells were cotransfected with pMAXGFP and 70-80% of cells expressed GFP. Three days after nucleofection a control colony was identified by lack of cytoplasmic GFP (A) while pSM2 HDACIb transfection was identified within small colonies containing cytoplasmic GFP (B). Samples were stained and images acquired under identical conditions. Blue and green channels were displayed with identical settings. The Red Channel in A is displayed at half the intensity of B and C to avoid saturation. Quantitative measurement of the nuclear HDAC1 staining (red) is shown in the graph in (D). HDACI knockdown reduces HDAC1 staining 30 fold, to a level comparable to 1 nM TSA, the highest concentration without toxic effects.

Effects of HDAC1 Knockdown on Formation of Oligodendrocyte Precursor Cells and Cell Adhesion Knockdown of FIDACs affects repressor complex formation and affects other regulators including methyltransferases (not shown). Knockdown of HDAC I and 2 have been achieved using lentiviral transduction of hESC using pTRIPZ inducible vector with puromycin resistance and RFP expression to confirm shRNA production (Open Biosystems). Three shRNA sequences were evaluated for each of HDAC 1 and 2 and identified sequences with a 30 fold knockdown (FIG. 31). First, knockdown of HDAC 1 and 2 alone is performed, followed by knockdown of both HDAC 1 and 2. In hESCs, HDAC 1 and 2 (FIG. 30), HDAC 3, 5 and 7 (not shown) have been identified.

Figure 37:
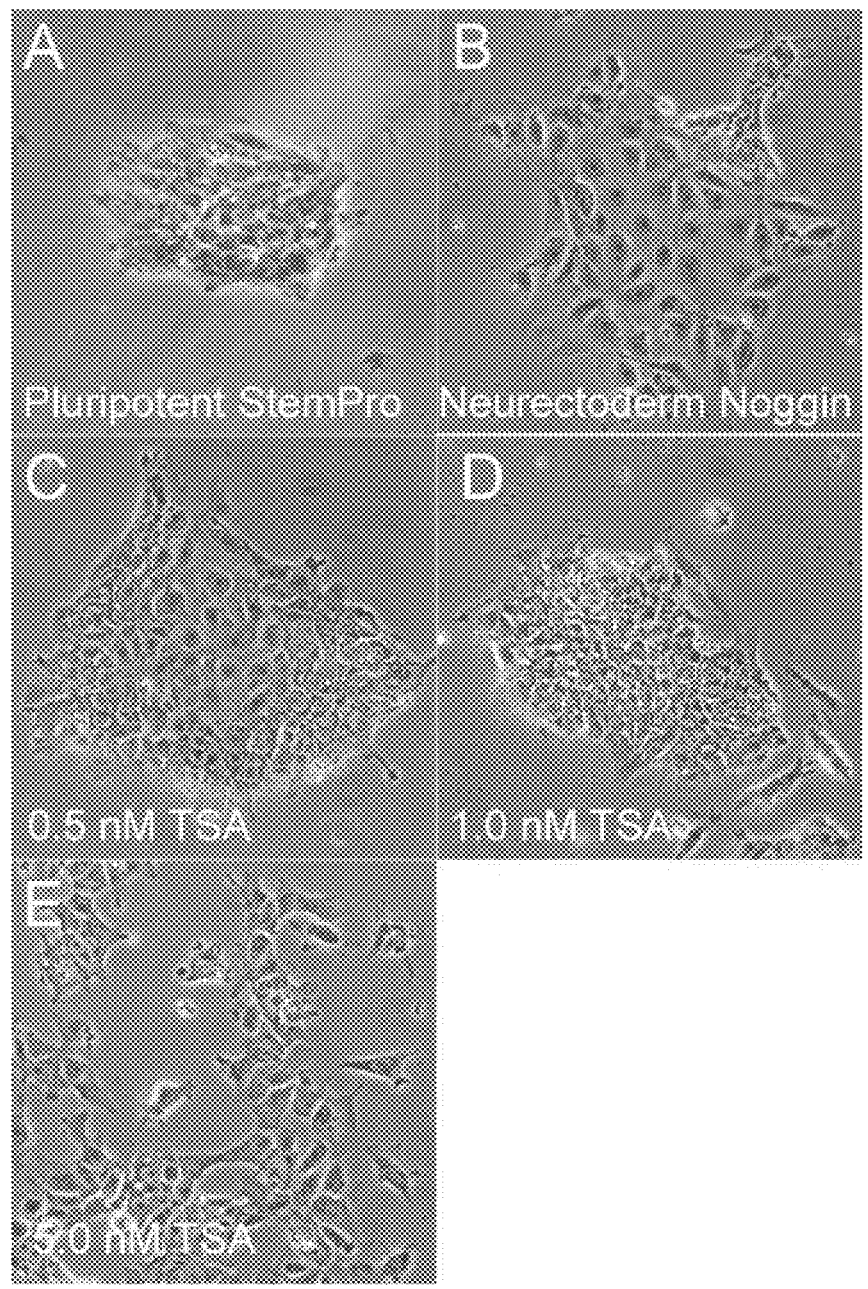
FIG. 37 shows that TSA blocks neuronal differentiation.
Figure 38:
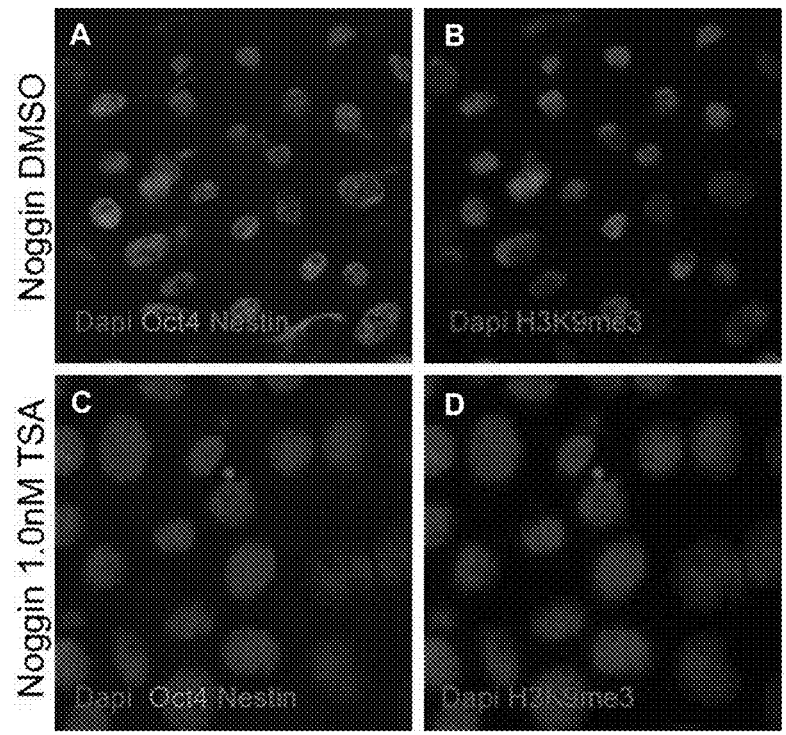
FIG. 38 shows confocal fluorescence microscopy images confirming that TSA reduces expression of nestin, a marker for neural differentiation, along with methylation of histone H3 on lysine 9, an indicator of TSA activity.
Figure 38:
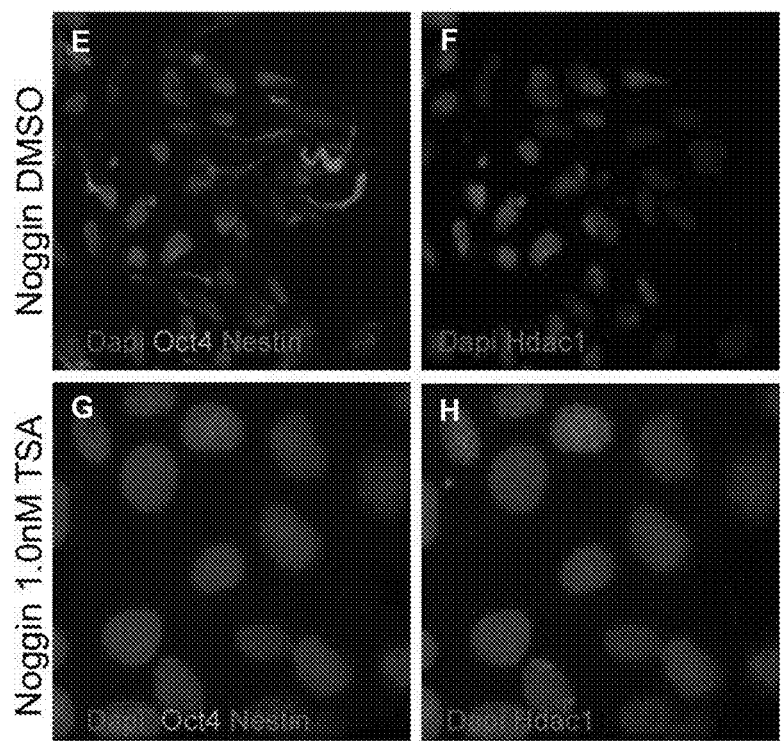

In spite of concerns of embryonic lethality resulting from HDAC knockdown, HDAC 1 and 2 KD are not lethal in hESC cell cultures even when shRNA is expressed for up to 4 weeks. To compare the effects of VPA to the effects of HDAC 1 and 2 knockdown, VPA is added on top of HDAC knockdowns to identify additional effects of pharmacological inhibition on differentiation and motility. Notably, experiments with TSA demonstrated a high molar sensitivity in hESCs (1 nM, FIG. 37), as compared with somatic cells (300 mm). TSA treatment for 2 days at the initiation of differentiation inhibited neurectoderm formation (FIG. 37), while treatment for 4 or more days did not inhibit longer-term formation of neurectoderm (data not shown). FIG. 38 shows further effects of TSA on hESCs: TSA reduces expression of nestin, a marker for neural differentiation, reduces methylation of histone H3 on lysine 9 (an indicator of TSA activity), and reduces HDAC (a marker of TSA activity).

Tables

TABLE 1

| Media | Components | Concentrations |
| --- | --- | --- |
| DSR | DMEM/F12 | |
| | CM | *Prepared as described unpublished |
| | KSR (1%) | |
| | FGF2 | 8 ng/mL |
| | NEAA (1%) | .1 nM |
| | Pen/Strep (1%) | 10,000 U/10,000 ug |
| | L-Glutamine (1%) | 2 mM |
| StemPro **Full Supplement | DMEM/F12 | |
| | NEAA | 0.1 mM |
| | BSA | 2% |
| | Pen/Strep | 1x |
| | D-Glucose (Dextrose) | 3151 mg/L |
| | **LR3-IGF1 | 200 ng/mL |
| | **Bovine or Human Transferrin | 10 µg/ml |
| | **Selenite•2Na | 0.0173 mg/L |
| | **FGF2 | 8 ng/mL |
| | **Activin A | 10 ng/mL |
| | **Heregulin-1☐ EGF domain | 10 ng/mL |
| | **Ascorbic Acid | 50 ug/mL |
| | **Hypoxanthine Na | 2.39 mg/L |
| | **Linoleic Acid | 0.042 mg/L |
| | **Lipoic Acid | 0.105 mg/L |
| | **Putrescine 2HCl | 0.081 mg/L |

TABLE 1-continued

| Media | Components | Concentrations |
|---|---|---|
| | **Sodium Pyruvate | 55 mg/L |
| | **Thymidine | 0.365 mg/L |
| | **2-Mecaptoethanol | 0.1 mM |
| MIM | DMEM/F12 | |
| | NEAA | 0.1 mM |
| | BSA | 2% |
| | Pen/Strep | 1x |
| | L-Glutamine | 2 nM |
| | Insulin, Transferrin, Selenium | 10 ug/mL |
| EMIM | DMEM/F12 | |
| | NEAA | 0.1 mM |
| | BSA | 2% |
| | Pen/Strep | 1x |
| | L-Glutamine | 2 nM |
| | Insulin, Transferrin, Selenium | 10 ug/mL |
| | Heparin Sulphate | 100 ng/mL |

TABLE 2

| Antigen | Location | Antibody | Source | Number | Dilution |
|---|---|---|---|---|---|
| OCT4 | Pluripotent nuclei | Goat polyclonal | R&D systems | MAB1759 | 1:100 |
| | | Mouse monoclonal | Santa Cruz | SC-5279 | 1:100 |
| CDX2 | TE nuclei | Mouse monoclonal | BioGenex | AM392-5M | 1:100 |
| nestin | Neural progenitor | Mouse monoclonal | Covance | MMS570P | 1:100 |
| | | Rabbit polyclonal | Abcam | ab7659 | 1:100 |
| Gata6 | Primitive endoderm, nuclear | Rabbit polyclonal | Abcam | ab22600 | 1:100 |
| bracyury | Primitive mesoderm, nuclear | Rabbit polyclonal | Abcam | Ab20680-100 | 1:100 |
| β-actin | 42 kD cytoskeletal protein | Mouse monoclonal | Chemicon | mab1501R | 1:100 |
| HDAC1 | Histone deacetylases | Rabbit polyclonal | Upstate Biotech | 06-720 | 1:100 |
| HDAC2 | Histone deacetylase | Mouse monoclonal | Upstate Biotech | 05-814 | 1:100 |
| HDAC3 | Histone deacetylase | Mouse monoclonal | Upstate Biotech | 05-813 | 1:100 |
| H3K9me3 | Histone H3-Trimethyl | Mouse monoclonal | Abcam | AB8898-100 | 1:100 |

TABLE 3 surface roughness of samples in each group (Mean ± SD)

| | PPy/p20 | PPy/p31 | PPy/pmix | PPy/PSS |
|---|---|---|---|---|
| RMS (nm) | 10.97 ± 3.06 | 8.68 ± 3.02 | 9.62 ± 4.88 | 7.41 ± 2.95 |

TABLE 4

Water contact angle of samples in each group (Mean ± SD)

| | PPy/p20 | PPy/p31 | PPy/pmix | PPy/PSS |
|---|---|---|---|---|
| WCA (°) | 57.6 ± 0.6* | 42.2 ± 3.0 | 43 ± 4.8 | 34.5 ± 1.6□ |

*WCA is significantly higher than those of other groups.
□WCA is significantly lower compared to other groups.

Materials & Methods
Cell Culture

Pluripotent hESCs, line H7, were grown on mitomycin-treated MEFs (GlobalStem) at normal-density (120,000 cells/6 cm$^2$), maintained in DSR media (Table 1), and passaged weekly using Collagenase IV (Invitrogen/Gibco) and StemPro®EZPassage™ (Invitrogen) as directed. Cell colonies were briefly spun, resuspended in DSR, and plated onto normal density MEFs in CM (Table1). For TE-directed differentiation, hESCs were passaged at 1:5 dilution onto low-density MEFs (30,000 cells/6 cm$^2$) using DSR media minus FGF2 supplemented with BMP4 (Invitrogen, PHC7914) 100 ng/mL. Media was changed daily.

Feeder-free hESCs were grown on Geltrex (Invitrogen)-coated plates in StemPro (Invitrogen), passaged weekly with Collagenase IV or Accutase (StemCell Technologies) as directed, resuspended in StemPro and plated onto Geltrex-coated plates. For TE-directed differentiation pluripotent hESCs maintained in StemPro or in Erb's Minimal Induction Media (EMIM) were passaged onto feeder-free, Geltrex-coated plates into respective basal media supplemented with the activin A antagonist, SB431542 (10 uM), and/or BMP4 (100 ng/mL or 500 ng/mL) as indicated. Media was changed daily. Terminal STB differentiation was accomplished by culturing hESCs in EMIM+SB+100 ng/mL BMP4 for 14 days.

Antigen Retrieval and Immunocytochemistry:

In PBS, cell colonies were fixed with 2% paraformaldehyde, permeabilized with 1% Triton X-100 (Sigma, St. Louis Mo.), and non-specific antibody binding blocked with 10% goat serum. Primary antibodies (Table 2) were diluted in 1% goat serum, spun briefly, and incubated overnight at 37° C. After a wash in PBS-Tween 0.05% a species-specific fluorescent secondary antibody (prepared as above) was added for 60 min at 37° C. Cells were washed in PBS-Tween 0.05%, incubated in Hoechst 333429 (1:10,000), and mounted in Gelvatol polyvinyl alcohol-based media (Sammak et al., 1987).

Trophectoderm Differentiation: Induction, Selection, and Identity:

Nuclear labeling (Hoechst 33342) facilitates automated image segmentation for counting cell number. Since pluripotent hESCs can differentiate along multiple lineages, TE-differentiation was determined by immunostaining for transcription factors localized to the cell's nucleus or cytoplasm (Table 2). Four color microscopy permits co-labeling of cells with markers of pluripotent hESCs (OCT4), TE cells (CDX2), and alternative markers for early differentiation including neurectoderm (nestin), mesoderm (brachyury), or extraembryonic endoderm (GATA6). TE-induction was determined by two criteria: 1) the percentage of all cells that were CDX2-positive and the fold change of CDX2-nuclear intensity over control, unstimulated cells. However, high TE-induction does not equate to high TE-selection. TE selectivity was determined by a significant percentage of CDX2-positive cells and a suppression of the percentage of nestin-, brachyury-, and GATA6-positive cells.

Morphological criteria were used to confirm TE-identity in TE-selective culture conditions: 1) squamous epithelial transformation and 2) subsequent differentiation to multi-nucleated syncytiotrophoblasts as measured by phase contrast microscopy and immunofluorescence microscopy of nuclei (Hoechst 33342) and peripheral F-actin (phalloidin) rings to mark cell boundaries. Epithelial transformation was measured by texture analysis (described below). Terminal differentiation to syncytia was determined by the percentage of bi- or multi-nucleated cells.

Imaging and Analysis

For confocal microscopy cell were grown on thin, plastic-bottom multiwell microslides (Ibidi, Integrated BioDiagnostics) or 96-well tissue culture treated plates (Perkin Elmer). Fluorescence images were acquired on a Nikon confocal, Zeiss wide-field or Thermo Fisher Arrayscan V automated high content screening reader. Confocal images were acquired using a Nikon TE2000-E inverted microscope with Yokogawa CS1 0 spinning disk and Photometrics CoolSNAP HQ CCD camera (Photometrics, Tucson, Ariz.). Images were processed using Nikon NIS-Elements (Nikon, Inc., Melville, N.Y.).

96-well Microplates were scanned using the 5 or 10× objective on the ArrayScan V Automated image analysis was performed using the Compartmental Analysis BioApplication using Hoechst for identification of nuclei and various transcription factor antibodies (Table 2). Nuclear-specific fluorescence intensity was determined from approximately 300 single cells per well from 3-6 independent wells to produce a well-average nuclear intensity for each measurement Mean and standard deviation were calculated from multiple wells. Fold change of the mean intensities were normalized against matched unstimulated external controls, usually the pluripotent condition, to divide out differences due to efficiency of antibody-antigen binding and chromophore quantum yield. The relative transcription factor expression levels were displayed as radar graphs using Microsoft Excel 2003 to facilitate presentation of multiple, independent variables (the induction media with different growth factor combinations) plotted around the circumference, and dependent variables (fold change transcription factor levels) are displayed as the radial distance from the center. Select conditions are additionally compared in bar graph format to show standard deviations and T-tests.

Texture Analysis

Colony morphology was quantified by statistical multi-resolution analysis of image texture (Mangoubi et al., 2007; Sammak et al., 2008). Image texture is a mathematical measure of the size and sharpness of objects in the image, which is illustrated in one dimension by an intensity line profile (FIG. 10). The variation in image intensity with position, the spatial frequency, depends on both nuclear and cell size which change significantly during differentiation (FIG. 10). Therefore, we employ texture analysis as an integrated measure of colony morphology. Texture was measured using wavelet analysis (Do and Vetterli, 2002), a generalization of Fourier analysis, to decompose colony texture in phase contrast images (4× objective, Nikon TMS microscope), producing a joint probability density function for the wavelet coefficients from various scales. Different culture conditions can be distinguished as belonging to distinct classes. Each class is thus represented by a probability density function, and quantitative comparative features for classifying and statistically distinguishing colony textures are extracted from the density functions. One such feature is the Kullback-Leibler (KL) distance (Do and Vetterli, 2002). A two-sample t-statistic test conducted at the 0.98 confidence level demonstrates that this feature allows for successful colony classification. Specifically the KL distance between a pair of colonies from the same class is shorter than a pair from different classes.

All images were imported into Adobe Photoshop (Adobe System, Inc., San Jose, Calif.) for final image composition and contrast adjustment. For display, comparable phase contrast images were adjusted using constant linear contrast and unsharp mask filtering to enhance edges to allow comparison between panels. Quantitation was performed on unenhanced grayscale images of the green channel.

Differentiation of hESCs Using Low-Density MEFs

Preparation of mouse embryonic fibroblasts (MEFs), inactivation of MEFs, preparation of culture wells for seeding of hESCs, growth and cryopreservation of pluripotent hESCs, preparation of embryoid bodies, differentiation of hESCs using low-density MEFs, differentiation of hESCs, immunocytochemistry, and image analysis are described in Ozolek et al., (2010), the contents of which are incorporated herein in its entirety.

Polypyrrole Synthesis

Substrate Preparation

Plastic coverslips (Fisher scientific, Waltham, Mass.) were used as a substrate for electrochemical polymerization and stem cell culture. The coverslips were cut into a dimension of 7 mm×22 mm, cleaned by immersion into 8N $HNO_3$ for 30 min, washed twice with deionized water and stored in ethanol. The coverslips were air-dried and sputter-coated with a thin layer of gold (about 40 nm of thickness) using a Cressington Sputter Coater (Cressington Scientific Instruments, Inc., Valencia, Pa.), as described previously (Stauffer and Cui, 2006).

Electrochemical Polymerization

The peptides DCDPGYIGSR (p31) and DRNIAEIIKDIC (p20) were synthesized at the Peptide Synthesis Facility of the University of Pittsburgh. An aspartic acid (D) was added on the N terminal of each peptide to increase the negative charge for more efficient dopant incorporation. A cysteine (C) was added to the C terminal of p20 for additional coupling capability. Pyrrole and nonbioactive dopant poly (sodium 4-styrene sulfonate) (PSS) were purchased from Aldrich (Sigma-Aldrich, St Louis, Mo.). The gold-coated coverslips (0.7 $cm^2$) were used as the working electrodes for deposition of PPy films, and a platinum plate acted as a counter electrode.

The electrochemical deposition was carried in a 2 ml cuvette. Monomer solution (1 ml in volume) composed of 0.5 M pyrrole and peptide or PSS was added to the cuvette. There are four types of dopant compositions used here: 5 mg/ml p20, 5 mg/ml p31, 5 mg/ml mixture of p20/p31 at a 1:1 ratio (pmix), and 0.1 M PSS. The thickness of the film could be controlled by deposition time. Our previous work has shown that films deposited with the charge density between 4.5-9 $mC/cm^2$ have the highest cell density (Stauffer and Cui, 2006). So in this study, all polypyrrole films were grown galvanostatically at the anodic charge density of 5 $mC/cm^2$. The films were repeatedly washed in PBS to remove the remaining monomer and loosely bound dopants.

Surface Characterization

Amino Acid Analysis

Individual coverslips were placed into 6×50 mm borosilicate glass tubes and subjected to gas phase HCL hydrolysis for 24 hrs at 118° C. on a Waters Pico*Tag Workstation (Waters Corporation, Milford, Mass.). The hydrolyzed samples were then re-suspended by sonicating in 500 µl of 20 mM HCL for 15 minutes. Each sample was then concentrated 10-fold by repeated additions of 20 µl of the re-suspended/sonicated sample to a clean 6×50 mm hydrolysis tube, followed by evaporation to dryness on a Waters Pico*Tag workstation. The concentrated samples were then derivatized to their fluorescent AQC (6-aminoquinolyl-N-hydroxysuccinimide carbamate) analogues using a Waters AccQ*Tag reagent package (Waters Corporation, Milford, Mass.). Derivatized samples were then analyzed on a Waters Alliance Chromatography system consisting of a 2695 separations module a model 474 Scanning Fluorescence detector (Waters Corporation, Milford, Mass.). Data acquisition and analysis were performed using a Waters Empower software package (Waters Corporation, Milford, Mass.).

Scanning Electron Microscopy

Information about the sample surface morphology was obtained with Scanning Electron Microscopy (SEM). Due to the conductive property of the polymer film and the gold coated substrate on coverslips, the samples were ready for SEM analysis without gold-coating process. After drying at room temperature for at least 24 hrs, fresh samples were attached to aluminum SEM specimen mounting stubs (Electron Microscopy Sciences, Hatfield, Pa.) and samples were analyzed using a JEOL JEM 6335F SEM (JEOL, Peabody, Mass.). Images of the samples were captured at 500× and 40,000× magnification with accelerating voltage of 3.0 kV and working distance of 8.0 mm.

Atomic Force Microscopy

Surface roughness was measured by Atomic Force Microscopy (AFM). AFM was performed with a MFP 3DTM inverted optical model Atomic Force Microscope (AFM) (Asylum Research, Santa Barbara, Calif.). The images obtained consisted of 256×256 arrays of height data over a scan size of 10 μm and a scan rate of 1 Hz. Data were collected in tapping mode using a cantilever tip with height of 15-20 μm and radius of <10 nm. Surface scans from the AFM were analyzed using IGOR Pro5.03 (Wavemetrics, OR) and MFP-3D Xop software version 050126. Root Mean Square (RMS) surface roughness (nm) in three random fields per sample was obtained and means of three samples were averaged and expressed as Mean±SD.

Water Contact Angle

The water contact angles were measured by using a VCA-OPTIMA drop shape analysis system (AST Products, Inc., Billerica, Mass.) with a computer-controlled liquid dispensing system. De-ionized water was filled in the syringe and uniform droplets with volume of 1 μl were dropped on the sample surfaces to measure the static water contact angle. Three different areas of one sample were measured and values were averaged. Three samples in each group were measured and the final value was expressed as Mean±SD.

Cell Seeding and Differentiation Culture Substrate Preparation

All coverslips (Fisher scientific, Pittsburgh, Pa.) were adhered onto the bottom of 24-well plate with Kwik Sil (World Precision Instruments, Inc., Sarasota, Fla.). Before cell seeding, the surface of coverslips were sterilized under UV for 30 min, and then immersed into PBS for 30 min. Laminin (BD Biosciences, San Jose, Calif.) coated glass coverslips were also prepared as control substrates for cell culture.

hESC Cell Culture and Differentiation hESCs, line HSF6 obtained from the University of California-San Francisco and WiCell, respectively were approved by the University of Pittsburgh ESCRO committee with IRB exempt approval. hESCs were maintained in ES-DMEM high glucose with 20% KSR, 1% MEM NEAA (WiCell Research Institute, Madison, Wis.), Pen/Strep (10,000 U/10,000 ug), 1% L-Glutamine (2 mM), and 8 ng/mL bFGF (Invitrogen, Carlsbad, Calif.), and passaged in 50-100 cell clusters as recommended. hESCs were grown on mitomycin-treated MEFs prepared from 14-day CF-1 embryos. Media was changed every other day and colonies were mechanically passaged every 5-7 days with a Pasteur pipette.

Neuronally differentiated hESC cultures were prepared on low-density CF-1 MEFs (WiCell Research Institute, Madison, Wis.) (5000 cells per $cm^2$) which encouraged nestin positive neuroectodermal monolayers within several days and multilayered neural rosettes after 2-4 weeks. Additional characterization can be found in Ozolek, et al. (Ozolek et al., 2007; Ozolek et al., 2010). For plating onto polypyrrole substrates, hESCs were mechanically scraped and seeded at a cluster of about 50-100 cells onto coated coverslips. Cells were cultured for 7 and 14 days before fixation with 3.7% paraformaldehyde.

rNSCs Culture and Differentiation

Adult rNSCs (a gift from Dr. Hongjun Song, Johns Hopkins University) were originally isolated from hippocampus of adult Fisher 344 rat and propagated in laminin-coated flasks in DMEM/F12 medium containing N2 supplement (Invitrogen, Carlsbad, Calif.), L-glutamine (2 mM) and bFGF (20 ng/mL) as previously described (Palmer et al., 1997a). These rNSCs were shown to give rise to neurons, oligodendrocytes and astrocytes both in vitro (Song et al., 2002) and in vivo (Gage et al., 1995) as previously reported. Cells used for this study were between passages 10 and 20.

rNSCs were seeded into wells containing coated coverslips at a density of $6 \times 10^4$/ml and 1 ml cell suspension/well. To induce rNSCs differentiation, proliferation medium was replaced by differentiation medium containing DMEM/F12 medium, N2 supplement, 1 μM retinoic acid (RA) and 1% fetal bovine serum (FBS) (Invitrogen, Carlsbad, Calif.) when seeding cells into 24-well plate. Half of the differentiation medium (i.e. 0.5 ml/well) was changed every 3 days after seeding. rNSCs were cultured in differentiation medium for 14 days.

Immunohistochemical Staining hESC grown in plastic dishes were fixed (3.7% paraformaldehyde, 20 min), washed (3× in PBS), permeablized (PBS containing 0.1% Triton X-100, 20 min), blocked (PBS containing 5% goat serum and 0.3% BSA for 30 min) and immunostained (primary antibody, 1 hr at 37° C.). Secondary antibodies (Alexa 488/546 IgG, Invitrogen, 1:1000) were applied (1 hr, 37° C.) with Hoechst 33342 DNA dye and slides were mounted with Vectashield (Vector Laboratories, Burlington, Calif.). Primary antibodies include the following: lamin A/C (Santa Cruz biotechnology, Inc., sc-20681, Santa Cruz, Calif.) at a dilution of 1:100, Oct-4 (Santa Cruz biotechnology, Inc., Santa Cruz, Calif.) at a dilution of 1:100, mushashi-1 (Chemicon) at a dilution of 1:200, nestin (Abcam, Cambridge, Mass.) at a dilution of 1:100, tyrosine hydroxylase (Pel-Freeze biologicals, Rogers, Ark.) at a dilution of 1:100, β-III tubulin (Tuj 1) (Covance, Princeton, N.J.) at a dilution of 1:100, NCAM (Chemicon) at a concentration of 1:100, and SSEA3 (Iowa Hybridoma Bank, Iowa City) at a dilution of 1:25.

Neuronal differentiation was detected by anti-βIII tubulin for hESCs, anti-NF200 for rNSCs. Briefly, rNSCs were fixed in 4% of paraformaldehyde for 15 min after being cultured on polymer films for 3 d, 7 d and 14 d. Cells were permeablized in 0.1% TritonX-100 (Fisher Scientific) for 15 min and washed in PBS for 3 min three times. Then cells were incubated in blocking solution (2% bovine serum albumin (BSA; Sigma)) for 45 min, followed by primary antibodies for 1 hr at room temperature in a humid chamber, washed in PBS, incubated in Cy3 donkey anti-mouse secondary antibodies (Jackson ImmunoResearch, West Grove, Pa.) in the dark for 1 hr. Anti-βIII tubulin (Invitrogen) and anti-NF200 (Sigma) were diluted 1:500 in PBS containing 0.5% BSA. Cy3 secondary antibody was diluted 1:1000 in PBS containing 0.5% BSA. The cells were then rinsed and nuclei were counterstained for 3 min with Hoechst 33258 (Sigma, 2 μg/ml in PBS). Coverslips were rinsed and then mounted onto microscope slides using an antifade mounting medium (fluoromount-G, Southern Biotech).

Data Collection and Statistical Analysis

Images were taken with a fluorescent microscope (Zeiss). Neuron counts on the βIII tubulin and NF200 images were obtained manually by looking for co-localization of the respective marker with a Hoechst stained nuclei. For hESCs, neuron and total cell number per colony was measured by Axiovision 4.8 software. Twenty randomly selected colonies were counted and average cell number per colony was calculated by dividing total cell number by total number of colonies. Averaged values in a particular group were presented as mean±SEM. Percentage of β111 tubulin-positive cells was calculated by dividing the number of β111 tubulin positive cells by total cell number in each colony and multiplying by 100. Outliers in certain groups were identified by values beyond three times of interquartile range in a boxplot generated in SPSS.

For rNSCs, neuronal cells (NF200 positive) were counted on the whole coverslips and averaged values across all coverslips were presented as mean±SD. Total cell number was calculated from the number of nuclei. Cell nuclei were counted on ten randomly selected images, averaged, divided by image area and then multiplied by the area of coverslip. Percentage of neurons in each group was the value of total number of neurons divided by total cell number. Cell density was calculated by dividing values of cell number by the image area. Neurite length was measured using Image J and plug-in Neuron J. Length of the primary neurite and all neurites of each cell in each group was measured by tracing the neurites of NF200 positive cells with the tracing algorithm contained in Neuron J. Primary neurite was defined as the longest process out of cell body. The length was traced by Neuron J from the beginning of cell body to the far end. Length of all neurites was the sum of the length of all processes from a single cell. Average length of neurites in each group was presented as mean±SEM. Statistical analysis was performed by analysis of variance (ANOVA) and post-hoc analysis using SPSS software.

TSA-Mediated Inhibition of Induction of Neurectoderm Differentiation

The hESCs were grown and passaged via standard collagenase methods and passaged into two ibidi plastic 8-well slides. All hESCs were plated onto feederless plates with Stempro Media for 24 hours. hESCs were 50% confluent at time of passage and split 1:5.

All plates were fed with Neural Differentiation Media (1:1 mix of D-MEM/F12 supplemented with 1×N2 and Neurobasal medium supplemented with B27 (all from Gibco/Invitrogen); supplemented with 100 ng/ml mouse recombinant noggin (R & D systems), 50 U/ml penicillin/50 μg/ml streptomycin (Invitrogen) and 2 mML-glutamine (Invitrogen)) starting at day 0 (100 ng/mL noggin in N2B/27 with media changed daily). Six wells in each of two plates was treated with TSA (0-25 nM daily beginning 24 hours s/p plating hESC Colonies were stained with HDACI and Nestin. These proteins co-stained in a peri-nuclear filamentous pattern consistent with previous Nestin distribution. Pax6 expression was negative.

REFERENCES

Adjaye J, Huntriss J, Herwig R, BenKahla A, Brink T C, Wierling C, Hultschig C, Groth D, Yaspo M L, Picton H M, Gosden R G, Lehrach H (2005) Primary differentiation in the human blastocyst: comparative molecular portraits of inner cell mass and trophectoderm cells. Stem Cells 23:1514-1525.

Abeyta, M. J., A. T. Clark, et al. (2004). Unique gene expression signatures of independently-derived human embryonic stem cell lines. Hum Mol Genet 13(6): 601-8.

Adkins, M. W. and J. K. Tyler (2004). "The histone chaperone Asf1 p mediates global chromatin disassembly in vivo." J Biol Chem 279(50): 52069-74.

Ahmad, K. and S. Henikoff (2002). "Histone H3 variants specify modes of chromatin assembly." Proc Natl Acad Sci USA 99 Suppl 4: 16477-84.

Ahmad I and Pi-Erh L., 1976. A nonparametric estimation of the entropy for absolutely continuous distributions (Corresp.). Information Theory, IEEE Transactions on 22(3): 372-375.

Armstrong, J. A. (2007). "Negotiating the nucleosome: factors that allow RNA polymerase II to elongate through chromatin." Biochem Cell Biol 85(4): 426-34.

Ateh D D, Naysaria H A, Vadgama P (2006a) Polypyrrole-based conducting polymers and interactions with biological tissues. Journal of the Royal Society Interface 3:741-752.

Beattie G M, Lopez A D, Bucay N, Hinton A, Firpo M T, King C C, Hayek A (2005) Activin A Maintains Pluripotency of Human Embryonic Stem Cells in the Absence of Feeder Layers. Stem Cells 23:489-495.

Belotserkovskaya, R., S. Oh, et al. (2003). "FACT Facilitates Transcription-Dependent Nucleosome Alteration." Science 301(5636):1090-1093.

Bernstein, B. E., T. S. Mikkelsen, et al. (2006). "A bivalent chromatin structure marks key developmental genes in embryonic stem cells." Cell 125(2): 315-26.

Bloom, K. (2007). "Centromere dynamics." Curr Opin Genet Dev 17(2): 151-6.

Boltz S., et al., 2007. High-dimensional statistical distance for region-of-interest tracking: Application to combining a soft geometric constraint with radiometry. p 1-8.

Cai, S., H. J. Han, et al. (2003). "Tissue-specific nuclear architecture and gene expression regulated by SATB1." Nat Genet 34(1): 42-51.

Chazaud C, Yamanaka Y, Pawson T, Rossant J (2006) Early lineage segregation between epiblast and primitive endoderm in mouse blastocysts through the Grb2-MAPK Pathway. Devel Cell 10:616-624.

Cheutin, T., A. J. McNairn, T. Jenuwein, D. M. Gilbert, P. B. Singh, and T. Misteli. 2003. Maintenance of stable heterochromatin domains by dynamic HP1 binding. Science. 299:721-5.

Cohen, M. A., P. Itsykson, et al. (2007). "Neural differentiation of human ES cells." Curr Protoc Cell Biol Chapter 23: Unit 23 7.

Constantinescu D, Gray H L, Sammak P J, Schatten G P, Csoka A B (2005) Lamin A/C Expression is a Marker of Mouse and Human Embryonic Stem Cell Differentiation. Stem Cells:2004-0159.

Cremazy, F. G., E. M. Manders, et al. (2005). "Imaging in situ protein-DNA interactions in the cell nucleus using FRET-FLIM." Exp Cell Res 309(2): 390-6.

Cross J C (2000) Genetic insights into trophoblast differentiation and placental morphogenesis. Sem Cell Dev Biol 11:105-113.

Cross, J. C. (2005). "How to make a placenta: mechanisms of trophoblast cell differentiation in mice-a review." Placenta (Suppl A): S3-S9.

Cui X Y, Lee V A, Raphael Y, Wiler J A, Hetke J F, Anderson D J, Martin D C (2001) Surface modification of neural recording electrodes with conducting polymer/biomolecule blends. Journal of Biomedical Materials Research 56:261-272.

Desai, M., et al., 2009. "Noise adaptive matrix edge field analysis of small sized heterogeneous onion layered textures for characterizing human embryonic stem cell nuclei," Proc. IEEE Intl Symp. Biomedical Imaging (ISBI), p 1386-1389, Boston.

Do M N, Vetterli M (2002) Wavelet-based texture retrieval using generalized Gaussian density and Kullback-Leibler distance. IEEE Transactions on Image Processing 11:146-158. Ekwal I, K. (2007). "Epigenetic Control of Centromere Behavior." Annu Rev Genet.

Feuerbach, F., V. Galy, et al. (2002). "Nuclear architecture and spatial positioning help establish transcriptional states of telomeres in yeast." Nat Cell Biol 4(3): 214-21.

Furuyama, T., Y. Dalai, et al. (2006). "Chaperone-mediated assembly of centromeric chromatin in vitro." Proc Natl Acad Sci USA 103(16): 6172-7.

Gage F H, Coates P W, Palmer T D, Kuhn H G, Fisher L I, Suhonen J O, Peterson D A, Suhr S T, Ray J (1995) Survival and differentiation of adult neuronal progenitor cells transplanted to the adult brain. Proc Natl Acad Sci USA 92:11879-11883.

Gerami-Naini, B., 0. V. Dovzhenko, et al. (2004). "Trophoblast differentiation in embryoid bodies derived from human embryonic stem cells." Endocrinology 145(4): 1517-24. Gerlich, D., J. Beaudouin, et al. (2003). "Global chromosome positions are transmitted through mitosis in mammalian cells." Cell 112(6): 751-64.

Gerrard; L., L. Rodgers, et al. (2005). "Differentiation of human embryonic stem cells to neural lineages in adherent culture by blocking BMP signaling." Stem Cells: 2005-0110.

Giakoumopoulos M, Siegfried L M, Dambaeva S V, Garthwaite M A, Glennon M C, Golos T G (2010) Placental-Derived Mesenchyme Influences Chorionic Gonadotropin and Progesterone Secretion of Human Embryonic Stem Cell-Derived Trophoblasts. Reprod Sci.

Gilchrist, S., Gilbert, N., Perry, P., and Bickmore, W. A. 2004. Nuclear organization of centromeric domains is not perturbed by inhibition of histone deacetylases. Chromosome Res 12:505-516.

Grewal, S. I. S., and D. Moazed. 2003. Heterochromatin and Epigenetic Control of Gene Expression. Science. 301: 798-802.

Guimard N K, Gomez N, Schmidt CE (2007) Conducting polymers in biomedical engineering. Progress in Polymer Science 32:876-921.

Hanlon, S. E., D. N. Norris, et al. (2003). "Depletion of H2A-H2B dimers in Saccharomyces cerevisiae triggers meiotic arrest by reducing IME1 expression and activating the BUB2-dependent branch of the spindle checkpoint." Genetics 164(4): 1333-44.

Harun, R., L. Ruban, et al. (2006). "Cytotrophoblast stem cell lines derived from human embryonic stem cells and their capacity to mimic invasive implantation events." Hum Reprod 21(6): 1349-58.

Hassan, A. B., R. J. Errington, et al. (1994). "Replication and transcription sites are colocalized in human cells." J Cell Sci 107 (Pt 2): 425-34.

Hemberger M. and J. C. Cross (2001). "Genes governing placental development." Trends Endocrinol Metab 12:162-168.

Hirschhorn, J. N., S. A. Brown, et al. (1992). "Evidence that SNF2/SWI2 and SNF5 activate transcription in yeast by altering chromatin structure." Genes Dev 6(12A): 2288-98. Huang, S., H. Zhou, et al. (2005). "Rtt106p is a histone chaperone involved in heterochromatin-mediated silencing." Proc Natl Acad Sci USA 102(38): 13410-5.

Janatpour M. J., M. F. Utset, et al. (1999). "A repertoire of differentially expressed transcription factors that offers insight into mechanisms of human cytotrophoblast differentiation." Dev Gene 25:146-157.

Jedrusik A, Parfitt D E, Guo G, Skamagki M, Grabarek J B, Johnson M H, Robson P, Zernicka-Goetz M (2008) Role of Cdx2 and cell polarity in cell allocation and specification of trophectoderm and inner cell mass in the mouse embryo. Genes Dev 22:2692-2706.

Kim, H. J., J. H. Seol, et al. (2007). "Histone chaperones regulate histone exchange during transcription." Embo J.

Kimura, H. and P. R. Cook (2001). "Kinetics of core histones in living human cells: little exchange of H3 and H4 and some rapid exchange of H2B." J Cell Biol 153(7): 1341-53.

Knofler M., R. Vasicek, et al. (2001). "Key regulatory transcription factors involved in placental trophoblast development." Placenta 22(Suppl A): S83-S92.

Korber, P. and W. Horz (2004). "SWRred not shaken; mixing the histones." Cell 117(1): 5-7.

Krouwels, I. M., K. Wiesmeijer, T. E. Abraham, C. Molenaar, N. P. Verwoerd, H. J. Tanke, and R. W. Dirks. 2005. A glue for heterochromatin maintenance: stable SUV39H1 binding to heterochromatin is reinforced by the SET domain. J Cell Biol. 170:537-49.

Lam, A. L., D. E. Pazin, et al. (2005). "Control of gene expression and assembly of chromosomal subdomains by chromatin regulators with antagonistic functions." Chromosoma 114(4): 242-51.

Lam, A. L., C. D. Boivin, et al. (2006). "Human centromeric chromatin is a dynamic chromosomal domain that can spread over noncentromeric DNA." Proc Natl Acad Sci U S A 103(11): 4186-91.

Laribee, R. N., S. M. Fuchs, et al. (2007). "H2B ubiquitylation in transcriptional control: a FACT-finding mission." Genes Dev 21(7): 737-43.

Lin G, Martins-Taylor K, Xu R H (2010) Human embryonic stem cell derivation, maintenance, and differentiation to trophoblast. Methods Mol Biol 636:1-24.

Loftsgaarden D O and Quesenberry C P, 1965. A Nonparametric Estimate of a Multivariate Density Function. The Annals of Mathematical Statistics;36(3):1049-1051.

Lowry, N., Mangoubi, R., Desai, M., Sammak, P. (2009) Classification of Human Embryonic Stem Cell Colonies Using Multiresolution Non-Gaussian Statistical Texture Models. Submitted.

Lowry N, et al., 2010. Nonparametric segmentation and classification of small size irregularly shaped stem cell nuclei using adjustable windowing. p 141-144.

Ludovic V, Thomas T, Stephanie B, Candy C, Bilada B, Morgan A, Jessica C, Siddharthan C, Lars f-R, Anne W, Roger AP (2009) Signaling Pathways Controlling Pluripotency and Early Cell Fate Decisions of Human Induced Pluripotent Stem Cells. Stem Cells 27:2655-2666.

Mallat, S. G., 1989 "A theory for multiresolution signal decomposition: the wavelet representation," IEEE Trans. PAMI, vol. 11, no. 7, pp. 674-693.

Mangoubi R, Jeffrey C, Copeland A, Desai M, Sammak P (2007) Non-Invasive Image Based Support Vector Machine Classification of HESC's. In: International Symposium on Biomedical Imaging. Arlington, Va.

Mangoubi, R., et al., 2008 Performance evaluation of multiresolution texture analysis of stem cell chromatin, Proc. IEEE Int'l Symp. on Biomed. Imaging, Paris, France, p 380-383.

Mangoubi, R., 2008. "Non-Gaussian Methods in Biological Imaging," Proc. IEEE Applied Imagery Pattern Recognition Workshop, Washington, D.C.

Mangoubi, R., et al., 2008. "Performance Evaluation Of Multiresolution Texture Analysis Of Stem Cell Chromatin", in Fifth IEEE International Symposium of Biomedical Imaging. Washington, D.C.]

Marshall, W. F., A. Straight, et al. (1997). "Interphase chromosomes undergo constrained diffusional motion in living cells." Curr Biol 7(12): 930-9.

Meshorer, E., D. Yellajoshula, et al. (2006). "Hyperdynamic plasticity of chromatin proteins in pluripotent embryonic stem cells." Dev Cell 10(1): 105-16.

Misteli, T. (2004). "Spatial positioning; a new dimension in genome function." Cell 119(2): 1536.

Misteli, T. (2005). "Concepts in nuclear architecture." Bioessays 27(5): 477-87.

Misteli, T. 2005. Concepts in nuclear architecture. Bioessays. 27:477-87.

Mizuguchi, G., X. Shen, et al. (2004). "ATP-driven exchange of histone H2AZ variant catalyzed by SWRI chromatin remodeling complex." Science 303(5656): 343-8.

Mousson, F., A. Lautrette, et al. (2005). "Structural basis for the interaction of Asf1 with histone H3 and its functional implications." Proc Natl Acad Sci USA 102(17): 5975-80.

Murohashi M, Nakamura T, Tanaka S, Ichise T, Yoshida N, Yamamoto T, Shibuya M, Schlessinger J, Gotoh N (2010) An FGF4-FRS2alpha-Cdx2 axis in trophoblast stem cells induces Bmp4 to regulate proper growth of early mouse embryos. Stem Cells 28:113121.

Niwa, H., Y. Toyooka, et al. (2005). "Interaction between Oct3/4 and Cdx2 determines trophectoderm differentiation." Cell 123(5):917-29.

Nolan J P. 1997. Numerical calculation of stable densities and distribution functions. Communications in Statistics—Stochastic Models;13(4):759-774.

O'Brien, T. P., C. J. Bult, C. Cremer, M. Grunze, B. B. Knowles, J. Langowski, J. McNally, T. Pederson, J. C. Politz, A. Pombo, G. Schmahl, J. P. Spatz, and R. van Driel. 2003. Genome Function and Nuclear Architecture: From Gene Expression to Nanoscience. Genome Res. 13:1029-1041.

Okita, K., T. Ichisaka, et al. (2007). "Generation of germline-competent induced pluripotent stem cells." Nature 448(7151): 313.

Oliver, B. and T. Misteli (2005). "A non-random walk through the genome." Genome Biol 6(4): 214.

Ozolek J A, Jane E P, Esplen J E, Petrosko P, Wehn A K, Erb T M, Mucko S E, Cote L C, Sammak P J (2010) In Vitro Neural Differentiation of Human Embryonic Stem Cells Using a Low-Density Mouse Embryonic Fibroblast Feeder Protocol. In: Human Embryonic Stem Cells: Methods and Protocols (Turksen K, ed), pp 71-95. Totowa, N.J.: Humana/Springer.

Ozolek J A, Jane E P, Krowsoski L, Sammak P J (2007) Human embryonic stem cells (HSF-6) show greater proliferation and apoptoses when grown on glioblastoma cells than mouse embryonic fibroblasts at day 19 in culture: comparison of proliferation, survival, and neural differentiation on two different feeder cell types. Stem Cells Dev 16:403-412.

Palmer M, Watson A, Burton G (1997) Morphological analysis of degeneration and regeneration of syncytiotrophoblast in first trimester placental villi during organ culture. Hum Reprod 12:379-382.

Palmer T D, Takahashi J, Gage F H (1997a) The adult rat hippocampus contains primordial neural stem cells. Mol Cell Neurosci 8:389-404.

Palmer T D, Takahashi J, Gage F H (1997b) The adult rat hippocampus contains primordial neural stem cells. Molecular and Cellular Neuroscience 8:389-404.

Parada, L. and T. Misteli (2002). "Chromosome positioning in the interphase nucleus." Trends Cell Biol 12(9): 425-32.

Parada, L. A., P. G. McQueen, et al. (2004). "Tissue-specific spatial organization of genomes." Genome Biol 5(7): R44.

Parashurama N, Nahmias Y, Cho C H, van Poll D, Tilles A W, Berthiaume F, Yarmush M L (2008) Activin Alters the Kinetics of Endoderm Induction in Embryonic Stem Cells Cultured on Collagen Gels. Stem Cells 26:474-484.

Park, I. H. and G. Q. Daley 2009, Human iPS cell derivation/reprogramming. Curr Protoc Stem Cell Biol, Chapter 4: p. Unit 4A 1.

Peltz, S. W. and J. Ross (1987). "Autogenous regulation of histone mRNA decay by histone proteins in a cell-free system." Mol Cell Biol 7(12): 4345-56.

Pesquet, J.-C., et al., 1996. "Time-invariant orthonormal wavelet representations," IEEE Trans, on Sig. Proc., vol. 44, no. 8, pp. 1964-1970.

Postovit L M, Sensor E A, Seftor R E, Hendrix M J (2006) A three-dimensional model to study the epigenetic effects induced by the microenvironment of human embryonic stem cells. Stem Cells 24:501-505.

Qi X, Li T-G, Hao J, Hu J, Wang J, Simmons H, Miura S, Mishina Y, Zhao G-Q (2004) BMP4 supports self-renewal of embryonic stem cells by inhibiting mitogen-activated protein kinase pathways. Proceedings of the National Academy of Sciences of the United States of America 101:6027-6032.

Ralston, A. and J. Rossant (2008). "Cdx2 acts downstream of cell polarization to cell-autonomously promote trophectoderm fate in the early mouse embryo." Dev Biol 313(2):614-29.

Ramalho-Santos, M., S. Yoon, Y. Matsuzaki, R. C. Mulligan, and D. A. Melton. 2002. "Sternness": transcriptional profiling of embryonic and adult stem cells. Science. 298:597-600.

Rao S S, Winter J O (2009) Adhesion molecule-modified biomaterials for neural tissue engineering. Front Neuroengineering 2:6.

Recht, J., T. Tsubota, et al. (2006). "Histone chaperone Asf1 is required for histone H3 lysine 56 acetylation, a modification associated with S phase in mitosis and meiosis." Proc Natl Acad Sci USA 103(18): 6988-93.

Richardson, R. T., 0. M. Alekseev, et al. (2006). "Nuclear autoantigenic sperm protein (NASP), a linker histone chaperone that is required for cell proliferation." J Biol Chem 281(30): 21526-34.

Rinkenberger J, Werb Z (2000) The labyrinthine placenta. Nature Gene 25:248-250.

Rodriguez, P., J. Pelletier, G. B. Price, and M. Zannis-Hadjopoulos. 2000. NAP-2: histone chaperone function and phosphorylation state through the cell cycle. J Mol Biol. 298:22538.

Rossant, J. (1995). "Development of the extraembryonic lineages." Sem Dev Biol 6: 237-247.

Saha S, Ji L, de Pablo J J, Palecek S P (2008) TGF {beta}/Activin/Nodal Pathway in Inhibition of Human Embryonic Stem Cell Differentiation by Mechanical Strain. Biophys J 94:4123-4133.

Salto C, Saindon E, Bolin M, Kanciurzewska A, Fahlman M, Jager E W H, Tengvall P, Arenas E, Berggren M (2008b) Control of Neural Stem Cell Adhesion and Density by an Electronic Polymer Surface Switch. Langmuir 24:14133-14138.

Sammak P J, Abraham V, Ghosh R, Haskins J, Jane E, Petrosko P, M. E T, Kinney T N, Jefferys C, Desai M, Mangoubi R (2008) High Content Analysis of Human Embryonic Stem Cell Growth and Differentiation. In: High Content Screening: Science, Techniques, and Applications (Hanney S A, ed). Hoboken, N.J.: John Wiley.

Sammak P J, Gorbsky G J, Borisy G G (1987) Microtubule dynamics in vivo: a test of mechanisms of turnover. J Cell Biol 104:395-405.

Soares M. J., T. N. Faria, et al. (1993). Trophoblast cell differentiation: expression of the placental prolactin family. Spriger Verlag, New York.

Song H, Stevens C F, Gage F H (2002) Astroglia induce neurogenesis from adult neural stem cells. Nature 417: 39-44.

St John J C, Ramalho-Santos J, Gray H L, Petrosko P, Rawe V Y, Navara C S, Simerly C R, Schatten G P (2005) The expression of mitochondria! DNA transcription factors during early cardiomyocyte in vitro differentiation from human embryonic stem cells. Cloning Stem Cells 7:141-153.

Stauffer W R, Cui X T (2006) Polypyrrole doped with 2 peptide sequences from laminin. Biomaterials 27:2405-2413.

Strumpf D, Mao C A, Yamanaka Y, Ralston A, Chawengsaksophak K, Beck F, Rossant J (2005) Cdx2 is required for correct cell fate specification and differentiation of trophectoderm in the mouse blastocyst. Development 132:2093-2102.

Strumpf, D., C. A. Mao, et al. (2005). "Cdx2 is required for correct cell fate specification and differentiation of trophectoderm in the mouse blastocyst." Development 132 (9): 2093-102.

Tanaka, S., T. Kunath, et al. (1998). "Promotion of trophoblast stem cell proliferation by FGF4." Science 282 (5396):2072-5.

Teixeira, M. T., B. Dujon, et al. (2002). "Genome-wide nuclear morphology screen identifies novel genes involved in nuclear architecture and gene-silencing in Saccharomyces cerevisiae." J Mol Biol 321(4): 551-61.

Thompson J. R. and Tapia R. A., 1990 Nonparametric Function Estimation, Modeling, and Simulation. Philadelphia: SIAM.

Thomson, I., S. Gilchrist, et al. (2004). "The radial positioning of chromatin is not inherited through mitosis but is established de novo in early GI." Curr Biol 14(2): 166-72.

Tzagkarakis G. and Tsakalides P., 2004. A Statistical Approach to Texture Image Retrieval via Alpha-Stable Modeling of Wavelet Decompositions; Institute Superior Tecnico, Lisboa, Portugal.

Ungrin, M. D., C. Joshi, et al. (2008). "Reproducible, Ultra High-Throughput Formation of Multicellular Organization from Single Cell Suspension-Derived Human Embryonic Stem Cell Aggregates." PLoS ONE 3(2): e1565.

Valera E, Isaacs M J, Kawakami Y, IzpisCia Belmonte J C, Choe S (2010) BMP-2/6 Heterodimer Is More Effective than BMP-2 or BMP-6 Homodimers as Inductor of Differentiation of Human Embryonic Stem Cells. PLoS ONE 5:e11167.

Vallier L, Mendjan S, Brown S, Chng Z, Teo A, Smithers L E, Trotter M W, Cho C H, Martinez A, Rugg-Gunn P, Brons G, Pedersen R A (2009c) Activin/Nodal signalling maintains pluripotency by controlling Nanog expression. Development 136:1339-1349.

Vallier L, Touboul T, Brown S, Cho C, Bilican B, Alexander M, Cedervall J, Chandran S, Hrlund-Richter L, Weber A, Pedersen R (2009b) Signaling Pathways Controlling Pluripotency and Early Cell Fate Decisions of Human Induced Pluripotent Stem Cells. Stem Cells 27:2655-2666.

Vallier L, Touboul T, Cling Z, Brimpari M, Hannan N, Milian E, Smithers L E, Trotter M, Rugg-Gunn P, Weber A, Pedersen R A (2009a) Early cell fate decisions of human embryonic stem cells and mouse epiblast stem cells are controlled by the same signalling pathways. PLoS One 4:e6082.

Vallier L, Touboul T, Chng Z, Brimpari M, Hannan N, Milian E, Smithers L E, Trotter M, Rugg-Gunn P, Weber A, Vedersen R A (2009) Early cell fate decisions of human embryonic stem cells and mouse epiblast stem cells are controlled by the same signalling pathways. PLoS One 4:e6082.

van de Wouwer et al. (1999) Statistical Texture Characterization from Discrete Wavelet Representations. IEEE Transactions on Image Processing., Vol. 8, No. 4., 592-598.

van Driel, R., P. F. Fransz, and P. J. Verschure. 2003. The eukaryotic genome: a system regulated at different hierarchical levels. J Cell Sci. 116:4067-4075.

Veillete M., 2009 Alpha-Stable distributions in MATLAB.

Walfridsson, J., 0. Khorosjutina, et al. (2007). "A genome-wide role for CHD remodelling factors and Nap I in nucleosome disassembly." Embo J 26(12): 2868-79.

Walter, J., L. Schermelleh, et al. (2003). "Chromosome order in HeLa cells changes during mitosis and early G1, but is stably maintained during subsequent interphase stages." J Cell Biol 160(5): 685-97.

Wang L, Schulz T C, Sherrer E S, Dauphin D S, Shin S, Nelson A M, Ware C B, Zhan M, Song C Z, Chen X, Brimble S N, McLean A, Galeano M J, Uhl E W, D'Amour K A, Chesnut J D, Rao M S, Blau C A, Robins A J (2007) Self-renewal of human embryonic stem cells requires insulin-like growth factor-1 receptor and ERBB2 receptor signaling. Blood:blood-2007-2003-082586.

Wu, Z., W. Zhang, et al. (2008). "Combinatorial signals of activin/nodal and bone morphogenic protein regulate the early lineage segregation of human embryonic stem cells." J Biol Chem 283(36):24991-5002.

Xu R H, Chen X, Li D S, Li R, Addicks G C, Glennon C, Zwaka T P, Thomson J A (2002) BMP4 initiates human embryonic stem cell differentiation to trophoblast. Nat Biotechnol 20:1261-1264.

Xu R H, Peck R M, Li D S, Feng X, Ludwig T, Thomson J A (2005) Basic FGF and suppression of BMP signaling sustain undifferentiated proliferation of human ES cells. Nat Methods 2:185-190.

Xu R H, Sampsell-Barron T L, Gu F, Root S, Peck R M, Pan G, Yu J, Antosiewicz-Bourget J, Tian S, Stewart R, Thomson JA (2008) NANOG is a direct target of TGF-beta/activin-mediated SMAD signaling in human ESCs. Cell Stem Cell 3:196-206.

Yao, S., S. Chen, et al. (2006). "Long-term self-renewal and directed differentiation of human embryonic stem cells in chemically defined conditions." Proc Natl Acad Sci USA 103(18): 6907-12.

Ying Q, Nichols J, Chambers I, Smith A (2003) BMP induction of Id proteins suppresses differentiation and sustains embryonic stem cell self-renewal in collaboration with STAT3. Cell 115:281-292.

Zhang P, Li J, Tan Z, Wang C, Liu T, Chen L, Yong J, Jiang W, Sun X, Du L, Ding M, Ceng H (2008) Short-term BMP-4 treatment initiates mesoderm induction in human embryonic stem cells. Blood 111:1933-1941.

Zlatanova, J., C. Seebart, et al. (2007). "Nap]: taking a closer look at a juggler protein of extraordinary skills." Faseb J 21(7): 1294-310.

INCORPORATION BY REFERENCE

All publications and patents mentioned herein are hereby incorporated by reference in their entirety as if each individual publication or patent was specifically and individually indicated to be incorporated by reference.

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

| | |
|---|---|
| YIGSR | SEQ ID NO: 1 |
| CDPGYIGSR | SEQ ID NO: 2 |
| IKVAV | SEQ ID NO: 3 |
| RNIAEIIKDI | SEQ ID NO: 4 |
| RYVVLPR | SEQ ID NO: 5 |

We claim:

1. A method for identifying cells differentiating into trophectoderm, neurectoderm, or progeny cells thereof, comprising:

(a) obtaining an image of one or more cells;

(b) representing the image as a multiplicity of pixels;

(c) using a processor to extract one or more image features from said multiplicity of pixels; and (d) identifying stem cells differentiating into trophectoderm, neurectoderm, or progeny cells thereof by comparing the one or more image features with image features derived from one or more reference stem cells, wherein the processor applies one or more statistical comparison methods to determine a presence of discrete objects within cell borders of the one or more cells, as compared with absence of discrete objects, within the cell borders of the one or more reference stem cells.

2. The method of claim 1, wherein high, low, or varying degrees of contrast between pixels at the cell border of a cell relative to the cell border of a reference stem cell indicates that the cell is differentiating into trophectoderm, neurectoderm, or a progeny cell thereof.

3. The method of claim 1, wherein thin edges at borders of a cell, as compared with the edges of a cell border in a reference stem cell, indicates that the cell is differentiating into trophectoderm, neurectoderm, or a progeny cell thereof.

4. The method of claim 1, wherein the content in multiple spatial frequency bands in an image of a cell relative to content in the multiple spatial frequency bands in reference image of a stem cell indicates that the cell is differentiating into trophectoderm, neurectoderm, or a progeny cell thereof.

5. The method of claim 1, further comprising:

(e) performing simultaneous smoothing and segmentation of said image;

(f) determining one or more boundaries of said cell;

(g) identifying a region or subregion near to said one or more boundaries;

(h) deriving one or more attributes of region or subregion; and (i) analyzing variation in said one or more attributes; wherein said one or more image features comprise components of said one or more attributes.

6. The method of claim 1, wherein the one or more image features are extracted using a wavelet, or any multiresolution decomposition algorithm.

7. The method of claim 1, wherein the one or more image features are extracted using a matrix edge and/or onion peel algorithms.

8. The method of claim 6, wherein the wavelet or multiresolution decomposition algorithm is an n-level decomposition that yields three detail subbands per level.

9. The method of claim 1, wherein the one or more statistical methods is a comparison of probability density functions, or estimates thereof.

10. A method for identifying cells differentiating into trophectoderm, neurectoderm, or progeny cells thereof, comprising:
 (a) obtaining an image of one or more cells;
 (b) representing the image as a multiplicity of pixels;
 (c) using a processor to extract one or more image features from said multiplicity of pixels; and
 (d) identifying cells differentiating into trophectoderm, neurectoderm, or progeny cells thereof by comparing the one or more image features with image features derived from one or more reference cells, wherein to compare the one or more image features the processor applies one or more statistical comparison methods to determine a presence of discrete objects within cell borders of the one or more cells, as compared with absence of discrete objects, within the cell borders of the one or more reference stem cells,
 wherein the one or more statistical comparison methods include a parametric or non-parametric binary or M-ary hypothesis test and the one or more areas of the one or more images are classified using a clustering algorithm, wherein the clustering algorithm is further configured such that the dissimilarity between the one or more image features is calculated using a probability density function (pdf) estimator and quantified using information divergence.

11. The method of claim 10, wherein the method used to estimate the pdf and divergence is selected from: a generalized Gaussian density model (GGD), a Gaussian density function, a non-Gaussian density function, or a non-parametric histogram.

12. The method of claim 10, further comprising subdividing the image of one or more cells into one or more windows.

13. The method of claim 12, wherein the one or more windows are classified, subdivided, and re-classified.

14. The method of claim 10, wherein the appearance of squamous epithelium, as compared to the cuboidal appearance of reference stem cells, indicates that the cell is differentiating along the trophectoderm lineage, and the appearance of multinucleated cells indicates that the cells are differentiating along the trophectoderm lineage.

* * * * *

UNITED STATES PATENT AND TRADEMARK OFFICE
CERTIFICATE OF CORRECTION

PATENT NO. : 9,607,202 B2
APPLICATION NO. : 12/972346
DATED : March 28, 2017
INVENTOR(S) : Paul J. Sammak et al.

Page 1 of 1

It is certified that error appears in the above-identified patent and that said Letters Patent is hereby corrected as shown below:

In the Specification

Column 1, Line 13-17 (approx.), please replace paragraph under the header FUNDING with:
"This invention was made with government support under grant number EB006161 awarded by the National Institutes of Health. The government has certain rights in the invention."

Signed and Sealed this
Eighteenth Day of June, 2019

Andrei Iancu
*Director of the United States Patent and Trademark Office*